(12) United States Patent
Yuasa et al.

(10) Patent No.: US 12,443,198 B2
(45) Date of Patent: Oct. 14, 2025

(54) MOBILE MACHINE, DATA GENERATION UNIT, AND METHOD OF GENERATING DATA

(71) Applicant: KUBOTA CORPORATION, Osaka (JP)

(72) Inventors: Junichi Yuasa, Sakai (JP); Shunsuke Miyashita, Sakai (JP); Takuya Tamai, Sakai (JP); Shunsuke Edo, Sakai (JP); Ryo Kurata, Sakai (JP)

(73) Assignee: KUBOTA CORPORATION, Osaka (JP)

(*) Notice: Subject to any disclaimer, the term of this patent is extended or adjusted under 35 U.S.C. 154(b) by 246 days.

(21) Appl. No.: 18/198,756

(22) Filed: May 17, 2023

(65) Prior Publication Data

US 2023/0288942 A1 Sep. 14, 2023

Related U.S. Application Data

(63) Continuation of application No. PCT/JP2021/040299, filed on Nov. 1, 2021.

(30) Foreign Application Priority Data

Nov. 18, 2020 (JP) .................. 2020-192014

(51) Int. Cl.
*G05D 1/00* (2024.01)
*G01S 17/08* (2006.01)
*G01S 17/89* (2020.01)

(52) U.S. Cl.
CPC ............ *G05D 1/0274* (2013.01); *G01S 17/08* (2013.01); *G01S 17/89* (2013.01); *G05D 1/0214* (2013.01); *G05D 1/024* (2013.01); *G05D 1/027* (2013.01)

(58) Field of Classification Search
CPC .................................................. G05D 1/0274
See application file for complete search history.

(56) References Cited

U.S. PATENT DOCUMENTS 5,248,007 A 9/1993 Watkins et al.
6,285,930 B1 9/2001 Dickson et al.
(Continued)

FOREIGN PATENT DOCUMENTS

AU 2019302085 B2 1/2020
EP 3 766 320 A1 1/2021
(Continued)

OTHER PUBLICATIONS

Official Communication issued in International Patent Application No. PCT/JP2021/040299, mailed on Dec. 14, 2021.
(Continued)

*Primary Examiner* — Vivek D Koppikar
*Assistant Examiner* — Paul W Arellano
(74) *Attorney, Agent, or Firm* — Keating & Bennett, LLP

(57) ABSTRACT

A mobile machine movable between multiple rows of trees includes one or more sensors to output sensor data indicating a distribution of objects in a surrounding environment of the mobile machine, and a data generator. While performing localization, the data generator is configured or programmed to detect trunks of the rows of trees in the surrounding environment of the mobile machine based on the sensor data that is repeatedly output from the one or more sensors, and generate local map data from which to generate environment map data indicating a distribution of the detected trunks of the rows of trees and record the local map data to a storage.

18 Claims, 43 Drawing Sheets

(56) References Cited

U.S. PATENT DOCUMENTS

| | | | |
|---|---|---|---|
| 6,385,515 B1 | 5/2002 | Dickson et al. | |
| 6,490,539 B1 | 12/2002 | Dickson et al. | |
| 6,686,951 B1 | 2/2004 | Dickson et al. | |
| 9,315,192 B1 | 4/2016 | Zhu et al. | |
| 10,755,357 B1* | 8/2020 | Davis | G06Q 50/163 |
| 2014/0071234 A1 | 3/2014 | Millett | |
| 2014/0163781 A1 | 6/2014 | Vian et al. | |
| 2016/0192154 A1 | 6/2016 | Modica et al. | |
| 2018/0046187 A1* | 2/2018 | Martirosyan | G05D 1/0094 |
| 2018/0267146 A1 | 9/2018 | Ingram et al. | |
| 2018/0341022 A1* | 11/2018 | Guo | G06F 18/21 |
| 2019/0133023 A1 | 5/2019 | Iwami et al. | |
| 2019/0176841 A1 | 6/2019 | Englard et al. | |
| 2020/0029488 A1 | 1/2020 | Bertucci et al. | |
| 2020/0029489 A1* | 1/2020 | Bertucci | G05D 1/247 |
| 2020/0029490 A1 | 1/2020 | Bertucci et al. | |
| 2020/0073401 A1* | 3/2020 | Szatmary | B60T 7/00 |
| 2020/0132850 A1* | 4/2020 | Crouch | G01S 7/4817 |
| 2020/0242471 A1* | 7/2020 | Busch | G06N 3/08 |
| 2020/0355513 A1* | 11/2020 | Ma | G01C 21/367 |
| 2021/0278834 A1 | 9/2021 | Kendoul et al. | |

FOREIGN PATENT DOCUMENTS

| | | |
|---|---|---|
| EP | 3 766 321 A1 | 1/2021 |
| EP | 3 766 322 A1 | 1/2021 |
| JP | 04-176786 A | 6/1992 |
| JP | 2010-096752 A | 4/2010 |
| JP | 2014122019 A | 7/2014 |
| JP | 2015535400 A | 12/2015 |
| JP | 2016-206876 A | 12/2016 |
| JP | 2018-505426 A | 2/2018 |
| JP | 2018059742 A | 4/2018 |
| JP | 2019-152924 A | 9/2019 |
| JP | 2019-154377 A | 9/2019 |
| JP | 2019-154378 A | 9/2019 |
| JP | 2019-154379 A | 9/2019 |
| JP | 2019-170312 A | 10/2019 |
| JP | 2020-012680 A | 1/2020 |
| JP | 2020511639 A | 4/2020 |
| JP | 2020-104617 A | 7/2020 |
| WO | 2016/157428 A1 | 10/2016 |
| WO | 2017/208306 A1 | 12/2017 |
| WO | 2020/014740 A1 | 1/2020 |

OTHER PUBLICATIONS

Yuasa et al., "Mobile Machine, Control Unit, and Method of Controlling Operation of a Mobile Machine", U.S. Appl. No. 18/198,730, filed May 17, 2023.

Yuasa et al., "Mobile Machine, Control Unit, Data Generation Unit, Method of Controlling Operation of a Mobile Machine, and Method of Generating Data", U.S. Appl. No. 18/198,758, filed May 17, 2023.

Shalal et al., "Orchard mapping and mobile robot localisation using on-board camera and laser scanner data fusion—Part B: Mapping and localisation", Computers and Electronics in Agriculture 119, Oct. 27, 2015, pp. 267-278.

\* cited by examiner

MOBILE MACHINE, DATA GENERATION UNIT, AND METHOD OF GENERATING DATA

CROSS REFERENCE TO RELATED APPLICATIONS

This application claims the benefit of priority to Japanese Patent Application No. 2020-192014 filed on Nov. 18, 2020 and is a Continuation Application of PCT Application No. PCT/JP2021/040299 filed on Nov. 1, 2021. The entire contents of each application are hereby incorporated herein by reference.

BACKGROUND OF THE INVENTION

1. Field of the Invention

The present disclosure relates to a mobile machine, a data generation unit, and a method of generating data.

2. Description of the Related Art

As attempts in next-generation agriculture, research and development of smart agriculture utilizing ICT (Information and Communication Technology) and IoT (Internet of Things) is under way. Research and development are also directed to the automation and unmanned use of tractors or other work vehicles to be used in the field. For example, work vehicles which travel via automatic steering by utilizing a positioning system that is capable of precise positioning, e.g., a GNSS (Global Navigation Satellite System), are coming into practical use. International Publication No. 2017/208306, Japanese Laid-Open Patent Publication No. 2020-104617 and Japanese Laid-Open Patent Publication No. 2020-12680 disclose examples of work vehicles that perform automatic steering based on positioning results obtained by using a GNSS.

On the other hand, development of mobile machines which autonomously move by utilizing distance sensors, e.g., LiDAR (Light Detection and Ranging) is also under way. For example, Japanese Laid-Open Patent Publication No. 2019-154379 discloses an example of a work vehicle which performs self-driving in between crop rows in a field by utilizing LiDAR.

SUMMARY OF THE INVENTION

In an environment in which trees are distributed with a high density, e.g., vineyards or other orchards or forests, leaves thriving in upper portions of the trees create canopies, each of which serves as an obstacle or a multiple reflector against radio waves from a satellite. Such an environment hinders accurate positioning using a GNSS. In an environment where GNSS cannot be used, use of SLAM (Simultaneous Localization and Mapping), where localization and map generation simultaneously take place, might be possible. However, various challenges exist in the practical application of a mobile machine that uses SLAM to move autonomously or with automatic steering in an environment with a multitude of trees. One challenge is that the distribution of tree leaves changes significantly with seasonal changes, making it impossible to continue using maps that were created in the past, for example.

A mobile machine according to an illustrative preferred embodiment of the present disclosure is movable between multiple rows of trees. The mobile machine includes one or more sensors to output sensor data indicating a distribution of objects in a surrounding environment of the mobile machine, and a data generator. While performing localization, the data generator is configured or programmed to detect trunks of the rows of trees in the surrounding environment of the mobile machine based on the sensor data that is repeatedly output from the one or more sensors, and generate local map data from which to generate environment map data indicating a distribution of the detected trunks of the rows of trees and record the local map data to a storage.

General or specific aspects of preferred embodiments of the present disclosure and modifications or combinations thereof may be implemented using a device, a system, a method, an integrated circuit, a computer program, a computer-readable recording medium, or any combination thereof. The computer-readable recording medium may be inclusive of a volatile recording medium, or a non-volatile recording medium. The device may include a plurality of devices. In the case where the device includes two or more devices, the two or more devices may be disposed within a single apparatus, or divided over two or more separate apparatuses.

According to a preferred embodiment of the present disclosure and modifications or combinations thereof, even in an environment where positioning by GNSS is difficult, automatic steering or autonomous movement of a mobile machine can be achieved. A distribution of the trunks of the rows of trees undergoes less seasonal change than does a distribution of leaves. By generating an environment map while focusing on the trunks, it becomes possible to continuously use the same environment map over relatively periods of time.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Definitions of Terms

Figure 1:
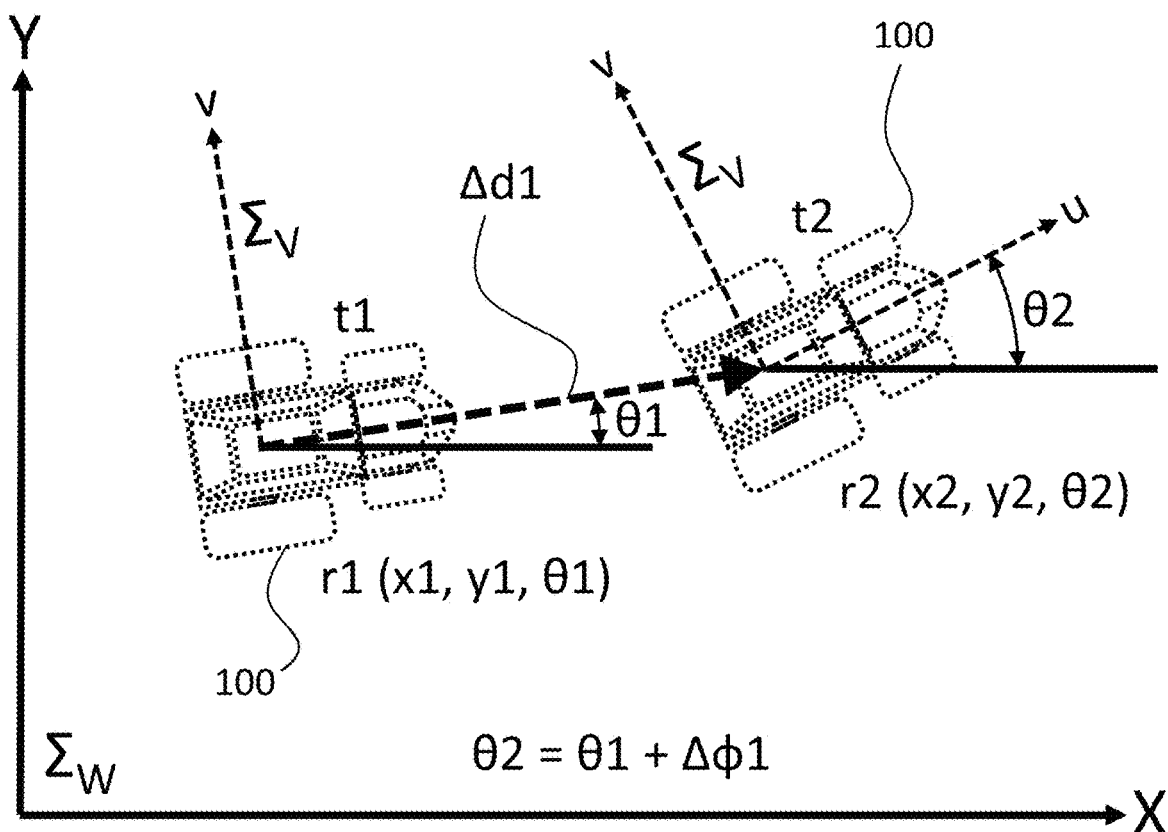
FIG. 1 is a diagram schematically showing an example of a mobile machine that moves on a plane from time t1 to time t2.

Definitions of main terms used in the present specification are described below.

A "mobile machine" is a device equipped with wheels, crawlers, bipedal or multipedal walking devices, or propellers or other driving devices that generate traction for movement. "Movable units", as used in the present disclosure, include work vehicles such as tractors, transport vehicles, mobile robots, and unmanned aerial vehicles (UAVs, so-called drones) such as multicopters. Movable units may be unmanned or manned.

A "work vehicle" means a vehicle capable of traveling while performing a specific task in a work area such as a field (e.g., orchard, field, paddy field, or pasture), mountain forest, or construction site. Examples of work vehicles include agricultural machines such as tractors, rice transplanters, combines, vehicles for crop management, and riding mowers, as well as vehicles used for non-agricultural purposes, such as construction vehicles and snowplow vehicles.

"SLAM" is a generic term for techniques where localization of a mobile machine and map generation simultaneously take place.

"Localization" is the estimation of the position of a mobile machine on a map (e.g., the position of the center of gravity of the mobile machine). In a localization based on SLAM, usually, a pose of the mobile machine is determined.

A "pose" is the "position and orientation" of an object. A pose in a two-dimensional space is defined by three coordinate values (x, y, θ), for example. Herein, (x, y) are coordinate values of an XY coordinate system, which is a world coordinate system that is fixed to the globe; and θ is an angle relative to a reference direction. A pose in a three-dimensional space is defined by six coordinate values (x, y, z, $\theta_R$, $\theta_P$, $\theta_Y$), for example. Herein, (x, y, z) are coordinate values of an XYZ coordinate system which is a world coordinate system; and ($\theta_R$, $\theta_P$, $\theta_Y$) are angles of roll, pitch, and yaw relative to respective reference directions. The attitude of a mobile machine is expressed as ($\theta_R$, $\theta_P$, $\theta_Y$). A roll angle $\theta_R$ represents the amount of rotation of the mobile machine around its front-rear axis. A pitch angle $\theta_P$ represents the amount of rotation of the mobile machine around its right-left axis. A yaw angle $\theta_Y$ represents the amount of rotation of the mobile machine around its top-bottom axis. The attitude may be defined by an Euler angle or other angles, or a quaternion.

"Environment map data" is data based on a predetermined coordinate system that expresses positions or regions of objects within an environment in which a mobile machine moves. Environment map data may simply be referred to as an "environment map". Examples of coordinate systems defining an environment map include not only world coordinate systems such as a geographic coordinate system that is fixed to the globe, but also odometry coordinate systems indicating poses based on odometry information, and so on. Environment map data may include information other than position (e.g., attribute or other information) of an object existing in an environment. The environment map encompasses maps of various forms, such as point cloud maps or grid maps. Hereinafter, an environment map may be referred to as "map data" or simply as a "map". Moreover, the data of a local map or partial map that is generated or processed in the course of establishing an environment map may also be referred to as "map data", or simply as a "map".

"Automatic steering" means the steering of a mobile machine that is based on the action of a controller, rather than manually. In the present specification, "automatic travel" is a notion that encompasses "automatic steering". A portion or an entirety of the controller may be external to the mobile machine. Communications of control signals, commands, data, or the like may be performed between the mobile machine and the controller external to the mobile machine. During automatic steering, other operations such as velocity control may be performed manually.

"Autonomous movement" means the movement of a mobile machine being made based on the action of a controller while sensing the surrounding environment, without any person being involved in the control of the movement. Autonomous movement includes autonomous driving and autonomous flight. The controller may control the necessary movements of the mobile machine, such as steering, velocity control, and starting and stopping of travel, as well as ascending, descending, and hovering during flight. Autonomous movement can include obstacle detection and obstacle avoidance actions. Autonomous movement may include operations of obstacle detection and obstacle avoidance.

"Self-driving" encompasses autonomous driving based on a controller which is included within the mobile machine, and also traveling based on commands coming from a computer in an operating schedule management system. Autonomous driving includes not only a movement of the mobile machine toward a destination along a predetermined path, but also a movement of merely following a target of tracking. Moreover, it may also be possible to temporarily move based on instructions from a human worker.

A "localization device" or "localization processor" is a device or a processor that estimates its own position on an environment map, based on sensor data that is acquired by an external sensor, such as a LiDAR (Light Detection and Ranging) sensor.

An "external sensor" is a sensor that senses the external state of the mobile machine. Examples of external sensors include laser range finders (also referred to as "range sensors"), cameras (or image sensors), LiDAR sensors, millimeter wave radars, and magnetic sensors.

An "internal sensor" is a sensor that senses the state of the mobile machine. The internal sensor includes a wheel encoder to measure the rotational speed of a wheel, an acceleration sensor, and an angular acceleration sensor (e.g., a gyroscope). An inertial measurement unit (IMU) includes an acceleration sensor and an angular acceleration sensor, and is able to output an amount of move and an attitude of the mobile machine. Information representing amount of change in the pose of the mobile machine that is acquired by the internal sensor is referred to as "odometry information".

The "trunk of a tree" is a lignified stem of a woody plant that is the main axis which stands upright above the ground surface and produces branches. It does not include the branches, leaves, and the root of the tree.

Next, fundamental principles of localization that utilize SLAM technique used in a preferred embodiment of the present disclosure will be described. For simplicity, it is assumed herein that the mobile machine moves in a two-dimensional space (i.e., a plane).

First, FIG. 1 is referred to. FIG. 1 is a diagram schematically showing an example of a mobile machine 100 that moves on a plane from time t1 to time t2. In this example, the mobile machine 100 is a work vehicle (e.g., a tractor) that travels on wheels. The mobile machine 100 may be a vehicle other than a tractor, or any other kind of mobile machine, such as a walking robot or a drone. FIG. 1 schematically shows the position and orientation of the mobile machine 100 moving on a plane. The position coordinates of the mobile machine 100 are indicated by an XY coordinate system. The XY coordinate system is a world coordinate system $\Sigma_W$ that is fixed to the globe. FIG. 1 also shows a mobile machine coordinate system $\Sigma_V$ that is fixed to the mobile machine 100. In this example, the mobile machine coordinate system $\Sigma_V$ is a uv coordinate system whose u-axis direction is the direction in which the front of the mobile machine 100 faces and whose v-axis direction is a direction resulting from rotating the u axis counterclockwise by 90 degrees. The origin position of the mobile machine coordinate system $\Sigma_V$ changes with movement of the mobile machine 100. The orientation of the mobile machine coordinate system $\Sigma_V$ changes with change in the orientation of the mobile machine 100, i.e., rotation.

Assume that the mobile machine 100 has a pose r1 (i.e., position and orientation) of at time t1, and a pose r2 at time t2. The pose r1 is defined by a position indicated by coordinates (x1, y1) and an orientation indicated by an angle θ1, for example. It is assumed herein that the orientation of the mobile machine 100 is the direction of the front of the mobile machine 100. It is further assumed that the positive direction on the X axis defines a reference direction of angle, and that the counterclockwise direction defines the positive direction of angle. The pose r2 is defined by a position indicated by coordinates (x2, y2) and an orientation indicated by an angle θ2.

In the example of FIG. 1, from time t1 to time t2, the position of the mobile machine 100 moves (translates) in the direction of the angle θ1 by Δd1, and the orientation of the mobile machine 100 rotates counterclockwise by Δφ1(=θ2−θ1). Thus, the motion of the mobile machine 100 is a synthesis of "translation" and "rotation".

In this example, when the distance Δd1 is sufficiently short, the traveling direction of the mobile machine 100 can be approximated as being parallel to the u axis of the mobile machine coordinate system $\Sigma_V$. Therefore, the following eq. 1 holds true.

$$\begin{pmatrix} x2 \\ y2 \\ \theta 2 \end{pmatrix} = \begin{pmatrix} \cos\theta 1 & -\sin\theta 1 & 0 \\ \sin\theta 1 & \cos\theta 1 & 0 \\ 0 & 0 & 1 \end{pmatrix} \begin{pmatrix} \Delta d1 \\ 0 \\ \Delta\varphi 1 \end{pmatrix} + \begin{pmatrix} x1 \\ y1 \\ \theta 1 \end{pmatrix} \quad (\text{eq. 1})$$

When the mobile machine 100 includes an internal sensor(s) such as a revolutions sensor for a wheel and/or an inertial measurement unit (IMU), it is possible to acquire estimated values of Δd1 and Δφ1 from such internal sensors, i.e., odometry information. If the time span from time t1 to time t2 is as short as e.g., about 10 milliseconds, the distance Δd1 is sufficiently short, and eq. 1 holds true. As time proceeds from t1 to t2, t3, . . . , the estimated values of Δd1 and Δφ1 are periodically updated, such that changes in the position and orientation (i.e., pose) of the mobile machine 100 can be estimated. In other words, if the initial pose, e.g. (x1, y1, θ1), is known, the estimated value of any subsequent pose of the mobile machine 100 can be periodically updated based on odometry information. However, pose estimation based on odometry information has the problem of accumulated errors. Therefore, in many cases, it is necessary to acquire highly-accurate estimated values of the position of the mobile machine 100 by utilizing a satellite positioning system or SLAM technique.

Next, with reference to FIG. 2A to FIG. 5, a localization that is performed by using an external sensor such as a LiDAR will be described. In the following, examples of localization operations will be described with respect to the case where environment map data exists and the case where environment map data does not exist.

Figure 2A:
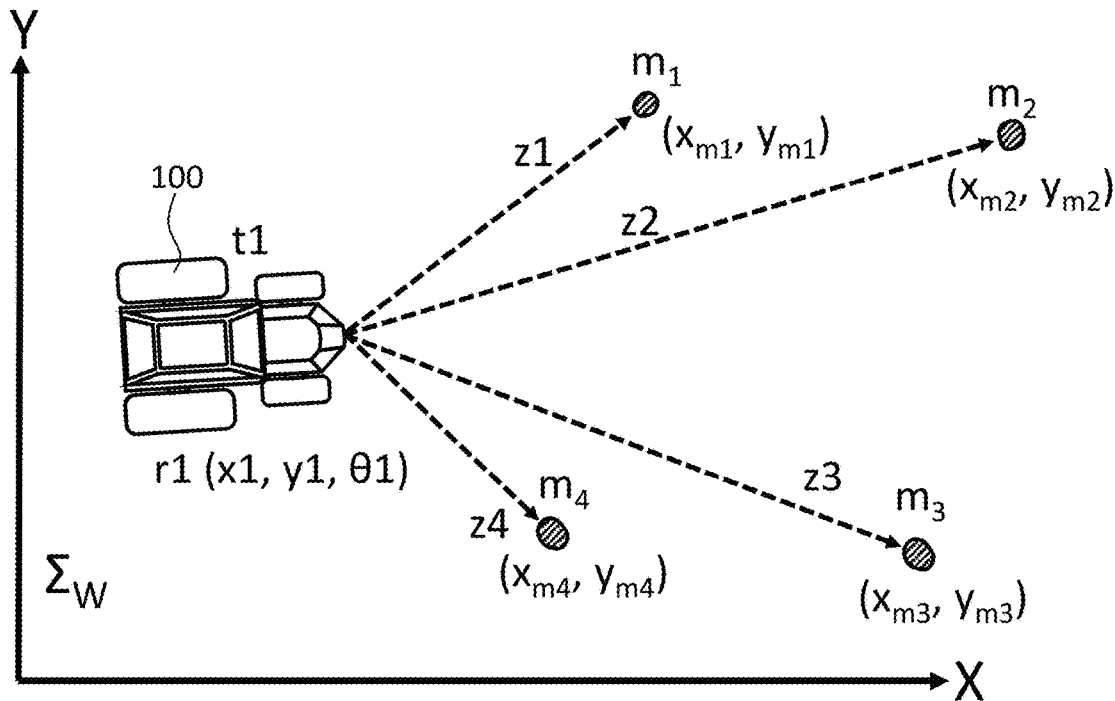
FIG. 2A is a diagram showing a mobile machine and a plurality of landmarks at time t1.
Figure 2B:
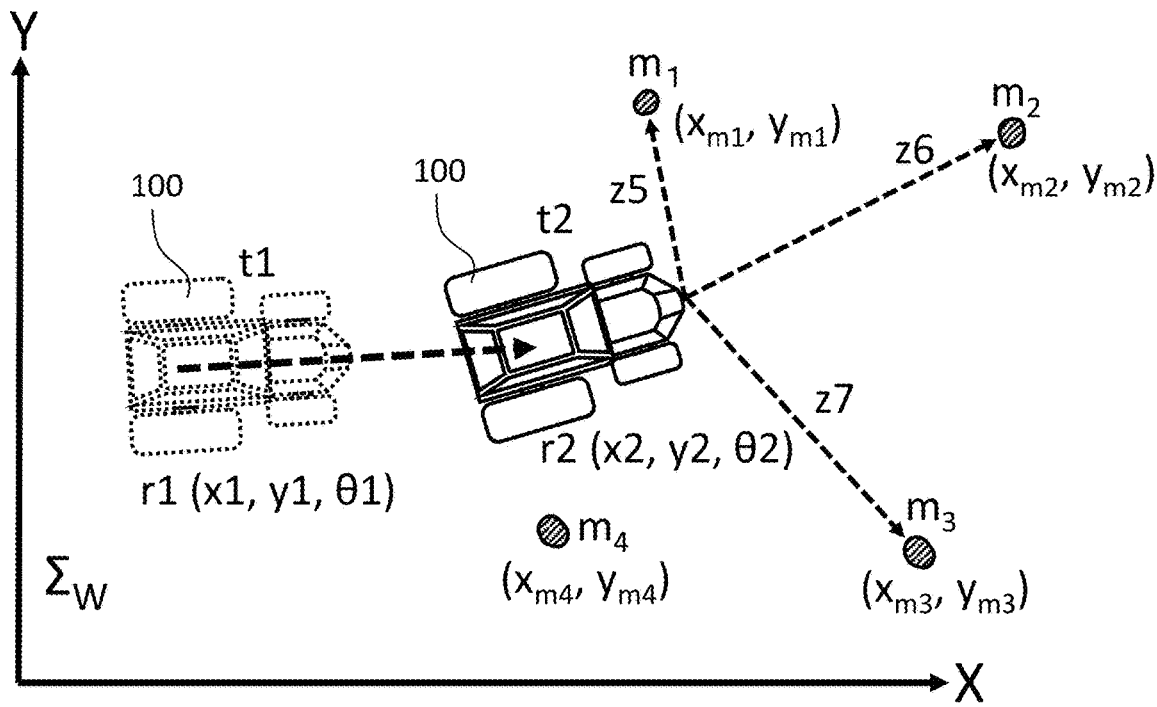
FIG. 2B is a diagram showing a mobile machine and a plurality of landmarks at time t2.

In the examples shown in FIGS. 2A and 2B, in the environment in which the mobile machine 100 moves from time t1 to time t2, landmarks m1, m2, m3 and m4 of fixed positions exist. In this example, environment map data indicating the positions of the landmarks already exists. Such environment map data includes an identifier (e.g., a landmark number) that identifies each individual landmark, and position coordinates of the landmark associated with each identifier in the world coordinate system $\Sigma_W$, for example. The coordinates of the landmarks m1, m2, m3 and m4 in the world coordinate system $\Sigma_W$ are assumed to be, respectively, ($x_{m1}$, $y_{m1}$), ($x_{m2}$, $y_{m2}$), ($x_{m3}$, $y_{m3}$) and ($x_{m4}$, $y_{m4}$). Each point in point cloud data that is acquired by LiDAR may serve as a landmark. An environment map that includes point cloud data is referred to as a point cloud map. The landmark positions may be indicated by cells on a grid map.

In the example of FIG. 2A, observed values (or measured values) of the landmarks m1, m2, m3 and m4 acquired by the vehicle 100 at the pose r1 are, respectively, z1, z2, z3 and z4. The observed values are, for example, values representing the distance and direction toward each landmark as measured by external sensors. Since observed values are data that is acquired by external sensors, they may be referred to as "sensor data" in the present disclosure.

As the mobile machine 100 moves as shown in FIG. 2B, the landmarks m1, m2 and m3 as acquired by the mobile machine 100 at the pose r2 may take observed values z5, z6 and z7, respectively.

Based on these observed values, position coordinates of the landmarks on the mobile machine coordinate system $\Sigma_V$ can be obtained. As described above, because the mobile machine coordinate system $\Sigma_V$ is a coordinate system that is fixed to the mobile machine 100, the position coordinates of the same landmark (e.g., the landmark m1) on the mobile machine coordinate system $\Sigma_V$ will change with the changing pose of the mobile machine 100.

The position of a landmark acquired based on observed values has coordinates in a sensor coordinate system that is determined by the positions and orientations of external sensors. Strictly speaking, a sensor coordinate system may differ from the mobile machine coordinate system $\Sigma_V$. In the following description, however, the sensor coordinate system and the mobile machine coordinate system $\Sigma_V$ are assumed to be identical. Because the relationship between the sensor coordinate system and the mobile machine coordinate system $\Sigma_V$ is known, one coordinate system can be matched to the other coordinate system by rotating the one coordinate system by a known angle and translating the one coordinate system by a known distance.

By observing the plurality of landmarks, the mobile machine 100 moving in an environment acquires the position coordinates of each landmark in the mobile machine coordinate system $\Sigma_V$. Then, if the position coordinates of each landmark in the world coordinate system $\Sigma_W$ are included in the environment map data, it is possible to estimate the poses r1 and r2 based on the observed values z1 to z7, etc. Such estimation is enabled through a matching between the position coordinates of each landmark as determined from observed value and the position coordinates of the landmark included in the environment map data, for example.

Figure 3:
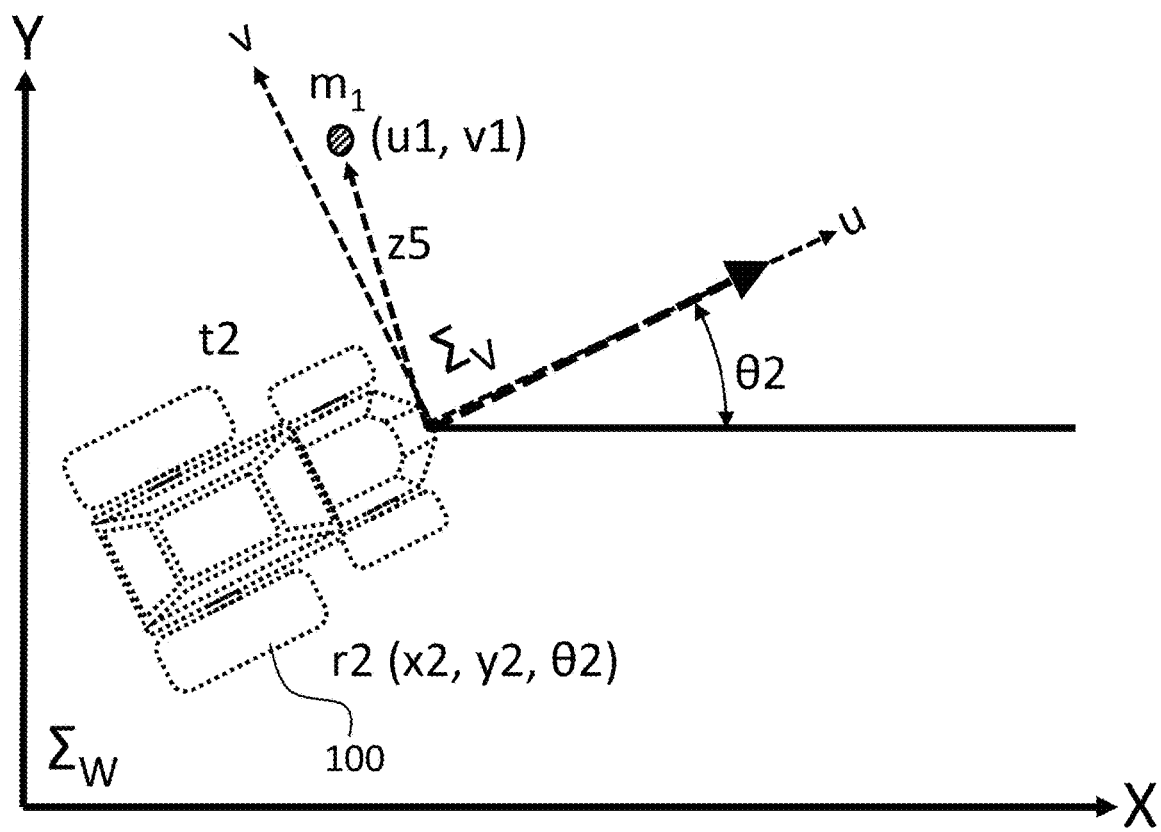
FIG. 3 is a diagram showing a placement relationship between a mobile machine coordinate system $\Sigma_V$ and a world coordinate system $\Sigma_W$.

Next, with reference to FIG. 3, a method of converting coordinates (u1, v1) on the mobile machine coordinate system $\Sigma_V$ into coordinates (u1', v1') on the world coordinate system $\Sigma_W$ will be described. FIG. 3 shows a placement relationship between the mobile machine coordinate system $\Sigma_V$ and the world coordinate system $\Sigma_W$ at time t2. In the example of FIG. 3, for simplicity, the origin of the mobile machine coordinate system $\Sigma_V$ is allowed to match the origin (sensor center) of the sensor coordinate system, such that both coordinate systems are identical. The coordinates (u1, v1) on the mobile machine coordinate system $\Sigma_V$ are calculated based on the observed value z5 of the landmark m1 from the mobile machine 100 of the pose r2 at time t2. Assuming that the observed value z5 is defined by a distance $r_{m1}$ and an angle $\varphi_{m1}$ relative to the u axis, then u1 and v1 are calculated as u1=$r_{m1}$ cos $\varphi_{m1}$, v1=$r_{m1}$ sin $\varphi_{m1}$. The conversion (coordinate transformation) from coordinates on the mobile machine coordinate system $\Sigma_V$ to coordinates on the world coordinate system $\Sigma_W$ is made by rotating the mobile machine coordinate system $\Sigma_V$ clockwise by the angle θ2 and translating the origin of the mobile machine coordinate system $\Sigma_V$ to the origin of the world coordinate system $\Sigma_W$. At this time, the following eq. 2 and eq. 3 hold true.

$$\begin{pmatrix} u1' \\ v1' \end{pmatrix} = \begin{pmatrix} \cos\theta2 & -\sin\theta2 \\ \sin\theta2 & \cos\theta2 \end{pmatrix} \begin{pmatrix} u1 \\ v1 \end{pmatrix} + \begin{pmatrix} x2 \\ y2 \end{pmatrix} \quad \text{(eq. 2)}$$

$$\begin{pmatrix} u1' \\ v1' \end{pmatrix} = R \begin{pmatrix} u1 \\ v1 \end{pmatrix} + T \quad \text{(eq. 3)}$$

Herein, R is a rotation matrix that is determined by the orientation of the mobile machine 100; and T is a position vector of the mobile machine 100 in the world coordinate system $\Sigma_W$. The contents of the rotation matrix R and the position vector T are determined from the pose of the mobile machine 100.

The (u1', v1') obtained from the coordinate transformation should match ($x_{m1}$, $y_{m1}$), which are the coordinates of the landmark m1 in the world coordinate system $\Sigma_W$. However, if the estimated values of the pose of the mobile machine 100 are deviated from the true values, an error (distance) may occur between (u1', v1') and ($x_{m1}$, $y_{m1}$). To perform localization is to determine the contents of the rotation matrix R and the position vector T in such a manner that the error between the (u1', v1') and ($x_{m1}$, $y_{m1}$) becomes small.

Figure 4:
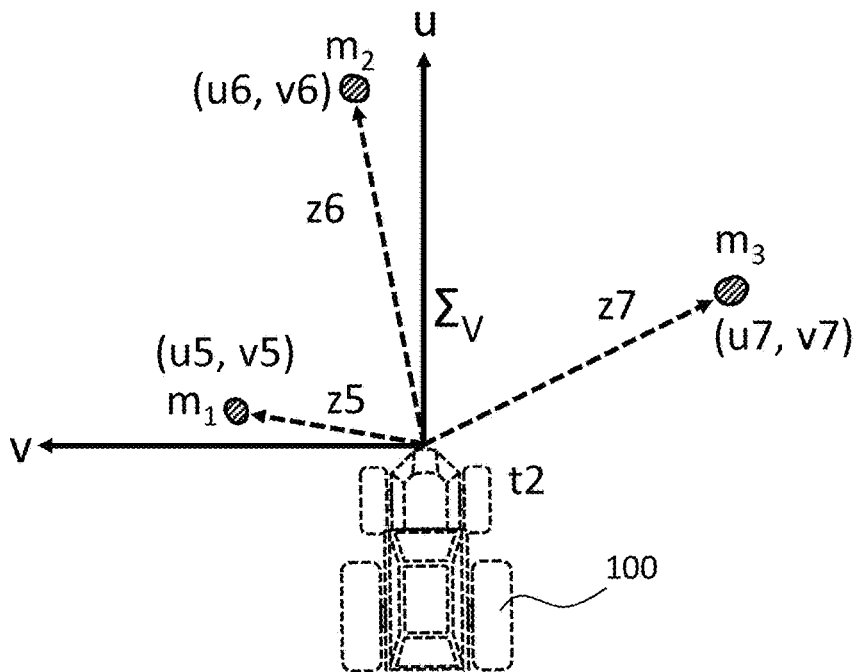
FIG. 4 is a diagram showing an example of matching.
Figure 5:
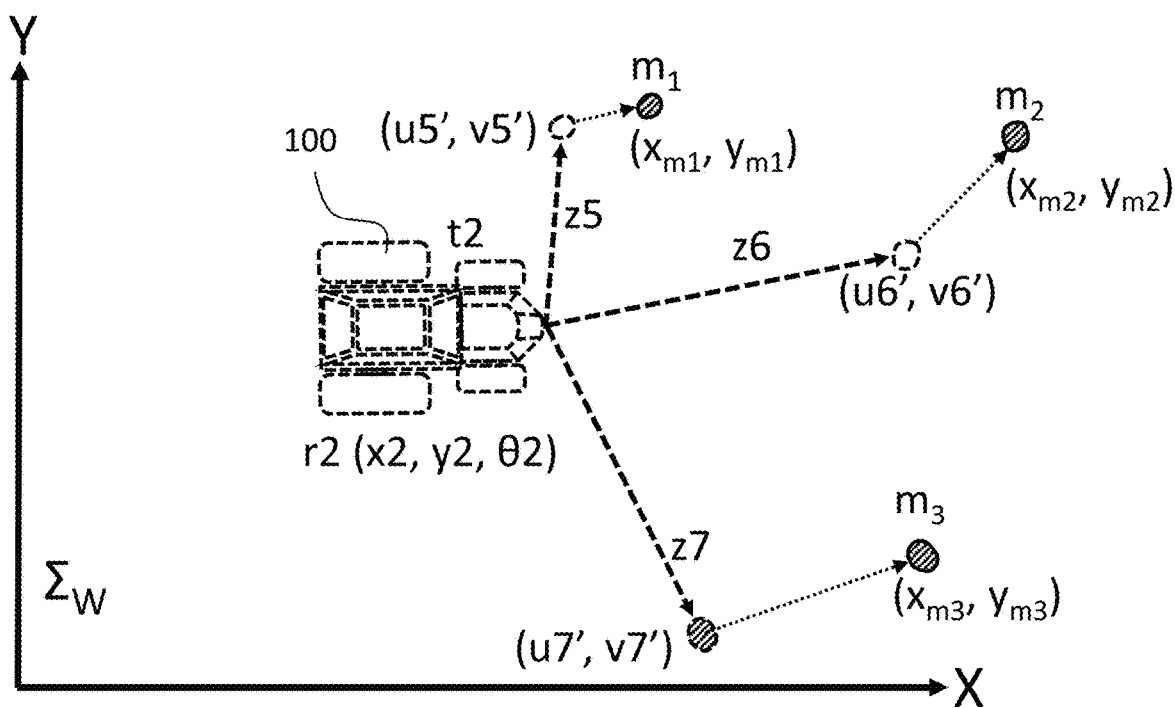
FIG. 5 is a diagram showing an example of matching.

Next, with reference to FIG. 4 and FIG. 5, an example of matching will be described in more detail. FIG. 4 schematically shows the coordinates of the landmarks m1, m2 and m3 on a uv coordinate system which is the mobile machine coordinate system $\Sigma_V$ at time t2. These coordinates may be calculated from the observed values z5, z6 and z7. In this example, the coordinates that are calculated from the observed values z5, z6 and z7 are assumed to be (u5, v5), (u6, v6) and (u7, v7), respectively. By performing a coordinate transformation from the mobile machine coordinate system $\Sigma_V$ to the world coordinate system $\Sigma_W$, (u5, v5), (u6, v6) and (u7, v7) on the mobile machine coordinate system $\Sigma_V$ are converted to, respectively, (u5', v5'), (u6', v6') and (u7', v7') on the world coordinate system $\Sigma_W$, as shown in FIG. 5. FIG. 5 shows an example state where a discrepancy exists between the converted coordinates (u5', v5'), (u6', v6') and (u7', v7') and the coordinates ($x_{m2}$, $y_{m2}$), ($x_{m3}$, $y_{m3}$) and ($x_{m4}$, $y_{m4}$) of their corresponding landmarks. The coordinate transformation is defined by a rotation based on the rotation matrix R and a translation based on the position vector T. On the world coordinate system $\Sigma_W$, the contents of the coordinate transformation (R, T) are to be determined so that (u5', v5'), (u6', v6') and (u7', v7') respectively approximate (i.e., match) ($x_{m2}$, $y_{m2}$), ($x_{m3}$, $y_{m3}$) and ($x_{m4}$, $y_{m4}$), which are the coordinates of their corresponding landmarks.

In eq. 2, the unknowns are x2, y2 and θ2. Since there are three unknowns, three or more equations corresponding to eq. 2 shall solve x2, y2 and θ2 through calculations. When three or more landmarks are observed from the mobile machine 100 of the same pose r2 as shown in FIG. 5, three equations corresponding to eq. 2 are obtained. Thus, by solving these simultaneous equations, calculated values of the pose r2 (x2, y2, θ2) can be acquired. Since actual observations will involve errors, simultaneous equations based on a multitude of equations, i.e., more than three, are to be used; and optimization by the least-squares method or the like is to be made.

Examples of such algorithms for estimating a vehicle's own position through matching-based optimizations include ICP matching technique and NDT matching technique. Either of these matching techniques, or any other method may be used.

When estimating the position of the mobile machine 100 from observed values and environment map data, it is not always necessary to estimate the orientation of the mobile machine 100. For example, as shown in FIGS. 2A and 2B, when the distance to a landmark of a known position is able to be acquired from the observed value, the position of the mobile machine 100 (or more precisely, the position of the range sensor) can be calculated based on the principle of triangulation. Estimation of a position based on such principles is also encompassed within "localization".

When environment map data does not exist, it is necessary to perform a process of estimating the pose of the mobile machine 100 while determining the coordinates of the landmarks m1, m2, m3 and m4, . . . based on observed values acquired by the mobile machine 100 moving as shown in FIGS. 2A and 2B (i.e., estimation). The coordinates of the landmarks m1, m2, m3 and m4, . . . on the world coordinate system $\Sigma_W$ constitute environment map data. Therefore, in order to establish a map, it is necessary to determine the position coordinates, on the world coordinate system $\Sigma_W$, of objects to serve as the landmarks.

In the examples of FIGS. 2A and 2B, the moving mobile machine 100 acquires a plurality of observed values from each of the landmarks m2, m3 and m4. By making more observations, it is possible to obtain a greater number of simultaneous equations than the total number of unknowns included among the pose of the mobile machine 100 and the landmark coordinates. This allows estimated values of the pose of the mobile machine 100 and landmark coordinates to be calculated.

There are many kinds of algorithms for performing localization and environment map generation based on SLAM. Examples of SLAM algorithms include not only algorithms utilizing LiDAR sensors, but also algorithms utilizing other external sensors such as cameras. Bayesian filters such as particle filters may be used for localization, or graph-based methods may be used to improve the accuracy of pose estimation. In preferred embodiments of the present disclosure, there is no limitation as to the kind of SLAM algorithm.

Among LiDAR sensors, there are: scan-type sensors, which acquire information on the distance distribution of objects in space by scanning a laser beam; and flash-type sensors, which acquire information on the distance distribution of objects in space by using light diffused over a wide area. A scan-type LiDAR sensor uses a higher intensity light than does a flash-type LiDAR sensor, and thus can acquire distance information at a greater distance. On the other hand, flash-type LiDAR sensors are suitable for applications that do not require intense light because they are simple in structure and can be manufactured at low cost. The present disclosure mainly describes examples where a scan-type LiDAR sensor(s) is used, but a flash-type LiDAR sensor(s) may also be used in some applications.

When an object in the environment is to be observed with a typical scan-type LiDAR sensor, a pulsed laser beam (i.e., laser pulses) is emitted, and the time until the laser pulses reflected by an object existing in the surrounding environment return to the LiDAR sensor is measured, whereby the distance and direction toward a reflection point that is located on the object surface can be known. Once the distance and direction toward the reflection point are known, the coordinates of the "reflection point" in the mobile machine coordinate system $\Sigma_V$ can be acquired. Scan-type LiDAR sensors can be classified into two-dimensional LiDAR sensors and three-dimensional LiDAR sensors. With a two-dimensional LiDAR sensor, the environment may be scanned so that the laser beam rotates within a single plane. On the other hand, with a three-dimensional LiDAR sensor, the environment may be scanned so that each of a plurality of laser beams rotates along a respectively different conical surface. The coordinates (two-dimensional or three-dimensional coordinate values) of each individual reflection point that are acquired with such LiDAR sensors are expressed by the mobile machine coordinate system $\Sigma_V$. By converting the coordinates of each individual reflection point from the mobile machine coordinate system $\Sigma_V$ to the world coordinate system $\Sigma_W$, it becomes possible to obtain coordinates of each individual reflection point on the world coordinate system $\Sigma_W$, whereby a point cloud map can be established. In order to convert from the mobile machine coordinate system $\Sigma_V$ to the world coordinate system $\Sigma_W$, as described earlier, information of the pose of the mobile machine 100 is necessary.

Under the SLAM technique, estimation of the pose of the mobile machine 100 and establishment of an environment map can be achieved simultaneously. However, in establishing an environment map, techniques other than the SLAM technique may be used to estimate or measure the pose of the mobile machine 100. The reason is that the pose of the mobile machine 100 can also be determined by using a satellite positioning system that measures the position of the mobile machine 100 and an inertial guidance device. However, in situations where a positioning system such as a satellite positioning system is not available, it is necessary to estimate the pose of the mobile machine 100 by using the SLAM technique to establish an environment map. Note that the position of the mobile machine 100 may be estimated by using the SLAM technique, whereas the orientation or attitude of the mobile machine 100 may be estimated by using another sensor such as an inertial measurement unit.

3. Preferred Embodiments

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

3-1. Preferred Embodiment 1

A mobile machine according to a first preferred embodiment of the present disclosure will be described.

A mobile machine according to the present preferred embodiment is used in an environment where multiple trees grow to form multiple rows of trees. The mobile machine includes: one or more sensors to output sensor data indicating a distribution of objects in a surrounding environment; a storage device; a localization device; and a controller to control movement of the mobile machine. The storage device stores environment map data indicating a distribution of trunks of the multiple rows of trees. Based on sensor data that is repeatedly output from one or more sensors while the mobile machine is moving, the localization device detects trunks of the rows of trees in the surrounding environment of the mobile machine, and estimates the position of the mobile machine through matching between the detected trunks of the rows of trees and the environment map data. The controller controls movement of the mobile machine in accordance with the estimated position of the mobile machine. The mobile machine according to the present preferred embodiment further includes a data generator that generates environment map data, or local map data from which to generate environment map data. While performing localization based on sensor data that is repeatedly output from one or more sensors while the mobile machine is moving, the data generator detects trunks of the rows of trees in the surrounding environment of the mobile machine, and generates local map data, from which to generate environment map data indicating a distribution of the detected trunks of the rows of trees, and stores the local map data to the storage device. Also, by joining together repeatedly generated local map data, the data generator may generate environment map data, and record it to the storage device. Thus, the mobile machine according to the present preferred embodiment has the function of generating an environment map while moving between multiple rows of trees, and the function of autonomously moving between rows of trees while estimating the position of the mobile machine by utilizing the generated environment map.

The one or more sensors may include at least one LiDAR sensor that outputs two-dimensional or three-dimensional point cloud data as sensor data, for example. In the present specification, "point cloud data" broadly means data indicating a distribution of multiple reflection points that are observed with a LiDAR sensor(s). The point cloud data may contain coordinate values of each reflection point in a two-dimensional space or a three-dimensional space and/or information indicating the distance and direction of each reflection point, for example.

The LiDAR sensor(s) repeatedly outputs point cloud data with a pre-designated cycle, for example. The data generator can detect trunks based on the position of each point in the point cloud data that is output during a period of one cycle or longer, or on the distance or angle of each point from the mobile machine.

Hereinafter, the configuration and operation according to the present preferred embodiment will be described, mainly with respect to an example where the mobile machine is a work vehicle such as a tractor for use in a task to be performed at an orchard such as a vineyard, and where the sensor(s) is a scan-type LiDAR sensor(s).

<Configuration>

Figure 6:
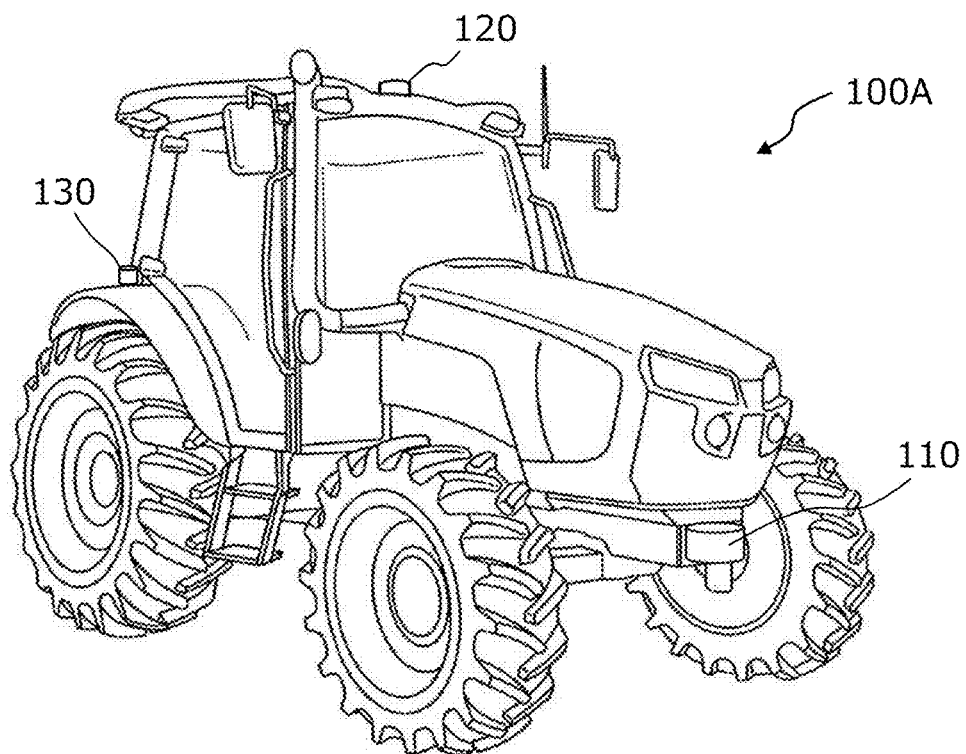
FIG. 6 is a perspective view showing the appearance of a tractor according to Preferred Embodiment 1 of the present invention.
Figure 7:
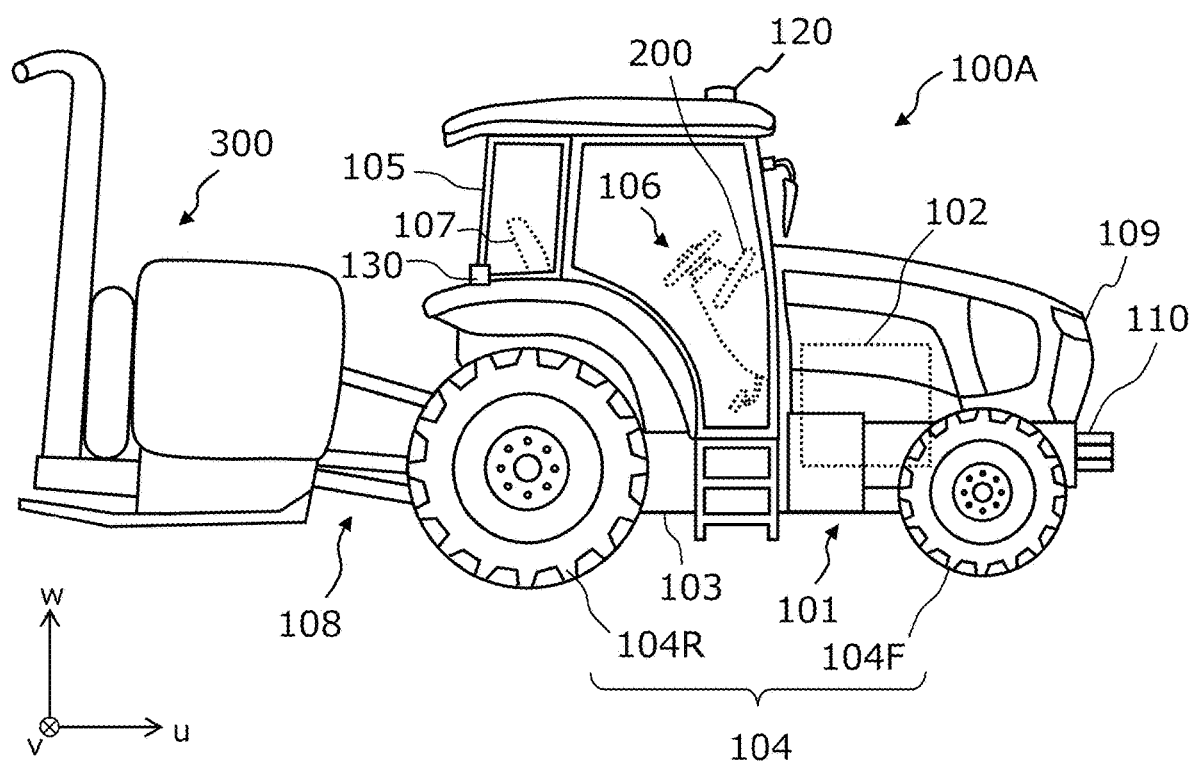
FIG. 7 is a schematic diagram showing a tractor as viewed in a lateral direction.

FIG. 6 is a perspective view showing the appearance of a tractor 100A according to the present preferred embodiment. FIG. 7 is a schematic diagram of the tractor 100A as viewed in a lateral direction. FIG. 7 also shows an implement 300 to be linked to the tractor 100A in use.

As shown in FIG. 6, the tractor 100A according to the present preferred embodiment includes a LiDAR sensor 110, a GNSS unit 120, and one or more obstacle sensors 130. Although the example of FIG. 6 illustrates one obstacle sensor 130, obstacle sensors 130 may be provided at a plurality of positions of the tractor 100A.

As shown in FIG. 7, the tractor 100A includes a vehicle body 101, a prime mover (engine) 102, and a transmission 103. On the vehicle body 101, wheels (tires) 104 and a cabin 105 are provided. The wheels 104 include front wheels 104F and rear wheels 104R. Inside the cabin 105, a driver's seat 107, a steering device 106, and an operation terminal 200 are provided. Either or both of the front wheels 104F or the rear wheels 104R may be crawlers, rather than tires.

The LiDAR sensor 110 in the present preferred embodiment is placed in a lower portion of the front face of the vehicle body 101. The LiDAR sensor 110 may be placed at a position that is lower than an average height of the trunks of the rows of trees existing in an environment in which the tractor 100A travels, e.g., at a height of not less than 15 cm and not more than 100 cm from the ground surface. The LiDAR sensor 110 may be placed at a position that is lower than a half of the height of the tractor 100A, for example. The height of the tractor 100A is a height from the ground surface to the topmost portion of the cabin 105, e.g., 2 meters or more. The LiDAR sensor 110 may be placed at a position that is lower than ⅓ of the height of the tractor 100A. In the example of FIG. 7, the LiDAR sensor 110 is placed at a position that is lower than the tops of the wheels 104 and headlights 109. Effects that are obtained by placing the LiDAR sensor 110 at such a low position will be described later.

While the tractor 100A is moving, the LiDAR sensor 110 repeatedly outputs sensor data indicating the distances and directions, or two-dimensional or three-dimensional coordinate values, of objects existing in the surrounding environment. The sensor data that is output from the LiDAR sensor 110 is processed by a controller, such as an ECU (Electronic Control Unit), that is included in the tractor 100A. By using the aforementioned SLAM algorithm, the controller is able to perform processes such as generation of environment map data based on the sensor data, and localization using the environment map. Instead of completing the environment map data, the controller may generate some local map data from which to generate the environment map data. In that case, the process of integrating local map data to establish environment map data may be performed on a computer that is external to the tractor 100A, e.g., a cloud server.

In the example of FIG. 7, the obstacle sensor(s) 130 is provided at the rear of the vehicle body 101. The obstacle sensor(s) 130 may be placed at any other position than the rear of the vehicle body 101. For example, one or more obstacle sensors 130 may be provided at any position selected from among the sides of the vehicle body 101, the front of the vehicle body 101, and the cabin 105. The obstacle sensor(s) 130 detects objects that are relatively close to the tractor 100A. Each obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different position of the body of the tractor 100A. For example, a plurality of laser scanners and a plurality of ultrasonic sonars may be placed at different positions of the body. Providing a multitude of obstacle sensors 130 can reduce blind spots in monitoring obstacles around the tractor 100A. The LiDAR sensor 110 may function as an obstacle sensor.

The GNSS unit 120 is disposed above the cabin 105. The GNSS unit 120 is a GNSS receiver that includes an antenna to receive signals from a GNSS satellite and a processing circuit. The GNSS unit 120 receives GNSS signals which are transmitted from a GNSS satellite, such as the GPS (Global Positioning System), GLONAS, Galileo, BeiDou, or QZSS (Quasi-Zenith Satellite System, e.g., MICHIBIKI), and performs positioning based on the signals. The tractor 100A according to the present preferred embodiment is mainly used in environments where multiple trees grow to make it difficult to use a GNSS, e.g., a vineyard, which is the reason why the LiDAR sensor 110 is employed in positioning. However, in an environment where it is possible to receive GNSS signals, positioning may be performed by using the GNSS unit 120. By combining the positioning based on the LiDAR sensor 110 and the positioning based on the GNSS unit 120, the stability or accuracy of positioning can be improved.

The prime mover 102 may be a diesel engine, for example. Instead of a diesel engine, an electric motor may be used. The transmission 103 can switch the propulsion of the tractor 100A through a speed changing mechanism. The transmission 103 can also switch between forward travel and backward travel of the tractor 100A.

The steering device 106 includes a steering wheel, a steering shaft connected to the steering wheel, and a power steering device to assist in the steering by the steering wheel. The power steering device includes a hydraulic device or an electric motor to supply an assisting force for rotating the steering shaft. The front wheels 104F are the wheels responsible for steering, such that changing their steering angle can cause a change in the traveling direction of the tractor 100A. The steering angle of the front wheels 104F can be changed by manipulating the steering wheel. When automatic steering is performed, under the control of an electronic control unit (ECU) disposed in the tractor 100A, the steering angle is automatically adjusted by the power of the hydraulic device or electric motor.

A linkage device 108 is provided at the rear of the vehicle body 101. The linkage device 108 may include, e.g., a three-point linkage (hitch) device, a PTO (Power Take Off) shaft, and a universal joint. The linkage device 108 allows the implement 300 to be attached to or detached from the tractor 100A. The linkage device 108 is able to raise or lower the three-point linkage device with a hydraulic device, for example, thus controlling the position or attitude of the implement 300. Moreover, motive power can be sent from the tractor 100A to the implement 300 via the universal joint. While towing the implement 300, the tractor 100A allows the implement 300 to perform a predetermined task. The linkage device may be provided frontward of the vehicle body 101. In that case, the implement may be connected frontward of the tractor 100A. In the case where the LiDAR sensor 110 is used while the implement is connected frontward of the tractor 100A, the LiDAR sensor 110 is to be placed in a position where the laser beam is not obstructed by the implement.

Although the implement 300 shown in FIG. 7 is a sprayer that sprays chemical agents onto crops, the implement 300 is not limited to a sprayer. For example, any arbitrary implement such as a mower, a seeder, a spreader, a rake, a baler, a harvester, a plow, a harrow, or a rotary tiller may be connected to the tractor 100A for use.

In the following description, the uvw coordinate system shown in FIG. 7 is used. The uvw coordinate system is a coordinate system that is fixed to the tractor 100A and the LiDAR sensor 110. The traveling direction of the tractor 100A is the u-axis direction; the left direction is the v-axis direction; and the upper direction is the w-axis direction. Although the origin of the uvw coordinate system is illustrated to be at a distant position from the tractor 100A for ease of understanding in the figure, in practice, the origin of the uvw coordinate system is matched to the center of the LiDAR sensor 110 provided on the tractor 100A.

Figure 8:
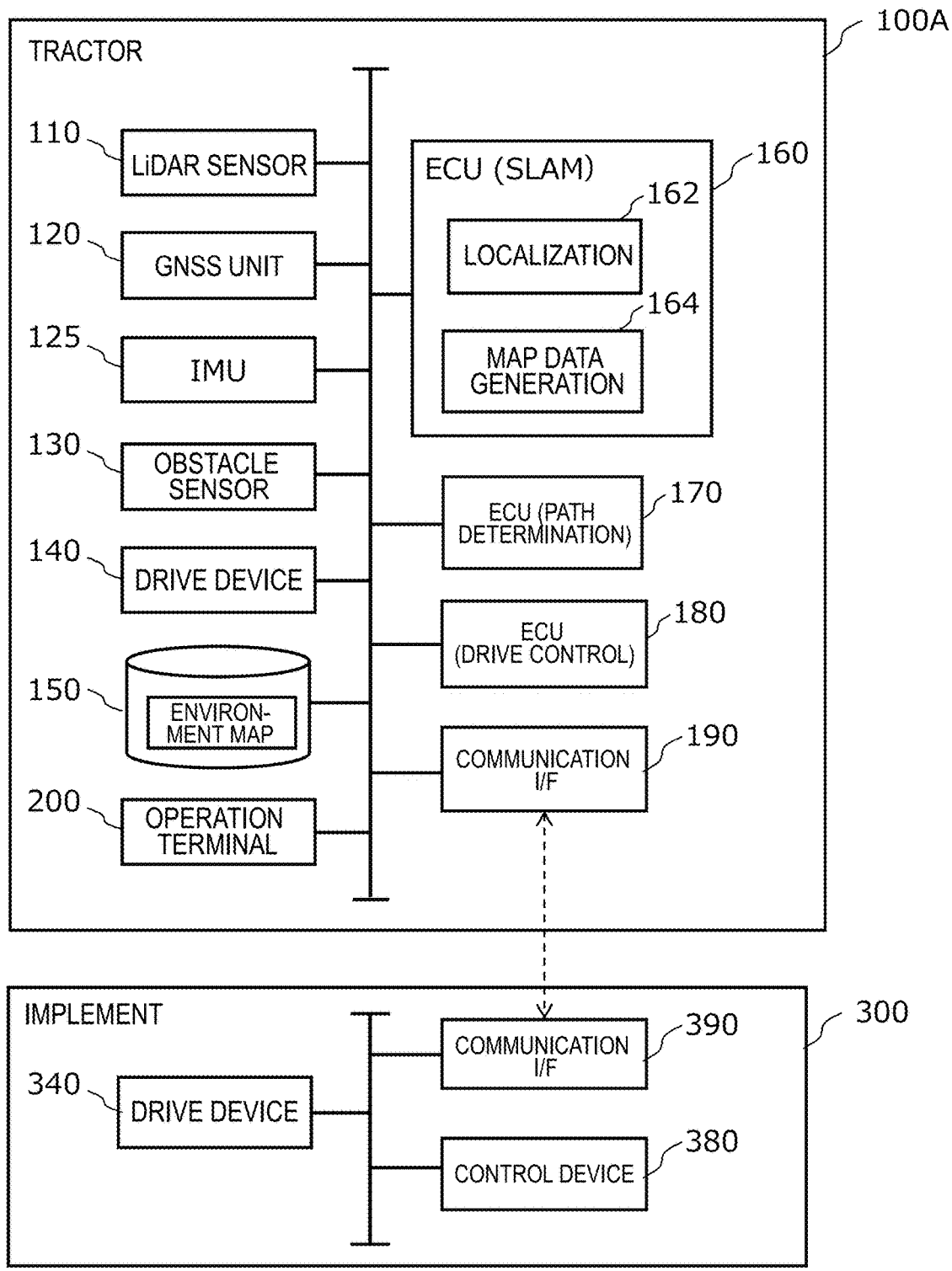
FIG. 8 is a block diagram showing an exemplary schematic configuration of a tractor and an implement.

FIG. 8 is a block diagram showing an exemplary schematic configuration of the tractor 100A and the implement 300. In addition to the LiDAR sensor 110, the GNSS unit 120, the obstacle sensor(s) 130, and the operation terminal 200, the tractor 100A in this example also includes an inertial measurement unit (IMU) 125, a drive device 140, a storage device 150, a plurality of electronic control units (ECU) 160, 170 and 180, and a communication interface (IF) 190. The implement 300 includes a drive device 340, a controller 380, and a communication interface 390. Note that FIG. 8 shows component elements which are relatively closely related to the localization operation, the self-driving operation, and the map generation operation according to the present preferred embodiment, while other component elements are omitted from illustration.

The IMU 125 in the present preferred embodiment includes a 3-axis accelerometer and a 3-axis gyroscope. The IMU 125 functions as a motion sensor which can output signals representing parameters such as acceleration, velocity, displacement, and attitude of the tractor 100A. The IMU 125 may output such signals as frequently as several tens to several thousands of times per second, for example. Instead of the IMU 125, a 3-axis accelerometer and a 3-axis gyroscope may be separately provided.

For example, the drive device 140 may include various devices that are needed for the traveling of the tractor 100A and the driving of the implement 300, e.g., the aforementioned prime mover 102, transmission 103, wheels 104, steering device 106, and linkage device 108. The prime mover 102 includes an internal combustion engine such as a diesel engine. Instead of an internal combustion engine or in addition to an internal combustion engine, the drive device 140 may include an electric motor that is dedicated to traction purposes.

The storage device 150 includes one or more storage media such as a flash memory or a magnetic disc, and stores various data that are generated by the sensors and the ECUs 160, 170 and 180, such as environment map data. The storage device 150 also stores data such as a computer program(s) to cause the ECUs 160, 170 and 180 to perform various operations to be described later. Such a computer program(s) may be provided for the tractor 100A via a storage medium (e.g., a semiconductor memory or an optical disc) or through telecommunication lines (e.g., the Internet). Such a computer program(s) may be marketed as commercial software.

The ECU 160 is an electronic circuit that performs processing based on the aforementioned SLAM technique. The ECU 160 includes a localization module 162 and a map data generating module 164. The ECU 160 is an example of the aforementioned localization device and data generator. Based on the data or signals that are repeatedly output from the LiDAR sensor 110 and the IMU 125 while the tractor 100A is traveling, the ECU 160 can generate map data while estimating the position and orientation (i.e., the pose) of the tractor 100A). Moreover, during the self-driving after generation of the environment map data, the ECU 160 performs matching between the sensor data that is output from the LiDAR sensor 110 and the environment map data, thereby being able to estimate the position and orientation of the tractor 100A.

The localization module 162 performs computations to achieve estimation of the position and orientation of the tractor 100A, i.e., localization. The map data generating module 164 performs the process of generating map data. The "map data" generated by the map data generating module 164 includes: environment map data to be used for the matching during self-driving; and local map data, which is partial data that is generated in order to establish the environment map data. By joining together repeatedly generated local map data, the map data generating module 164 may generate the environment map data, and record it to the storage device 150. The localization module 162 and the map data generating module 164 may be implemented by a single circuit, or divided into a plurality of circuits.

At a stage where no environment map data has been generated yet, while performing localization, the ECU 160 may detect trunks of the rows of trees in the surrounding environment of the tractor 100A, repeatedly generate local map data indicating a distribution of the detected trunks of the rows of trees, and record it to the storage device 150. Furthermore, by joining together local map data, the ECU 160 may generate environment map data concerning the entire field (e.g., vineyard), or one section of the field. Environment map data may be generated for each section of the field. Without detecting trunks of the rows of trees at the stage of generating local map data, the ECU 160 may detect the trunks at the stage of generating final environment map data, and record the trunks in a format distinguishable from other objects. During the self-driving after generation of the environment map data, the ECU 160 performs matching between the sensor data that is output from the LiDAR sensor 110 and the environment map data, thereby estimating the position and orientation of the tractor 100A. Note that the ECU 160 may determine only the position of the tractor 100A through matching, and determine the orientation of the tractor 100A by utilizing the signals from the IMU 125.

The ECU 170 is a circuit that performs the process of determining a path of the tractor 100A. At a stage where no environment map data has been generated yet, the ECU 170 determines a path to be traveled by the tractor 100A based on the data or signals output from the LiDAR sensor 110 and the obstacle sensor(s) 130. For example, a path which goes between multiple rows of trees as detected based on the sensor data that is output from the LiDAR sensor 110 and which avoids obstacles is determined as a target path. During the self-driving after generation of the environment map data, based on the environment map data or on instructions from the user, the ECU 170 determines a target path (hereinafter also referred to as an "intended travel path").

The ECU 180 is a circuit that controls the drive device 140. The ECU 180 controls the drive device 140 based on the position and orientation of the tractor 100A estimated by the ECU 160, and the intended travel path determined by the ECU 170. The ECU 180 also performs the operation of generating a signal to control the operation of the implement 300, and transmitting this signal from the communication I/F 190 to the implement 300.

The ECUs 160, 170 and 180 may communicate with one another according to a vehicle bus standard such as CAN (Controller Area Network). Although the ECUs 160, 170 and 180 are illustrated as individual blocks In FIG. 8, each of these functions may be implemented by a plurality of ECUs. Alternatively, a single onboard computer that integrates the functions of the ECUs 160, 170 and 180 may be provided. The tractor 100A may include ECUs other than the ECUs 160, 170 and 180; any number of ECUs may be provided in accordance with functionality.

The communication I/F 190 is a circuit that performs communications with the communication I/F 390 of the implement 300 of the server 500. The communication I/F 190 performs exchanges of signals complying with a communication control standard such as ISOBUS under ISO 11783, for example, between itself and the communication I/F 390 of the implement 300. This causes the implement 300 to perform a desired operation, or allows information to be acquired from the implement 300. Moreover, the communication I/F 190 can communicate with an external computer via a wired or wireless network. For example, it may communicate with a server or other computer in a farming management system that manages the growth status of crops, the operating status of the tractor 100A, work records, and so on.

The operation terminal 200 is a terminal for the user to perform a manipulation related to the self-driving or automatic steering of the tractor 100A, and may be referred to as a virtual terminal (VT). The operation terminal 200 may include a display device such as a touch screen panel, and/or one or more buttons. By manipulating the operation terminal 200, the user can perform various manipulations, such as switching ON/OFF the self-driving mode or the automatic steering mode, setting an initial position of the tractor 100A, setting a path, recording or editing an environment map.

The drive device 340 in the implement 300 performs a necessary operation for the implement 300 to perform a predetermined task. The drive device 340 includes devices adapted to the intended use of the implement 300, e.g., a pump, a hydraulic device, or an electric motor.

The controller 380 controls the operation of the drive device 340. In response to a signal that is transmitted from the tractor 100A via the communication I/F 390, the controller 380 causes the drive device 340 to perform various operations.

Figure 9A:
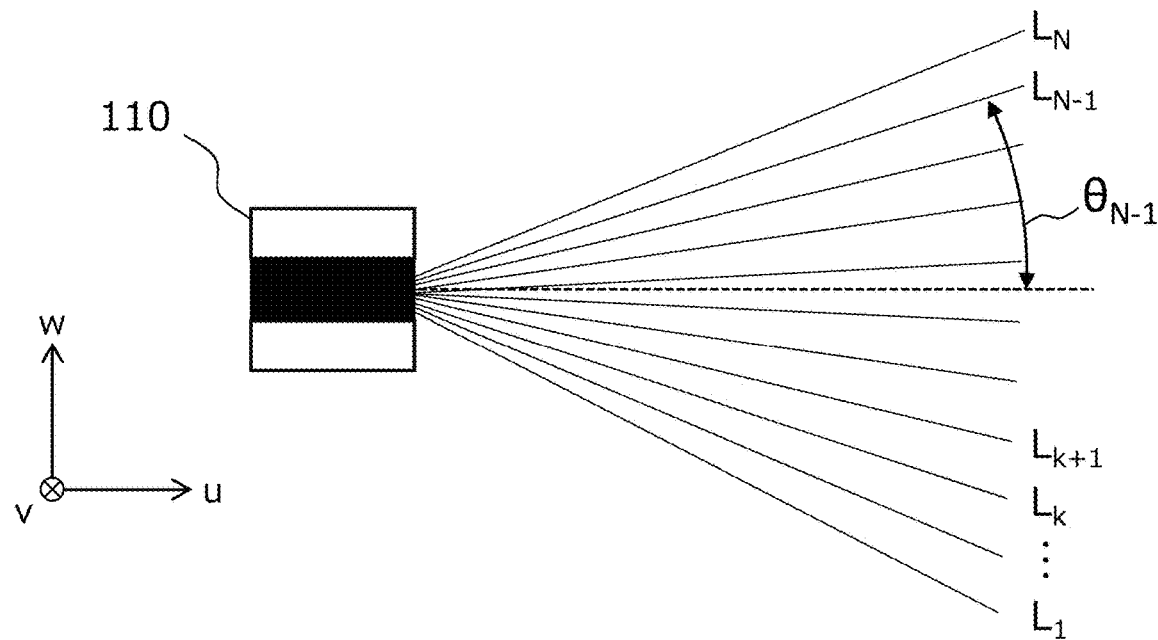
FIG. 9A is a schematic diagram of a LiDAR sensor as viewed in a lateral direction of the tractor.
Figure 9B:
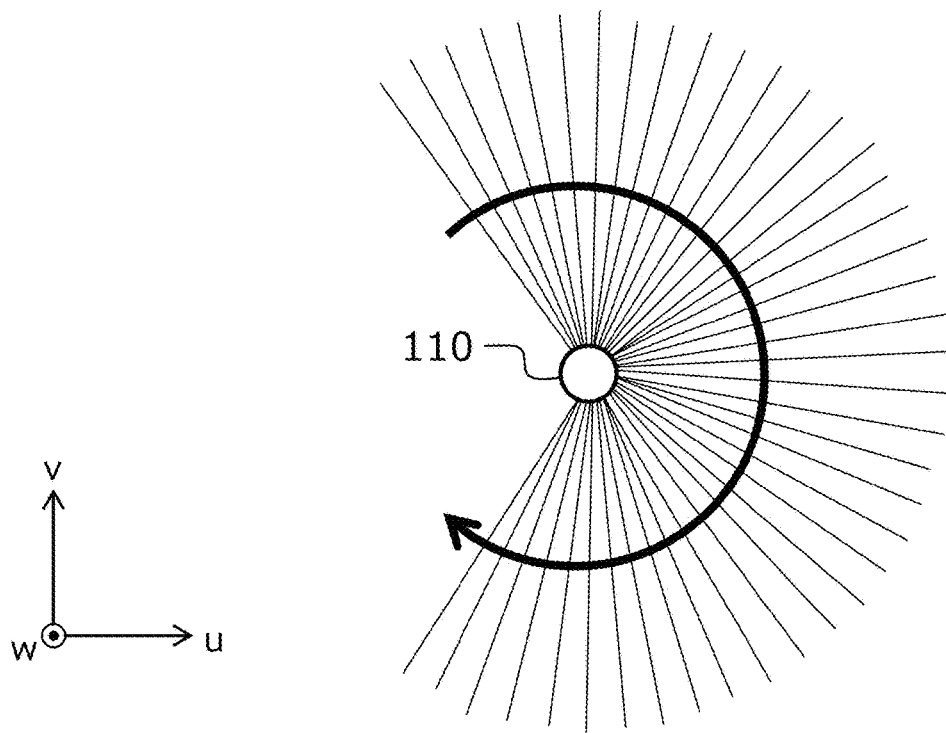
FIG. 9B is a schematic diagram of a LiDAR sensor as viewed from vertically above.

Next, with reference to FIGS. 9A and 9B, an exemplary configuration of the LiDAR sensor 110 will be described. The LiDAR sensor 110 in the present preferred embodiment is a scan-type sensor capable of acquiring information on the distance distribution of objects within a space by laser beam scanning. FIG. 9A is a schematic diagram of the LiDAR sensor 110 as viewed in a lateral direction of the tractor 100A. FIG. 9B is a schematic diagram of the LiDAR sensor 110 as viewed from vertically above. In FIGS. 9A and 9B, straight lines extending radially schematically represent the center axes (or traveling directions) of laser beams emitted from the LiDAR sensor 110. Although each laser beam is collimated into parallel light, it has an angle of spread of several milliradians (e.g., 0.1 to 0.2 degrees). Therefore, the cross-sectional size (spot diameter) of each laser beam increases in proportion to distance from the LiDAR sensor 110. For example, a light spot with a diameter of several centimeters may be formed 20 meters away from the LiDAR sensor 110. In the figure, for simplicity, the spread of each laser beam is ignored, and only the center axis of the laser beam is illustrated.

The LiDAR sensor 110 in the example of FIG. 9A is able to emit laser beams from a plurality of laser light sources that are arranged along the vertical direction, respectively at different angles of elevation. An angle of elevation is defined as an angle relative to the uv plane. In this example, the uv plane is essentially parallel to the horizontal plane. Note that, when the ground surface is inclined with respect to the horizontal plane, the uv plane and the horizontal plane will intersect. FIG. 9A illustrates N laser beams $L_1, \ldots, L_N$ being emitted. Herein, "N" is an integer of 1 or greater, and may be e.g., 10 or greater, and 64, or even 100 or greater, for high-performance models. Among the plurality of laser beams, a $k^{th}$ laser beam from the bottom has an angle of elevation $\theta_k$. As one example, FIG. 9A shows an angle of elevation $\theta_{N-1}$ of an $N-1^{th}$ laser beam. The angle of elevation of any laser beam going upward from the uv plane is defined as a "positive angle of elevation", whereas the angle of elevation of any laser beam going downward from the uv plane is defined as a "negative angle of elevation".

A LiDAR sensor having an N of 1 may be referred to as a "two-dimensional LiDAR", while a LiDAR sensor having an N of 2 or more may be referred to as a "three-dimensional LiDAR". When N is 2 or more, the angle made by the first laser beam and an $N^{th}$ laser beam is referred to as the "vertical viewing angle". The vertical viewing angle may be set in a range from about 20° to 60°, for example.

As shown in FIG. 9B, the LiDAR sensor 110 is able to change the outgoing directions (azimuth angles) of laser beams. FIG. 9B shows the outgoing directions of the plurality of laser beams shown in FIG. 9A as rotating around a rotation axis that is parallel to the w axis. The range of the outgoing directions (azimuth angles) of the laser beams may be 360°, or an angle range that is smaller than 360° (e.g., 210° or 270°). The range of azimuth angles of the outgoing directions of laser beams is referred to as the "horizontal viewing angle". The horizontal viewing angle may be set in a range from about 90° to 360°, for example. While rotating the outgoing directions of laser beams around a rotation axis that is parallel to the w axis, the LiDAR sensor 110 sequentially emits pulsed laser light (laser pulses) in directions of different azimuth angles. Thus, with pulsed laser light emitted at different angles of elevation and different azimuth angles, it is possible to measure the distance to each reflection point. Each reflection point corresponds to each individual point contained in the point cloud data. The operation of measuring the distance to each reflection point while the azimuth angles of laser beams make one rotation around the rotation axis is referred to as one scan. Sensor data that is obtained through one scan contains data that is measured for every layer that is associated with a certain angle of elevation as shown in FIG. 9A. Therefore, the greater the number of layers is, the greater the number of points in the point cloud that are obtained through one scan for the same environment. The LiDAR sensor 110 repeats scan operations with a frequency of about 1 to 20 times per second, for example. During one scan operation, 100,000 or more pulses of laser light may be emitted in different directions, for example.

Figure 10:
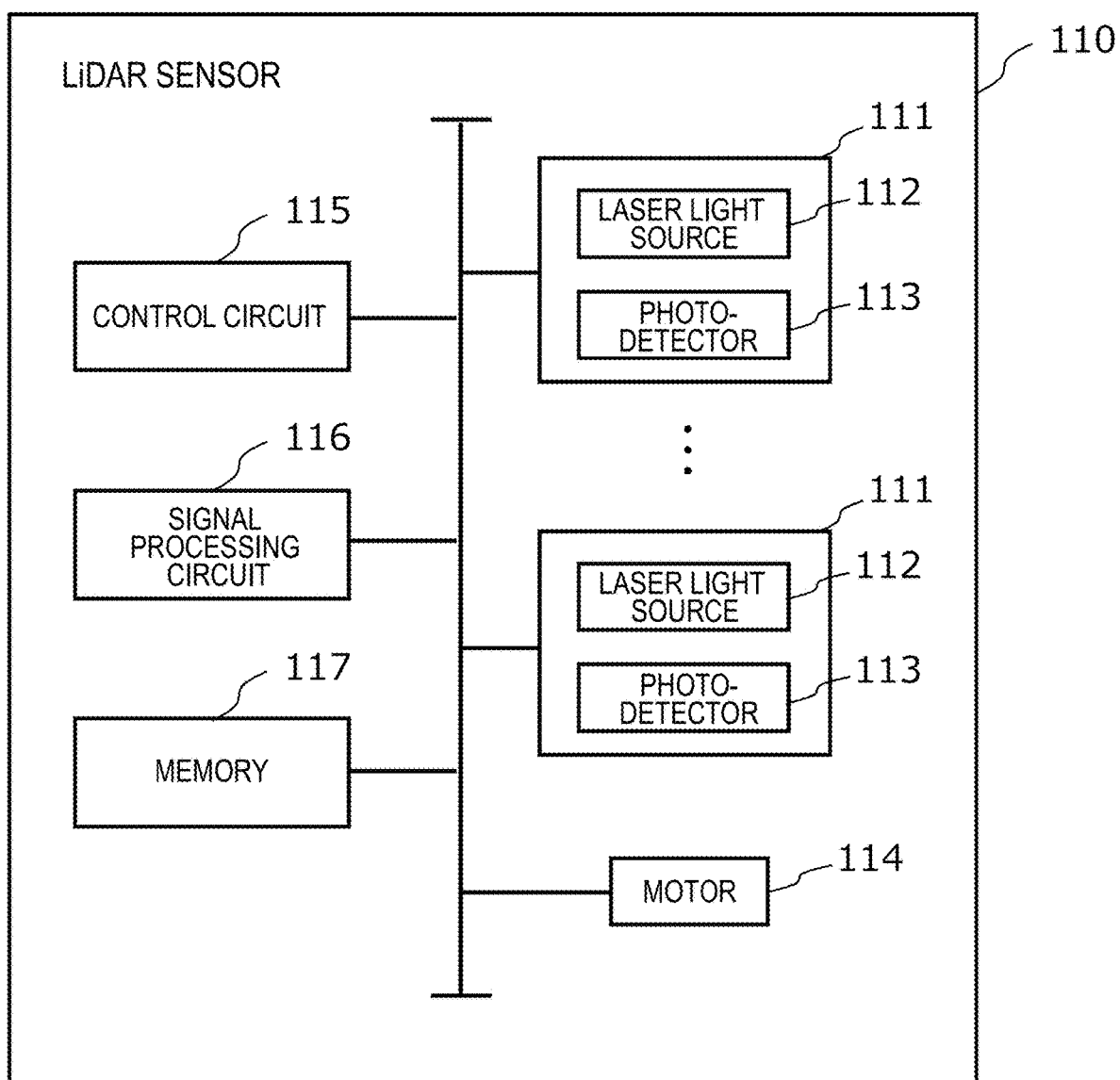
FIG. 10 is a block diagram showing an exemplary schematic configuration of a LiDAR sensor.

FIG. 10 is a block diagram showing an exemplary schematic configuration of the LiDAR sensor 110. As shown in FIG. 10, the LiDAR sensor 110 includes multiple laser units 111, an electric motor 114, a control circuit 115, a signal processing circuit 116, and a memory 117. Each laser unit 111 includes a laser light source 112 and a photodetector 113. Each laser unit 111 may include optics such as a lens(es) and a mirror(s), but they are omitted from illustration. By rotating a mirror that is placed on the optical path of a laser beam emitted from each laser light source 112, for example, the motor 114 changes the direction of the laser beam emitted from the respective laser light source 112.

Each laser light source 112 includes a laser diode, and emits a pulsed laser beam of a predetermined wavelength in response to a command from the control circuit 115. The wavelength of the laser beam may be a wavelength that is contained in the near-infrared wavelength region (approximately 700 nm to 2.5 µm), for example. The wavelength used depends on the material of the photoelectric conversion element used for the photodetector 113. In the case where silicon (Si) is used as the material of the photoelectric conversion element, for example, a wavelength around 900 nm may be mainly used. In the case where indium gallium arsenide (InGaAs) is used as the material of the photoelectric conversion element, a wavelength of not less than 1000 nm and not more than 1650 nm may be used, for example. Note that the wavelength of the laser beam is not limited to the near-infrared wavelength region. In applications where influences of ambient light are not a problem (e.g., for nighttime use), a wavelength contained in the visible region (approximately 400 nm to 700 nm) may be used. Depending on the application, the ultraviolet wavelength region may also be used. In the present specification, any radiation in the ultraviolet, visible light, and infrared wavelength regions in general is referred to as "light".

Each photodetector 113 is a device to detect laser pulses that are emitted from the laser light source 112 and reflected or scattered by an object. The photodetector 113 includes a photoelectric conversion element such as an avalanche photodiode (APD), for example. The photodetector 113 outputs an electrical signal which is in accordance with the amount of received light.

In response to a command from the control circuit 115, the motor 114 rotates the mirror that is placed on the optical path of a laser beam emitted from each laser light source 112. This realizes a scan operation that changes the outgoing directions of laser beams.

The control circuit 115 controls emission of laser pulses by the laser light sources 112, detection of reflection pulses by the photodetectors 113, and rotational operation by the motor 114. The control circuit 115 can be implemented by a circuit that includes a processor, e.g., a microcontroller unit (MCU), for example.

The signal processing circuit 116 is a circuit to perform computations based on signals that are output from the photodetectors 113. The signal processing circuit 116 uses a ToF (Time of Flight) technique to calculate a distance to an object that has reflected a laser pulse emitted from a laser light source 112, for example. ToF techniques include direct ToF and indirect ToF. Under direct ToF, the time from the emission of a laser pulse from the laser light source 112 until reflected light is received by the photodetector 113 is directly measured to calculate the distance to the reflection point. Under indirect ToF, a plurality of exposure periods are set in the photodetector 113, and the distance to each reflection point is calculated based on a ratio of light amounts detected in the respective exposure periods. Either the direct ToF or indirect ToF method may be used. The signal processing circuit 116 generates and outputs sensor data indicating the distance to each reflection point and the direction of that reflection point, for example. Furthermore, the signal processing circuit 116 may calculate coordinates (u, v) or (u, v, w) in the sensor coordinate system based on the distance to each reflection point and the direction of that reflection point, and include these in the sensor data for output.

Although the control circuit 115 and the signal processing circuit 116 are two separate circuits in the example of FIG. 10, they may be implemented as a single circuit.

The memory 117 is a storage medium to store data that is generated by the control circuit 115 and the signal processing circuit 116. For example, the memory 117 stores data that associates the emission timing of a laser pulse emitted from each laser unit 111, the outgoing direction, the reflected light intensity, the distance to the reflection point, and the coordinates (u, v) or (u, v, w) in the sensor coordinate system. Such data is generated each time a laser pulse is emitted, and recorded to the memory 117. The control circuit 115 outputs such data with a predetermined cycle (e.g., the length of time required to emit a predetermined number of pulses, a half scan period, or one scan period). The output data is recorded in the storage device 150 of the tractor 100A.

Note that the method of distance measurement is not limited to the ToF technique, but other methods such as the FMCW (Frequency Modulated Continuous Wave) technique may also be used. In the FMCW technique, light whose frequency is linearly changed is emitted, and distance is calculated based on the frequency of beats that occur due to interferences between the emitted light and the reflected light.

<Operation>

Next, the operation of the tractor 100A will be described.

Figure 11:
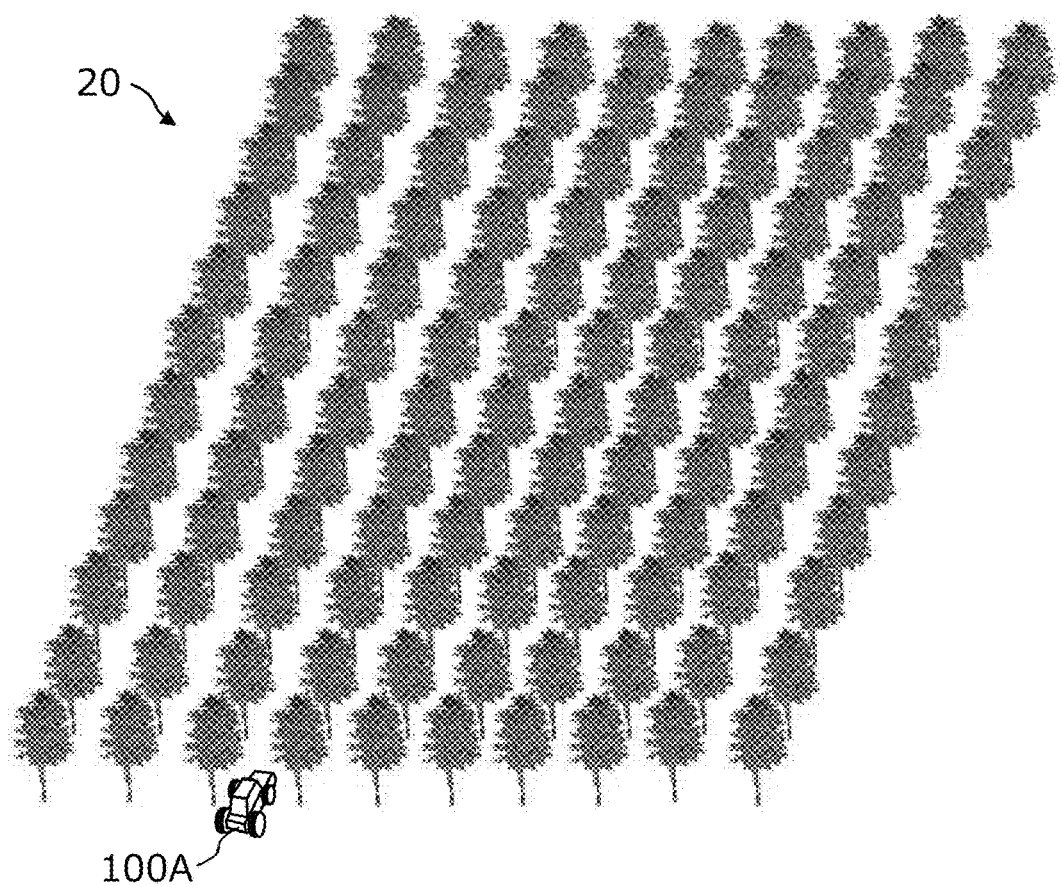
FIG. 11 is a diagram schematically showing an example of an environment in which a tractor travels.

FIG. 11 is a diagram schematically showing an example of an environment in which the tractor 100A travels. In this example, while traveling between multiple rows of trees 20 in a vineyard, the tractor 100A uses the implement 300 to perform predetermined tasks (e.g., mowing, preventive pest control, or the like). The sky over a vineyard is obstructed by branches and leaves, thus hindering self-driving using a GNSS. Also in a vineyard, the leaves of trees or the outer shapes of hedges change significantly with seasons. This makes it difficult use a point cloud map that is generated by conventional SLAM techniques throughout the seasons.

Therefore, in a preferred embodiment of the present disclosure, an environment map that is suitable for an orchard such as a vineyard is prepared, and self-driving of the tractor 100A is performed based on this environment map. For example, once planted, trees in a vineyard are unlikely to be replanted for long periods of time, and their trunks are less susceptible to seasonal changes in outer shape than are their leaves. By using trunks as landmarks for SLAM, it is possible to generate an environment map that is usable throughout the seasons, and perform self-driving tasks without having to regenerate environment maps throughout the year.

Hereinafter, operation of the tractor 100A will be specifically described. By using the sensor data that is output from the LiDAR sensor 110, the ECU 160 first generates environment map data indicating a distribution of trunks of rows of trees 20 in the entire vineyard or one section of the vineyard, and records it to the storage device 150. Generation of the environment map data is performed by repeating localization by the localization module 162 and generation of local map data by the map data generating module 164. The map data generating module 164 repeats the operation of: while performing localization based on sensor data that is repeatedly output from the LiDAR sensor 110 while the tractor 100A is moving, detecting trunks of the rows of trees in the surrounding environment of the tractor 100A, and generating local map data indicating a distribution of the detected trunks of the rows of trees and recording it to the storage device 150. The map data generating module 164 generates the environment map data by joining together local map data that are generated while the tractor 100A travels in the entire vineyard or one section of the vineyard. This environment map data is data recorded in a format that allows the distribution of trunks of the rows of trees 20 in the environment to be distinguished from other objects. Thus, in the present preferred embodiment, the trunks of the rows of trees 20 are used as landmarks for SLAM.

One or more posts may be provided in an area where multiple rows of trees are placed. For example, in a vineyard, generally, multiple posts are provided near the trees to create a hedge construction. Similarly to the tree trunks, posts are less likely to change their outer shape from season to season, and therefore are suitable as landmarks. Therefore, the localization module 162 may further detect posts in the surrounding environment of the tractor 100A based on sensor data, and the map data generating module 164 may generate environment map data that indicates not only the distribution of the trunks but also the distribution of the posts.

Once environment map data is generated, self-driving or autonomous driving by the tractor 100A becomes possible. During travel of the tractor 100A, the localization module 162 of the ECU 160 detects the trunks of the rows of trees 20 in the surrounding environment based on the sensor data that is repeatedly output from the LiDAR sensor 110, and performs matching between the detect trunks of the rows of trees 20 and the environment map data, thereby estimating the position of the tractor 100A. If the environment map data contains distribution information of posts, the localization module 162 may perform matching between the trunks of the rows of trees and the posts as detected based on the sensor data and the environment map data, thereby estimating the position of the tractor 100A. The ECU 180 for drive control is a controller to control the movement of the tractor 100A in accordance with the position of the tractor 100A estimated by the ECU 160. For example, when deviating from an intended travel path determined by the ECU 170, the ECU 180 adjusts steering of the tractor 100A so as to come closer to the intended travel path. Such steering control may be performed based not only on the position but also on the orientation of the tractor 100A.

An environment map indicating a distribution of trunks of the rows of trees 20 can be generated at any arbitrary timing. For example, the environment map may be generated in a season when there are few leaves on the trees, e.g., winter. In that case, it is easier to generate an environment map that more accurately reflects the distribution of the trunks than in the case of generating an environment map in a season with many leaves on the trees, e.g., summer. When the environment map is generated in winter, the ECU 160 may perform localization based on that environment map not only in winter but also in any other season. In that case, the ECU 160 performs localization by performing matching between the environment map data generated during winter and the data obtained by eliminating portions other than the trunks from the sensor data that is output from the LiDAR sensor 110.

The ECU 160 may generate data indicating a distribution of the trunks of the rows of trees as detected based on the sensor data that is repeatedly acquired during travel of the tractor 100A, and update the environment map data by using this data. For example, the ECU 160 may update the environment map data by adding information of the trunks detected from newly acquired sensor data to the environment map data that was generated in the previous run. Alternatively, data indicating the distribution of the detected trunks of the rows of trees may be transmitted to an external device that updates the environment map data. In that case, the ECU 160 includes information indicating the estimated position of the tractor 100A in the data indicating the distribution of the trunks (e.g., local map data) and outputs it. The external device may update the environment map data by using the acquired data, and transmit an updated environment map data to the tractor 100A. Through such operation, even if the traveling environment has changed since the point in time of generating the environment map due to tree growth or the like, an environment map that reflects such change can be newly generated.

Figure 12:
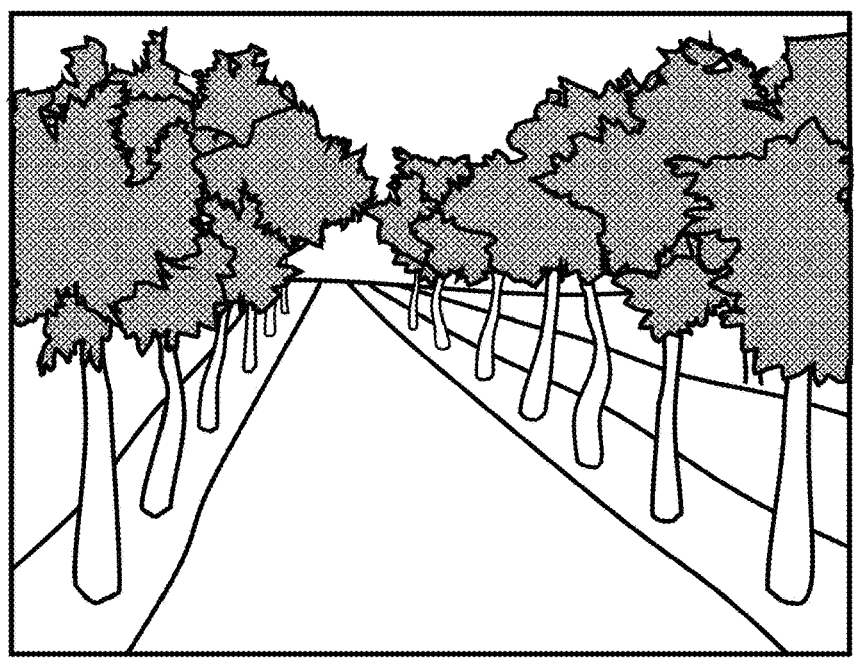
FIG. 12 is a perspective view schematically showing the surrounding environment of a tractor.

FIG. 12 is a perspective view schematically showing an example of the surrounding environment of the tractor 100A. The tractor 100A travels between two adjacent rows of trees in a vineyard. While traveling, the tractor 100A uses the LiDAR sensor 110 to scan the surrounding environment with laser beams. In this manner, data indicating a distance distribution of objects existing in the environment is acquired. The data indicating the distance distribution is converted into two-dimensional or three-dimensional point cloud data, and recorded. By integrating the point cloud data repeatedly acquired while traveling in the vineyard, the tractor 100A generates environment map data indicating a distribution of the trunks of the rows of trees in the entire vineyard, or one section of the vineyard. Integration of the point cloud data includes the process of converting the coordinates of multiple reflection points acquired at different timings into coordinates in a world coordinate system that is fixed to the globe, and joining them together. In the present preferred embodiment, the ECU 160 of the tractor 100A generates the environment map data; alternatively, a computer provided externally to the tractor 100A may generate the environment map data.

Figure 13A:
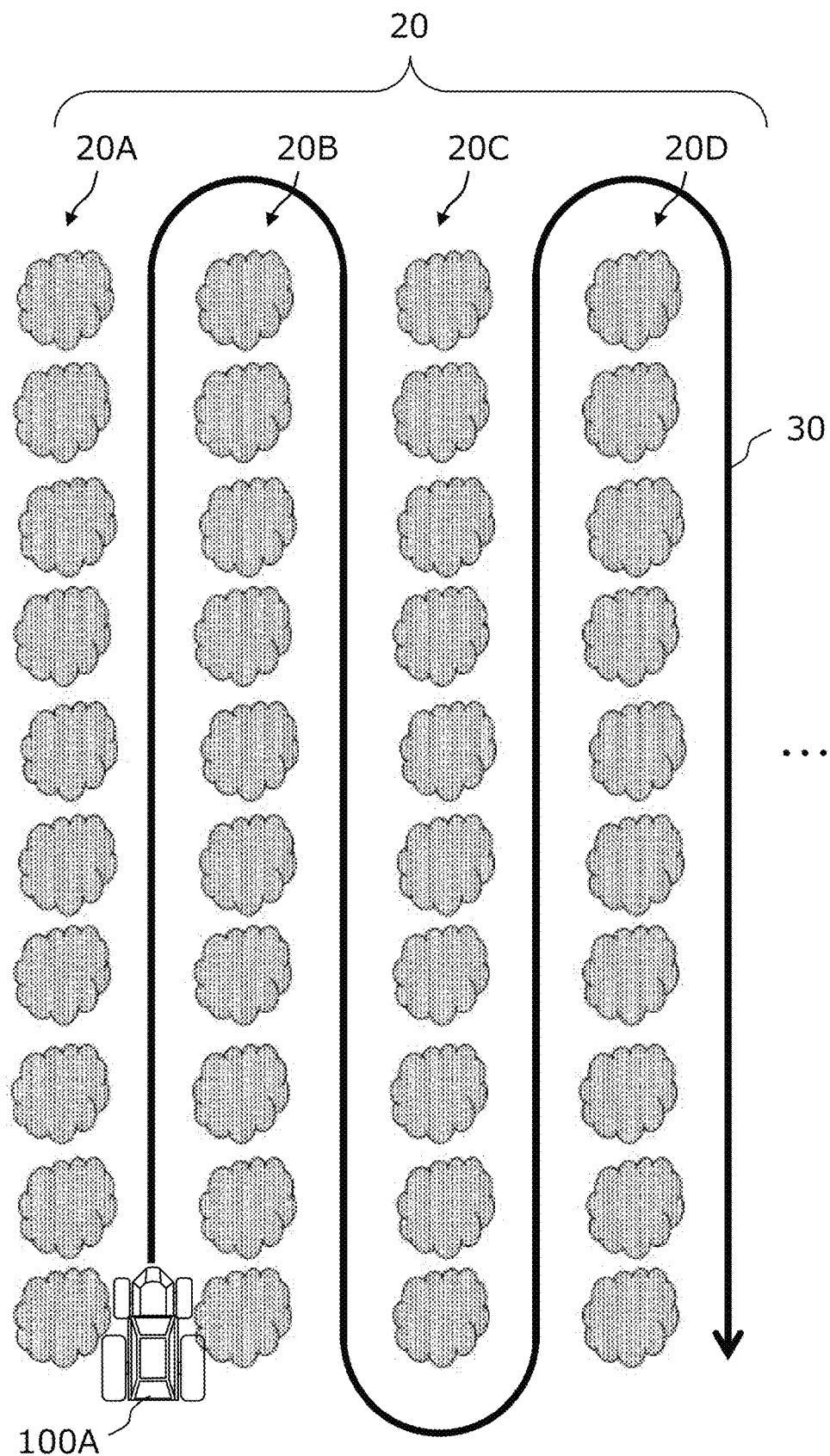
FIG. 13A is a diagram schematically showing an example of a travel path of a tractor.
Figure 13B:
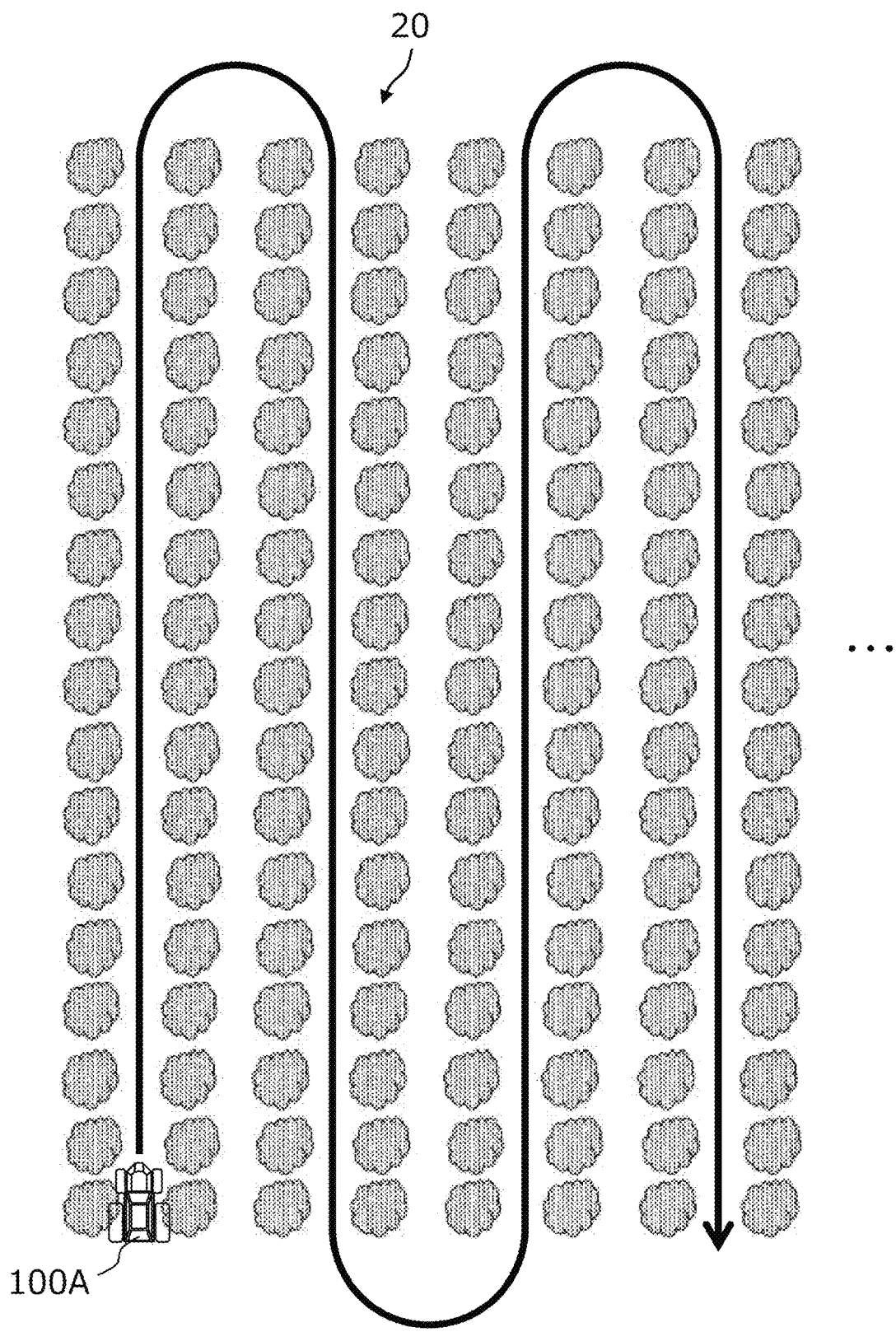
FIG. 13B is a diagram schematically showing another example of a travel path of a tractor.

FIG. 13A is a diagram schematically showing an example of a travel path of the tractor 100A when generating an environment map and during self-driving. The tractor 100A travels between multiple rows of trees 20 in the vineyard along a path 30 indicated by an arrow in FIG. 13A, for example. Although this figure illustrates any line segment included in the path 30 to be a straight line, the path along which the tractor 100A actually travels may include meandering portions. Now, the multiple rows of trees 20 are sequentially designated as a first row of trees 20A, a second row of trees 20B, a third row of trees 20C, a fourth row of trees 20D, . . . , from the end. In the example of FIG. 13A, the tractor 100A first travels between the first row of trees 20A and the second row of trees 20B, and upon completing this travel, turns around to travel between the second row of trees 20B and the third row of trees 20C in the opposite direction. Once the travel between the second row of trees 20B and the third row of trees 20C is completed, it further turns to travel between the third row of trees 20C and the fourth row of trees 20D. Thereafter, by repeating a similar operation, it travels to the final end of the path 30, which will be in between the last two rows of trees. In the case where the distance between adjacent rows of trees is short, as shown in FIG. 13B, it may travel so as to go along every other row. In this case, after the travel between the last two rows of trees is completed, an operation of traveling between untraveled rows of trees, so as to go along every other row, may be performed. Such travel is automatically performed as the tractor 100A conducts localization by using the LiDAR sensor 110. At timings when the GNSS unit 120 is able to receive a GNSS signal, positioning may be conducted based on the GNSS signal. For example, at any timing of turning around along the path 30 illustrated in either FIG. 13A or 13B, no leaves exist to obstruct the GNSS signal, and therefore positioning based on the GNSS signal is possible.

<Example of Sensor Data Acquisition>

Next, with reference to FIG. 14A to FIG. 17C, an example of sensor data acquisition by the tractor 100A will be described. When an environment map has already been established, sensor data is used for estimating the position of the tractor 100A through matching against the environment map. On the other hand, when no environment map has been established, or at least a portion of an environment map is to be updated, establishment or update of the environment map is performed based on sensor data. The establishment and update of the environment map do not need to be made during travel of the tractor 100A, but may be carried out as the sensor data acquired during travel of the tractor 100A is processed inside the tractor 100A or at an external computer.

Figure 14A:
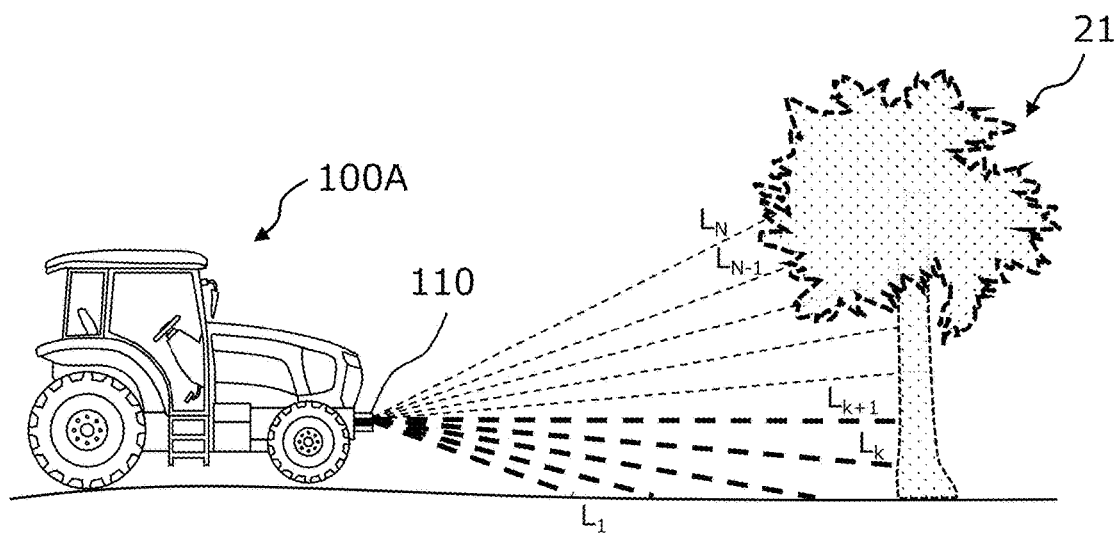
FIG. 14A is a diagram schematically showing a tree and the ground surface being irradiated with laser beams emitted from the LiDAR sensor of the tractor.
Figure 14B:
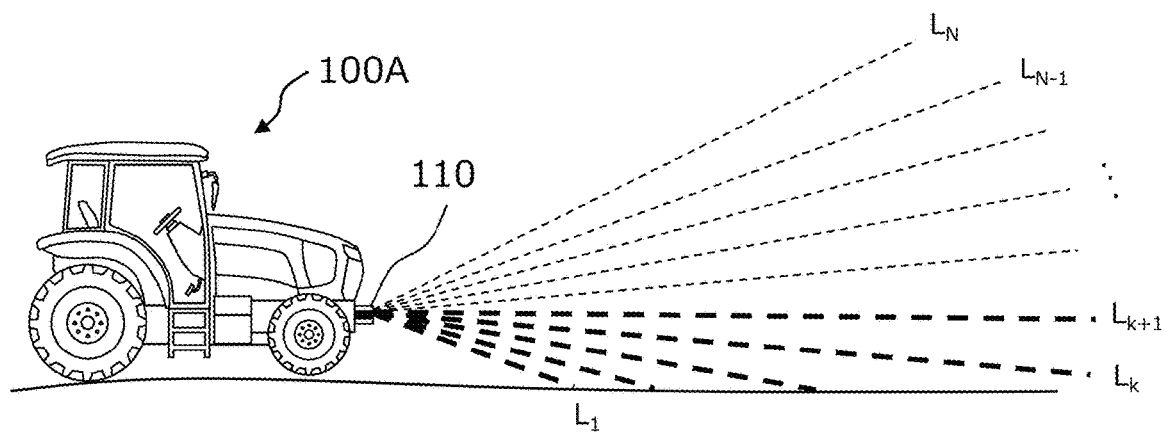
FIG. 14B is a diagram schematically showing the ground surface being irradiated with laser beams emitted from the LiDAR sensor.

FIG. 14A is a diagram schematically showing a tree 21 and the ground surface being irradiated with laser beams emitted from the LiDAR sensor 110 of the tractor 100A. FIG. 14B is a diagram schematically showing the ground surface being irradiated with laser beams emitted from the LiDAR sensor 110. In these figures, laser beams which are emitted in directions of negative angles of elevation from the LiDAR sensor 110 are depicted with thick broken lines, whereas laser beams which are emitted in directions of positive angles of elevation from the LiDAR sensor 110 are depicted with thin broken lines. Among the plurality of laser beams which are emitted at different angles of elevation from the LiDAR sensor 110, laser beams which are emitted in directions of negative angles of elevation may, unless striking the tree 21, be reflected from the ground surface. On the other hand, unless striking the tree 21, laser beams which are emitted in directions of positive angles of elevation do not create reflection points, and the reflection points when striking the tree 21 are likely to be located on the surface of the leaves and branches. As described earlier, any reflection points located on the surface of the leaves and branches are not suitable for matching against the environment map data. Therefore, in the present preferred embodiment, reflection at the trunks is utilized to perform localization and establishment of the environment map. Specifically, trunks may be detected based on reflection points of, among the plurality of laser beams emitted at different angles of elevation from the LiDAR sensor 110, laser pulses emitted from laser light sources whose angle of elevation is contained in a predetermined range. Moreover, trunks may be detected based on reflection points whose height is lower than the average height of trunks. In these cases, after trunk detection, reflection points that are located on the ground surface may be selectively eliminated from the point cloud in the sensor data.

Figure 15A:
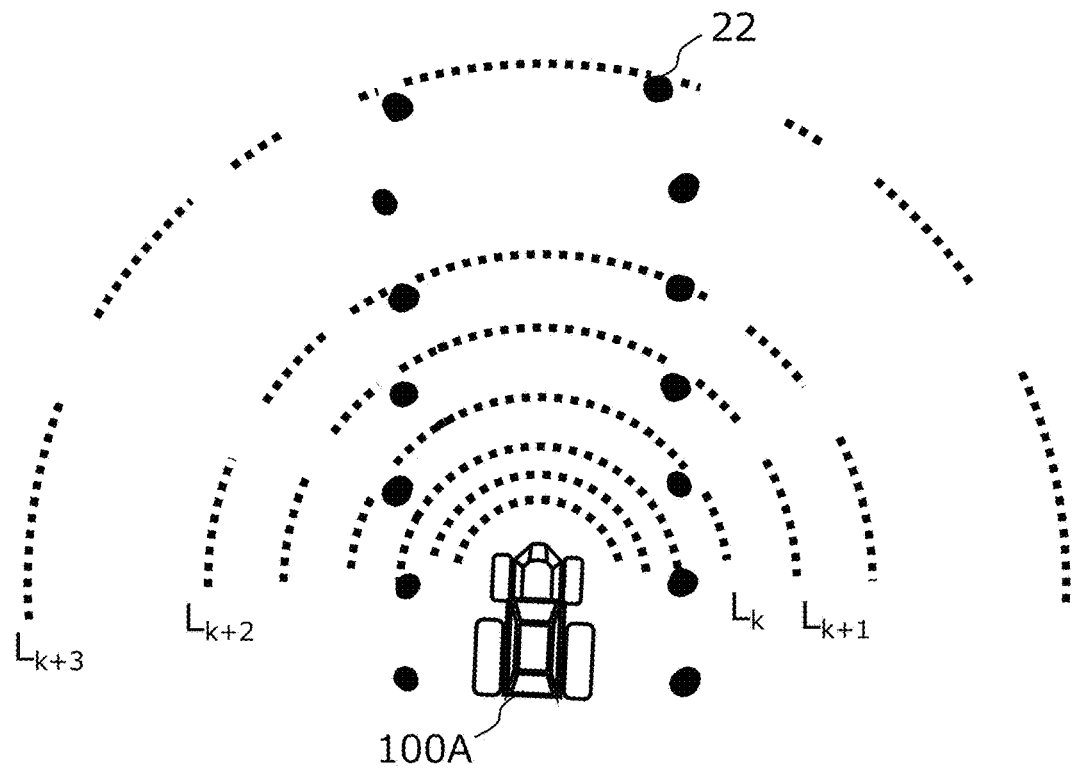
FIG. 15A is a diagram schematically showing an example of a tractor and a distribution of reflection points of laser pulses radiated from the LiDAR sensor at a certain point in time.
Figure 15B:
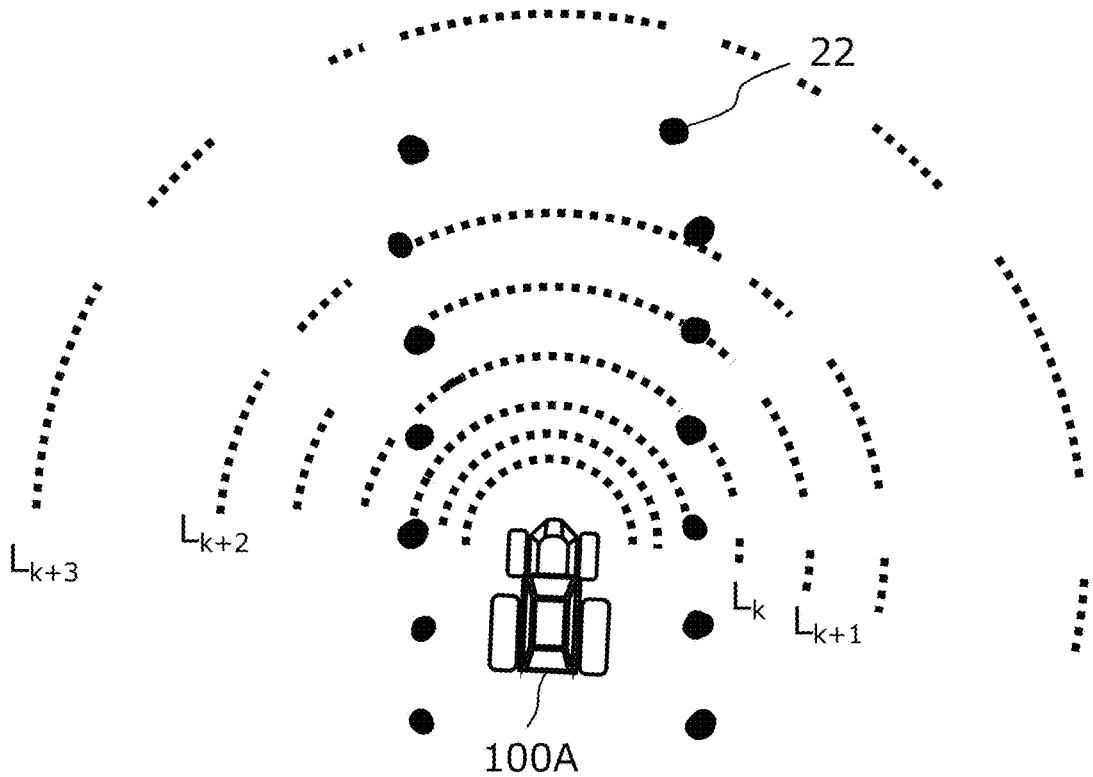
FIG. 15B is a schematically showing an example of a tractor and a distribution of reflection points of laser pulses radiated from the LiDAR sensor at a point in time slightly later than the point in time of FIG. 15A.

FIGS. 15A and 15B are plan views schematically showing examples of point clouds in sensor data acquired through one scan operation by the LiDAR sensor 110 of the tractor 100A. FIG. 15A schematically shows an example of a tractor 100A and a distribution of reflection points of laser pulses radiated from the LiDAR sensor 110 at a certain point in time. In this example, the ground surface is assumed to be a flat surface. A laser beam that is reflected from the ground surface creates a reflection point(s) on a circular arc on the ground surface. Such reflection points on the ground surface are created by laser beams which are emitted in directions of negative angles of elevation. In FIG. 15A, reflection points are present on seven circular arcs of different radii (corresponding to seven layers). Each layer is created through a scan in which a laser beam that is emitted in a different negative angle of elevation rotates in the azimuth angle direction. While this scan is being performed, a laser beam scans may also be performed in the horizontal direction or in any direction of a positive angle of elevation. Note that reflection points that are on the same layer are created by a laser beam that is emitted from the same laser light source at the same angle of elevation, as the laser beam strikes the object surface in pulse form while rotating. FIG. 15B schematically shows an example of a tractor 100A and a distribution of reflection points of laser pulses radiated from the LiDAR sensor 110 at a point in time slightly later than the point in time of FIG. 15A.

Some of the laser pulses radiated from the LiDAR sensor 110 are reflected at the surface of trunks 22 of trees. Some of the laser pulses that are reflected from the ground surface, the trunks 22 of trees, or other objects are detected by the LiDAR sensor 110 and their distances to the reflection points are measured, unless the reflection points are located far beyond measurable distance (e.g., 50 m, 100 m, or 200 m). For example, for each reflection point, the LiDAR sensor 110 generates sensor data that associates a distance to the reflection point, a direction of the reflection point, a reflected light intensity, and an identification number of the laser light source that emitted the laser beam that has created the reflection point. This sensor data may also include information of a time of measurement. The time of measurement information may be recorded for each reflection point, or a group of reflection points that were measured within a predetermined length of time, for example. The localization module 162 of the ECU 160 converts the sensor data that is output from the LiDAR sensor 110 into point cloud data. The point cloud data is data containing information of three-dimensional coordinates (u, v, w) of each reflection point as expressed by a sensor coordinate system that is fixed to the LiDAR sensor 110. In the case where the LiDAR sensor 110 converts the distance and direction data of each reflection point into point cloud data before outputting it, the localization module 162 omits conversion into point cloud data.

When establishing an environment map, while the tractor 100A is traveling, the map data generating module 164 generates, from the point cloud data, local map data in which the trunks 22 are recorded in a format that allows distinction from other portions. During travel of the tractor 100A, the map data generating module 164 repeats the operation of adding local map data based on newly-acquired sensor data to already generated local map data, thereby updating it. In this manner, the final environment map data can be generated. Note that the map data generating module 164 may only perform an operation of generating local map data and recording it during travel of the tractor 100A, and perform generation of the final environment map data after completion of travel. In that case, the final environment map data may be generated by an external computer.

In the present preferred embodiment, the LiDAR sensor 110 is attached to the front of the body of the tractor 100A. Therefore, as shown in FIGS. 15A and 15B, laser pulses are radiated frontward from the tractor 100A. A LiDAR sensor 110 may also be attached to the rear of the tractor 100A. In that case, point cloud data both frontward and rearward of the tractor 100A can be acquired at one time, whereby map data of a higher density of point cloud can be generated. Moreover, the accuracy of the matching-based localization during the self-driving after environment map generation can be improved. Furthermore, because point cloud data can be obtained from a broad range on the surface of each individual trunk 22, the thickness of the trunk 22 can be measured with a high accuracy from the point cloud data thereof. Thus, the ECU 160 also functions as a recording device that measures the thickness of each detected trunk in the rows of trees based on the sensor data, and records the thickness of each trunk to a storage medium. The storage medium may be a storage medium in the storage device 150, or any other storage medium. The trunk thickness may be added to the environment map data as one piece of attribute information concerning each landmark, or recorded in any other map data of vector format.

Figure 16:
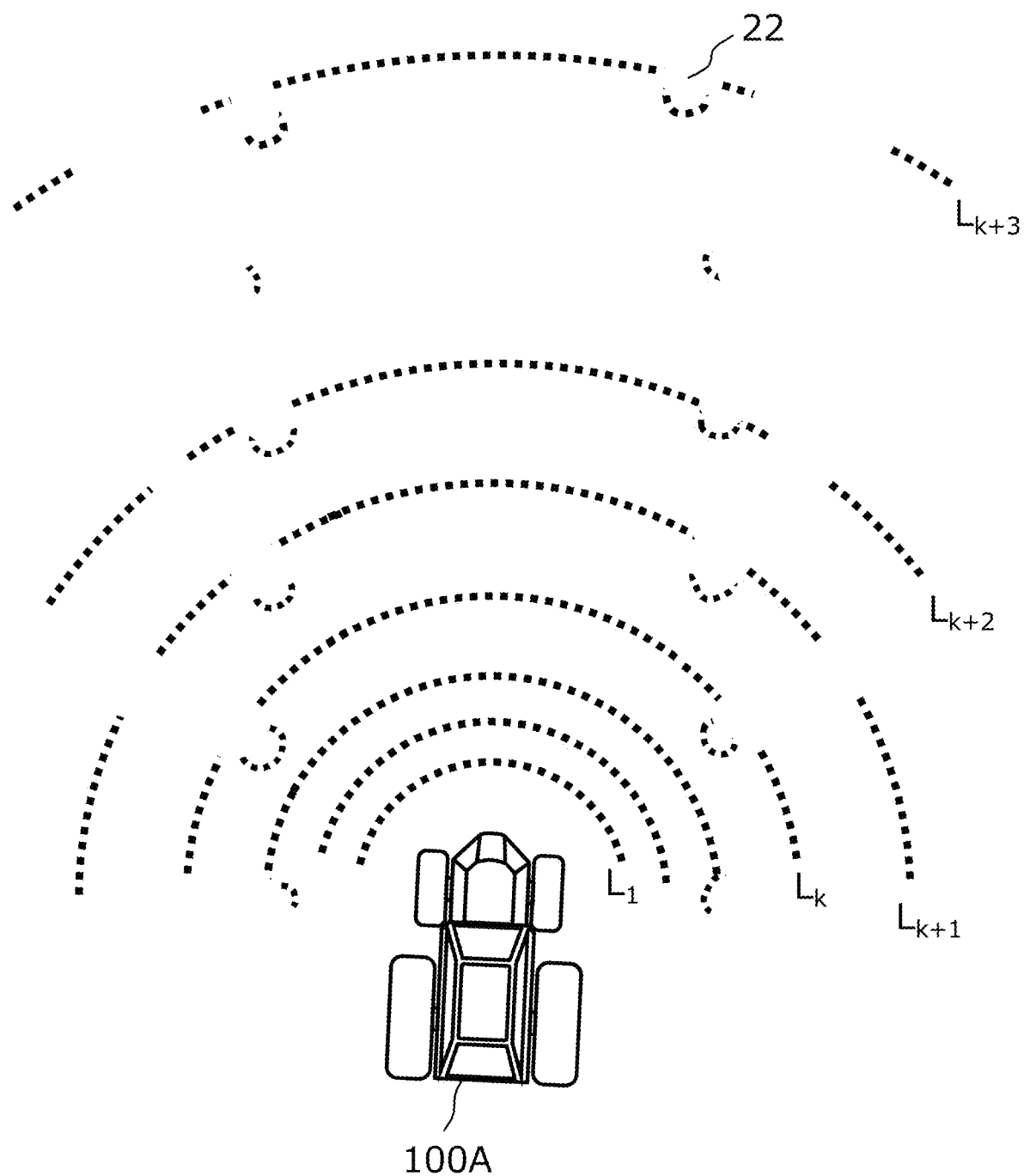
FIG. 16 is a diagram schematically showing an example point cloud of trunks obtained through one scan of laser beams in multiple layers.
Figure 17A:
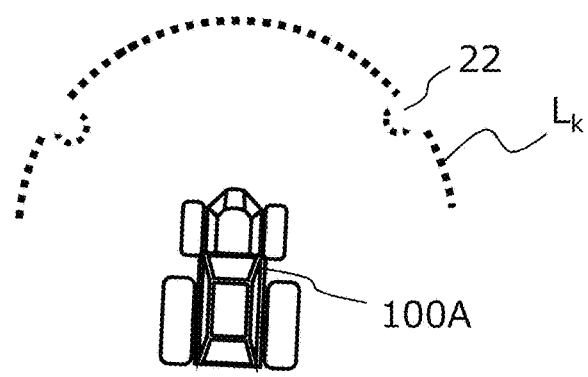
FIG. 17A is a diagram schematically showing a point cloud of trunks being obtained by a scan of laser beams in a layer $L_k$, $L_{k+1}$, $L_{k+2}$.
Figure 17B:
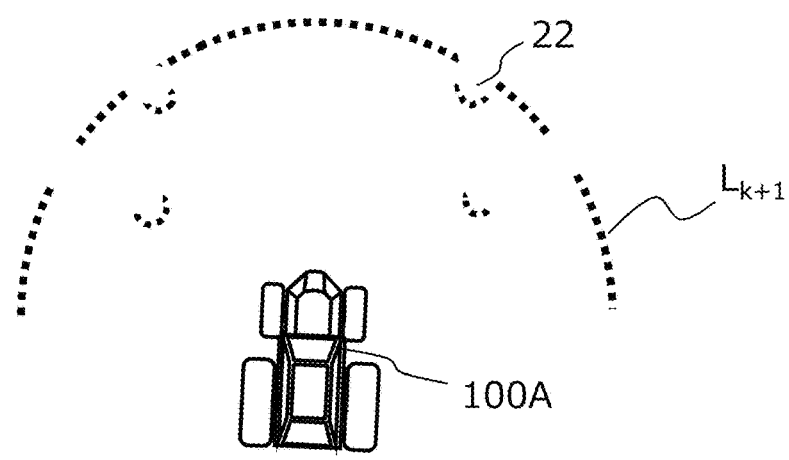
FIG. 17B is a diagram schematically showing a point cloud of trunks being obtained by a scan of laser beams in a layer $L_{k+1}$.
Figure 17C:
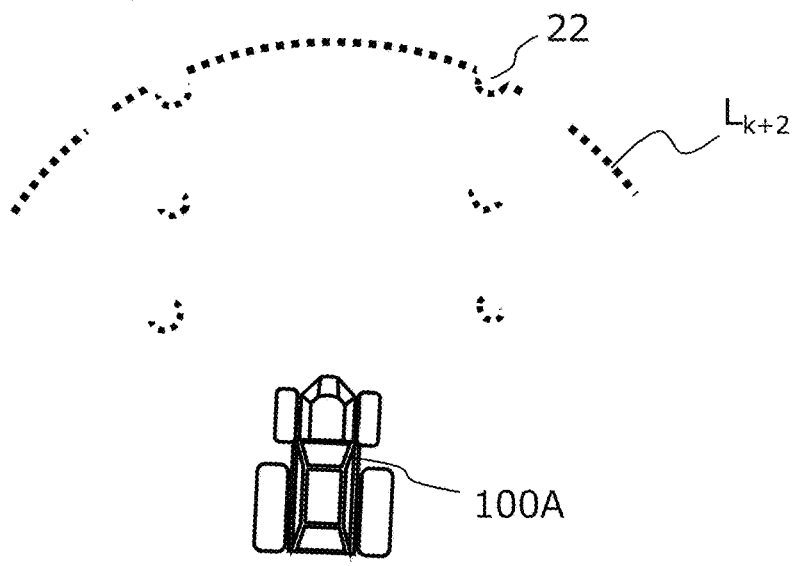
FIG. 17C is a diagram schematically showing a point cloud of trunks being obtained by a scan of laser beams in a layer $L_{k+2}$.

FIG. 16 is a diagram schematically showing an example point cloud of trunks 22 obtained through one scan of laser beams in multiple layers ($L_1, \ldots, L_{k+3}$). FIGS. 17A to 17C are diagrams schematically showing a point cloud of trunks 22 being obtained by a scan of laser beams in three layers ($L_k, L_{k+1}, L_{k+2}$), respectively, among the multiple layers shown in FIG. 16. As shown in this figure, point cloud data indicating a distribution of trunks 22 existing in the measurable range can be obtained through every scan. More specifically, when the distance to each individual reflection point is measured through one scan, each layer may include regions in which reflection points of relatively long distance are clustered and regions in which reflection points of relatively short distance locally appear.

Figure 18:
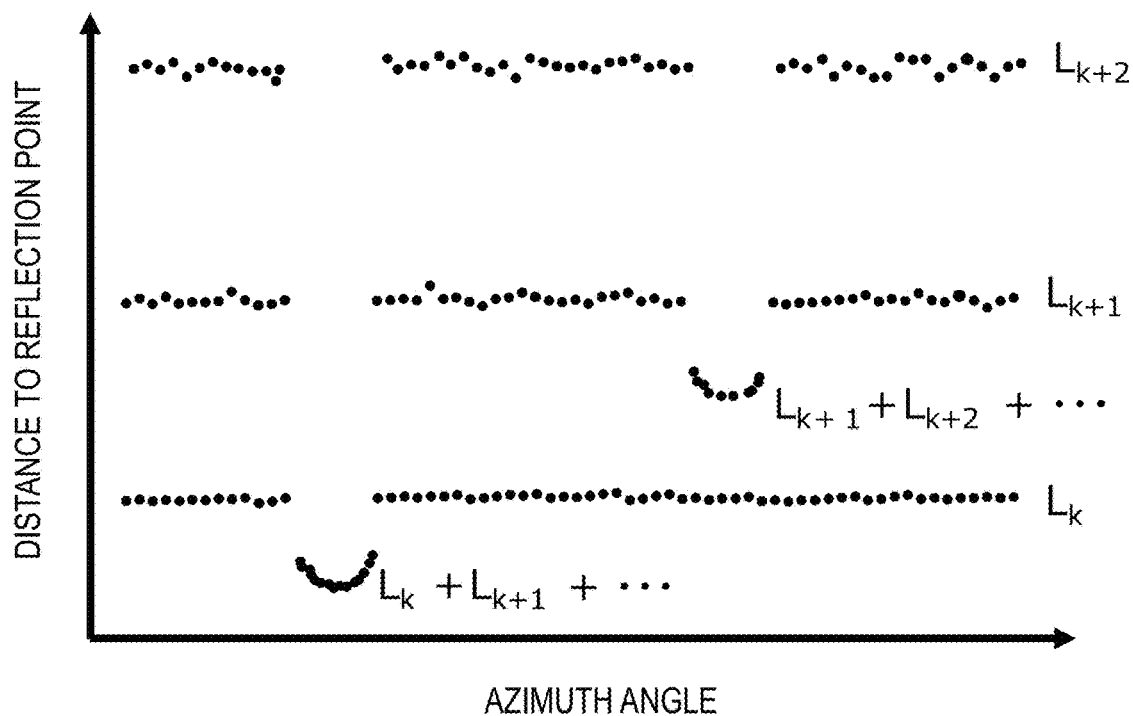
FIG. 18 is a graph showing an example relationship between: distances to reflection points that are measured by laser beams in multiple layers through one scan; and azimuth angles of the reflection points.

FIG. 18 is a graph showing an example relationship between: distances to reflection points that are measured by laser beams in multiple layers ($L_k, L_{k+1}, L_{k+2}, \ldots$) through one scan; and azimuth angles of the reflection points. The range of azimuth angles shown in FIG. 18 is so narrow that reflection from two trunks is shown in this range. In this example, main reflection points in each layer are located on the ground surface. Among the reflection points belonging to each individual layer, reflection points of relatively short distances are on a curve corresponding to the surface of a trunk. Regarding the two trunks, the trunk that is located at the shorter distance is irradiated with laser beams of layers $L_k, L_{k+1}, L_{k+2}, \ldots$ On the other hand, the trunk that is located at the longer distance is irradiated with laser beams of few layers $L_{k+1}, L_{k+2}, \ldots$ Therefore, when the point cloud on the surface of a trunk in a three-dimensional space is projected onto a plane that is parallel to the horizontal plane, the point cloud on the trunk at the shorter distance have a higher density. Based on the measurement result shown in FIG. 18, trunks can be detected. In reality, undulations or weeds may exist on the ground surface, and therefore measured values of distance are not as straightforward as illustrated in the figure.

As the tractor 100A repeats the aforementioned scan while moving, point cloud data with a high density can be acquired from each trunk located in the surroundings of the tractor 100A. Therefore, by using large amounts of sensor data that are acquired by the moving tractor 100A, it is possible to acquire point cloud data with a high density that is needed for the establishment of a high-accuracy environment map indicating a distribution of the trunks.

Note that, instead of distances to reflection points, relationships between the reflected light intensity and the azimuth angles of reflection points can be used in detecting the trunks. The reason is that the intensity of reflected light associated with laser beams in the same layer increases as the distance to the reflection point decreases.

As described earlier, sensor data (hereinafter also referred to as "scan data") to be compared against the environment map indicating a distribution of the trunks may contain many reflection points other than the reflection points that are located on the surface of trunks. Therefore, it is effective to select reflection points which are highly likely to be located on the surface of trunks from within the acquired scan data. Moreover, the scan data may produce point cloud data with a high density by integrating not only reflection points obtained through one scan but also reflection points obtained through multiple scans and acquired consecutively.

Although omitted in FIGS. 17A to 17C, a laser beam that is emitted at a positive angle of elevation, for example, may create many reflection points because of irradiating leaves and branches other than the trunk. From the point cloud data generated based on scan data, the ECU 160 in the present preferred embodiment extracts some points possessing characteristic aspects of the trunk 22, thereby generating data indicating a distribution of trunks 22.

Figure 19:
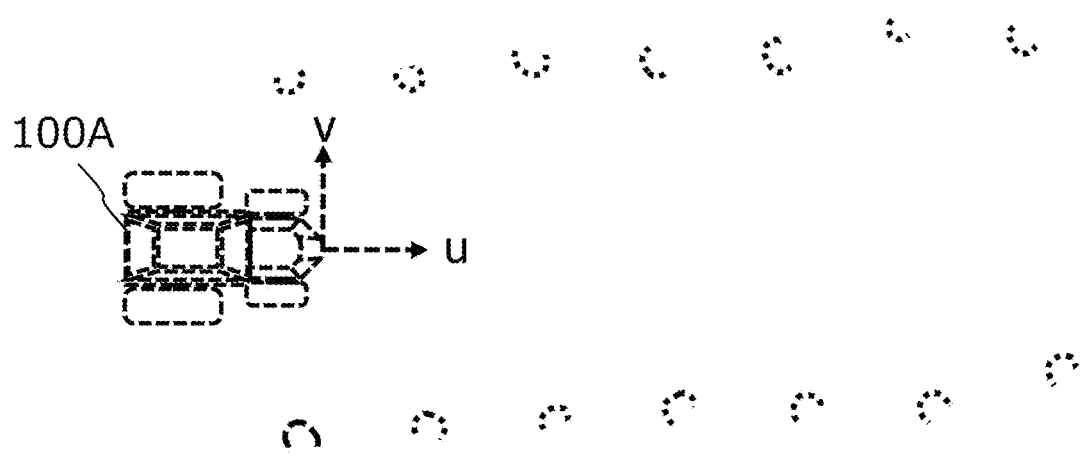
FIG. 19 is a diagram showing an example of a local map generated by extracting reflection points that are located on the surface of trunks from scan data that is acquired by a tractor being at a certain position.

FIG. 19 shows an example of a local map that was generated by extracting reflection points that are located on the surface of trunks from scan data that is acquired by the tractor 100A being at a certain position. In this example, a two-dimensional local map indicating a two-dimensional distribution of trunks is generated. In such a local map, coordinates of any trunk that is located in the surroundings of the tractor 100A at that position can be expressed by the uv coordinate system being fixed to the tractor 100A.

Figure 20A:
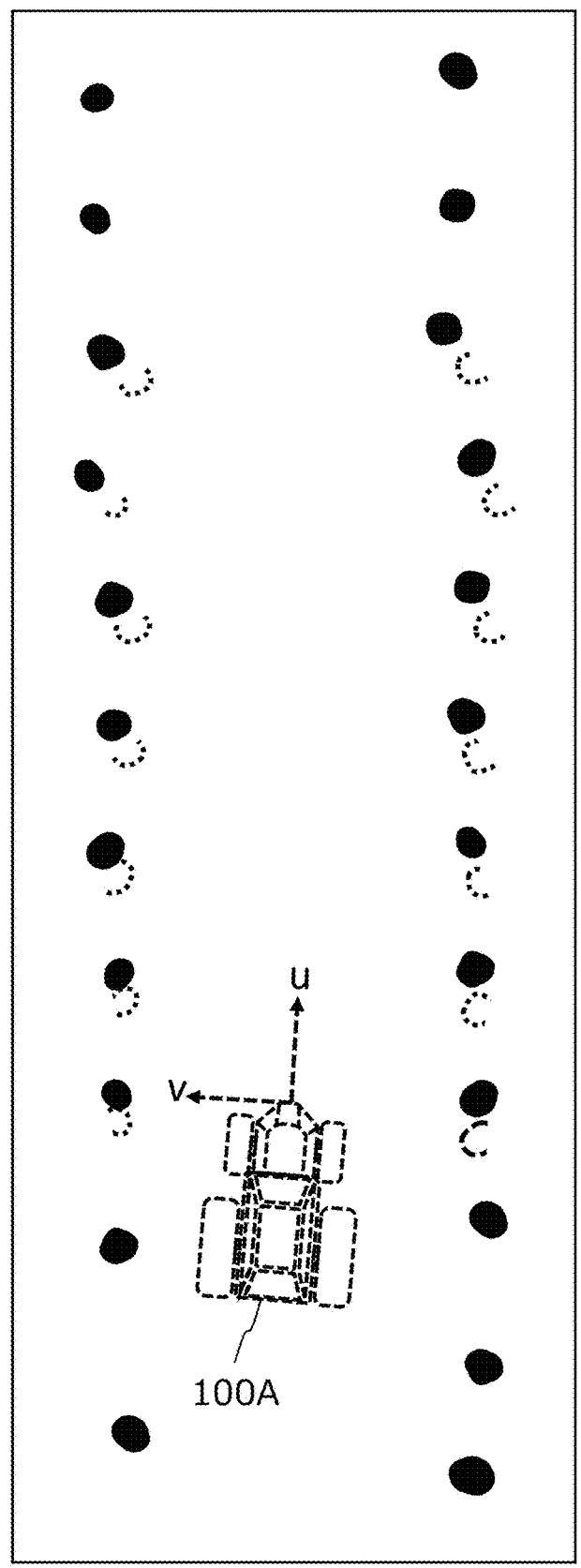
FIG. 20A is a plan view schematically showing a process of estimating the position of a mobile machine by matching a local map to an already-established environment map.
Figure 20B:
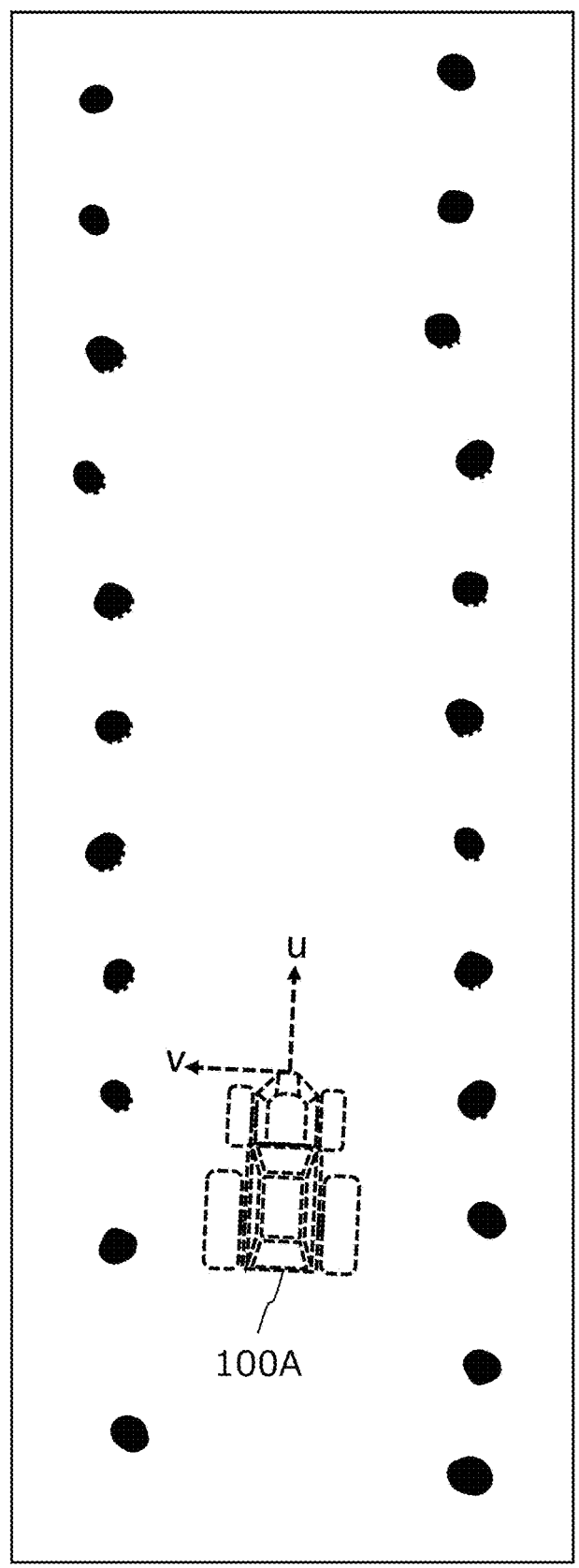
FIG. 20B is a plan view schematically showing a process of estimating the position of a mobile machine by matching a local map to an already-established environment map.

FIGS. 20A and 20B are plan views schematically showing a process of estimating the position of the tractor 100A by matching the local map of FIG. 19 to an already-established environment map. The respective coordinates in the local map are expressed by the sensor coordinate system, whereas the respective coordinates in the environment map are expressed by the world coordinate system. Matching means optimizing the coordinate transformation from the sensor coordinate system to the world coordinate system. Through such optimization of coordinate transformation, the position coordinates and orientation of the sensor in the world coordinate system are determined. In FIGS. 20A and 20B, the trunks in the environment map are depicted in dark color. FIG. 20A shows a state in the middle of matching. In this state, misalignments (errors) exist between the trunks on the local map and their corresponding trunks on the environment map. FIG. 20B shows state where matching has been completed. In this state, the misalignments (errors) between the trunks on the local map and their corresponding trunks on the environment map are minimized.

By thus using scan data in which the trunks are extracted and the environment map indicating a distribution of the trunks, localization with a high accuracy is achieved. Although the above example illustrates a matching based on a two-dimensional environment map, matching may be performed based on a three-dimensional environment map.

<Example Placements of LiDAR Sensor>

Next, with reference to FIGS. 21A and 21B, example placements of the LiDAR sensor 110 will be described.

Figure 21A:
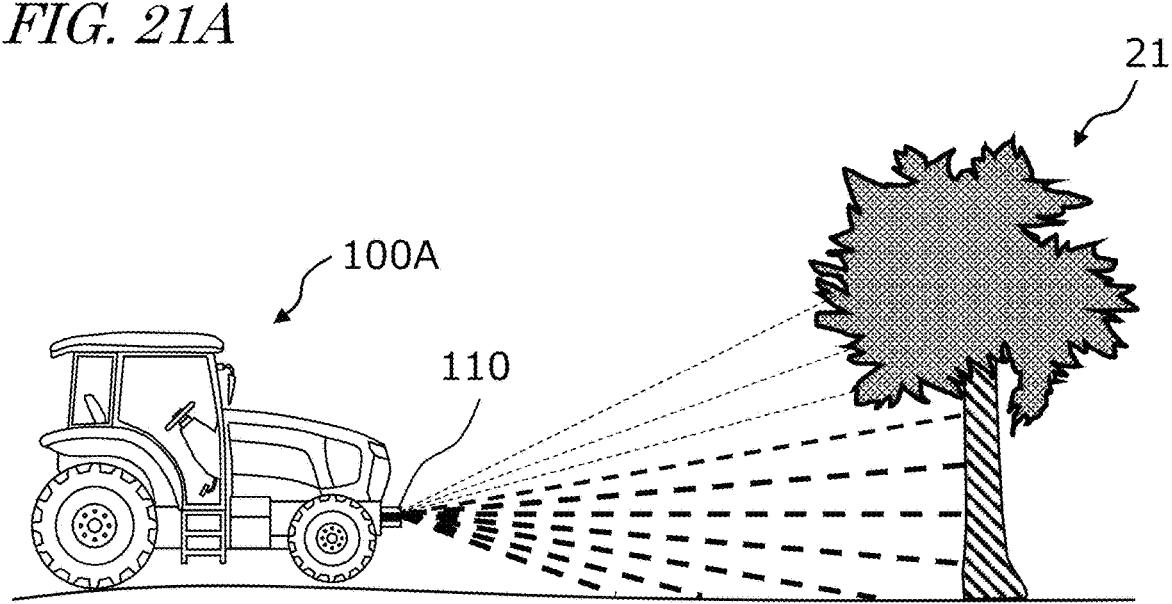
FIG. 21A is a diagram showing an example where a LiDAR sensor is attached to the lower front of a vehicle body of the tractor.

FIG. 21A shows an example where the LiDAR sensor 110 is attached to the lower front of the vehicle body of the tractor 100A, as in the present preferred embodiment. FIG. 21B shows an example where the LiDAR sensor 110 is attached to the upper front of the cabin of the tractor 100A. In these figures, thick broken lines represent laser beams which are radiated against the trunk of a tree 21, whereas thin broken lines represent laser beams which are emitted toward the leaves of the tree or the sky above them.

In the example of FIG. 21A, the LiDAR sensor 110 is mounted at a position that is lower than an average height of the trunks of the rows of trees. The average height of the trunks of the rows of trees is a mean value of the heights of the trunks of the trees included among the multiple rows of trees existing in an intended travel path of the tractor 100A. The height of the trunk of a tree is the distance from the ground surface to the portion of the tree that produces the lowest branches. The LiDAR sensor 110 may be disposed at a height of e.g., not less than 10 cm and not more than 150 cm, and in one example not less than 15 cm and not more than 100 cm, from the ground surface. By placing the LiDAR sensor 110 at such a low position, it becomes possible to irradiate the trunk with more laser beams, without being obstructed by the leaves and branches. Therefore, it becomes possible to determine the position of the trunk from the sensor data with a high accuracy.

Figure 21B:
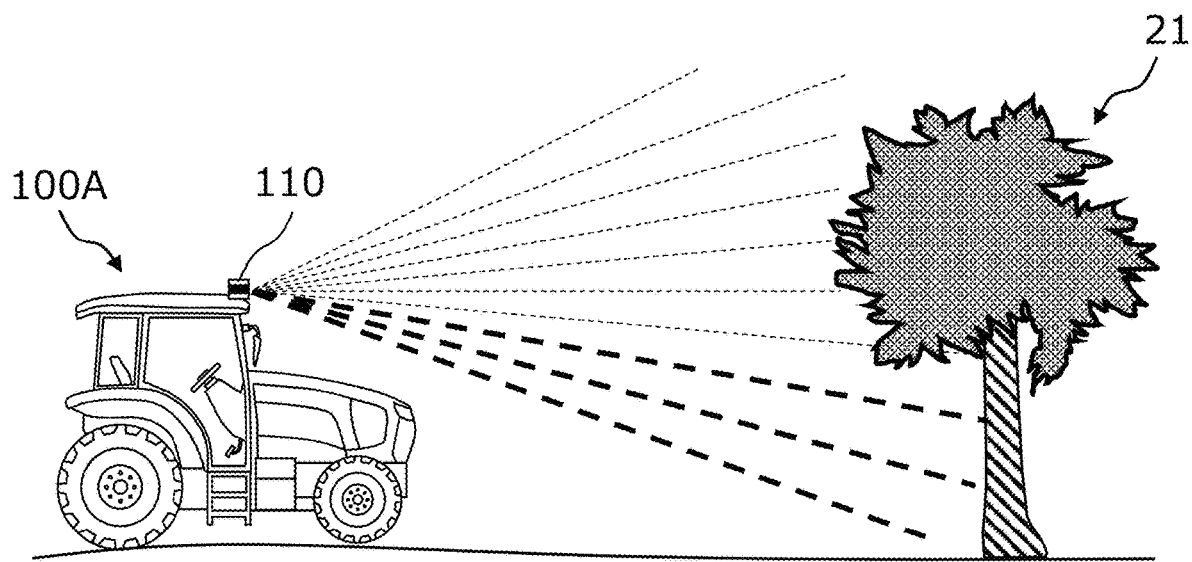
FIG. 21B is a diagram showing an example where a LiDAR sensor is attached to the upper front of a cabin of the tractor.

On the other hand, in the example of FIG. 21B, the LiDAR sensor 110 is placed at a high position (e.g., at a position of about 2 m from the ground surface), so that most of the laser beams irradiate not the trunk but the leaves. Therefore, the placement in FIG. 21B is not suitable for applications where point cloud data of the trunk is to be acquired. However, such a placement can efficiently acquire distribution information of the leaves of the rows of trees, and therefore is effective in applications where distribution information of the leaves is to be actively acquired. For example, the placement of FIG. 21B may be adopted for the purposes of managing the growth status of trees, or determining a path for avoiding the tree leaves. Even in the placement of FIG. 21B, attaching the LiDAR sensor 110 in a downward orientation will allow the trunk to be irradiate with more laser beams. Therefore, the placement shown in FIG. 21B may be adopted also in applications where a distribution data of the trunks is to be acquired. Without being limited to the lower front of the body or the upper front of the cabin, the LiDAR sensor 110 may be placed in other positions. For example, the LiDAR sensor 110 may be placed at a position lower than the height of the cabin.

Although a single LiDAR sensor 110 is used in the present preferred embodiment, the tractor 100A may include a plurality of LiDAR sensors. By combining sensor data that is output from the plurality of LiDAR sensors, distribution data of the trunks can be acquired more efficiently. The plurality of LiDAR sensors may be provided on the right and left of the tractor 100A, or at the front and the rear, for example. Details of preferred embodiments of mobile machines including a plurality of LiDAR sensors will be described later.

Among the plurality of laser light sources in the LiDAR sensor 110, the localization module 162 in the ECU 160 may detect trunks based on reflection points of those laser pulses emitted from laser light sources whose angle of elevation is contained in a predetermined range. For example, trunks may be detected based only on the reflection points of laser pulses which are emitted in directions of negative angles of elevation. The user may be allowed to set a range of angles of elevation of laser pulses to be used in trunk detection. For example, the user may be allowed to set a range of angles of elevation of laser pulses to be used for trunk detection through manipulation of the operation terminal 200. Among the laser pulses emitted from the LiDAR sensor 110, using only those laser pulses emitted in a specific range of angles of elevation which are highly likely to irradiate the trunks will allow the trunks to be detected more efficiently. Moreover, in the case where the ground surface has undulations so that the uv plane in the sensor coordinate system is significantly tilted from the horizontal plane, the range of angles of elevation of the laser beams may be adaptively selected in accordance with the angle of tilt of the sensor coordinate system, so that laser pulses reflected by the trunks are appropriately selected in extracting the reflection points. The angle of tilt of the LiDAR sensor 110 can be determined by utilizing signals from the IMU 125.

<Example of Self-Driving Operation after Environment Map Establishment>

Next, an example of self-driving operation after the environment map is generated will be described.

Figure 22:
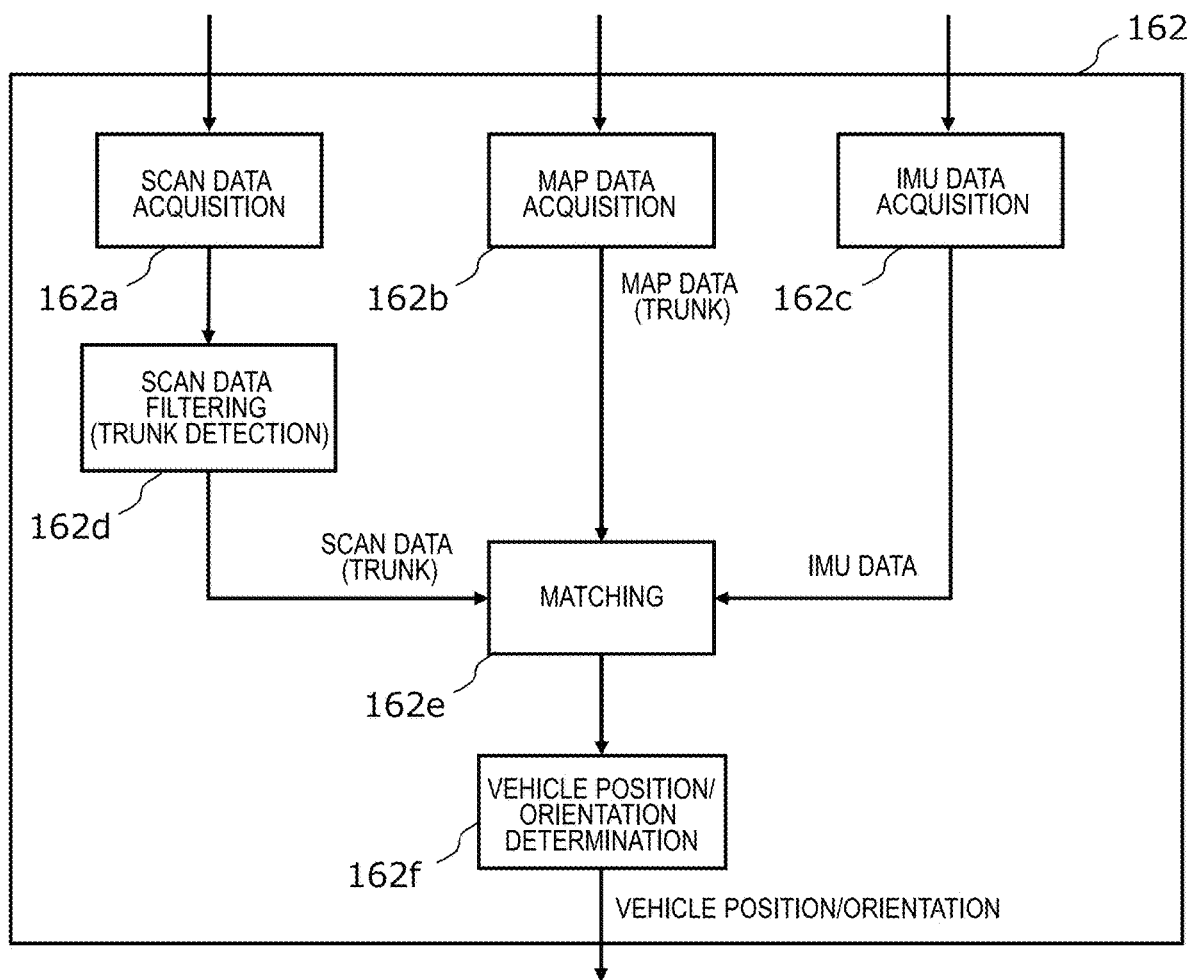
FIG. 22 is a diagram showing an exemplary functional configuration of a localization module.

FIG. 22 is a diagram showing an exemplary functional configuration of the localization module 162 in the ECU 160. By executing a computer program (software) stored in the storage device 150, the localization module 162 performs matching between the scan data output from the LiDAR sensor 110 and the map data, thereby estimating the position and orientation of the tractor 100A.

The localization module 162 performs the respective processes of scan data acquisition 162a, map data acquisition 162b, IMU data acquisition 162c, scan data filtering 162d, matching 162e, and vehicle position/orientation determination 162f. Hereinafter, details of these processes will be described.

(Scan Data Acquisition 162a)

The localization module 162 acquires scan data that is output from the LiDAR sensor 110. The LiDAR sensor 110 outputs scan data with a frequency of about 1 to 20 times per second, for example. This scan data may contain the coordinates of multiple points expressed by the sensor coordinate system, and time stamp information. In the case where the scan data contains the information of distance and direction toward each point and not coordinate information, the localization module 162 performs conversion from the distance and direction information into coordinate information.

(Map Data Acquisition 162b)

The localization module 162 acquires the environment map data that is stored in the storage device 150. The environment map data indicates a distribution of the trunks of the rows of trees included in the environment in which the tractor 100A travels. The environment map data contains data in either one of formats (1) to (3) below, for example.

(1) data recorded in a format that allows trunks to be distinguished from objects other than trunks For example, this may be data in which numerical value "1" is assigned to any point that is determined as a trunk, and numerical value "0" is assigned to any point that is determined as an object other than a trunk. A trunk ID for distinguishing each individual trunk may be contained in the environment map data.

(2) data in which a relatively large weight is assigned to a trunk, and a relatively small weight is assigned to any object other than a trunk For example, this may be data in which greater numerical values are assigned to points having a higher probability of being estimated as a point on the surface of a trunk.

(3) data containing information of a distribution of detected trunks, but not containing information of a distribution of some or all of objects other than trunks For example, this may be data resulting by eliminating all points but the points determined as the surface of trunks from the point cloud representing the environment map. Rather than eliminating all points that were determined not to be trunks, some points may be left. For example, in a vineyard, generally, posts are provided near the trunks to create a hedge construction. Information of points representing such posts may be contained in the environment map.

The determination as to whether or not a point in the point cloud corresponds to a trunk or post may be made based on whether a distribution of that point as well as multiple points surrounding that point is a distribution that reflects the surface shape of a trunk or a post (e.g., a distribution of a circular arc that projects downward), for example. Alternatively, from the data of point cloud in a curved distribution that is acquired through each scan, a collection of points whose distance from the LiDAR sensor 110 is locally shorter than those of neighboring points may be extracted, and these points may be determined as points representing trunks or posts. Data of a point cloud in a curved distribution that is acquired through each scan may be classified into a plurality of classes depending on distance from the LiDAR sensor 110, and each class may be subjected to a determination as to whether it corresponds to a trunk or post or not. Moreover, a point cloud may be classified based not only on distance but also on reflection intensity information. Because the reflection intensity clearly differs between tree trunks and any other portions in the surroundings, it is effective to classify the point cloud based on similarity in reflection intensity and similarity in position. For example, multiple points whose reflection intensity is within a predetermined range and whose positions are close to one another may be regarded as prospective points representing the surface of a trunk. Laser beams of a plurality of different wavelengths may be emitted from the LiDAR sensor 110, and a point cloud may be classified based on the ratio of reflection intensities for different wavelengths to detect trunks.

Machine learning may be utilized for trunk detection. By utilizing a neural network-based machine learning algorithm such as deep learning, it becomes possible to detect points corresponding to the surface of trunks of trees from point cloud data with a high accuracy. In the case where a machine learning algorithm is employed, generation of a trained model (i.e., learning) for detecting trunks from the point cloud data is performed in advance.

Not only tree trunks, but other objects may also be recognized. For example, through pattern recognition or machine learning, the ground surface, weeds, tree leaves, or the like may be recognized from the point cloud data and these points may be eliminated, thereby generating point cloud data that mainly contains points corresponding to tree trunks. Prior to trunk detection, a process of extracting only a point cloud whose height from the ground surface is contained within a predetermined range (e.g., 0.5 m to 1.5 m) may be performed. By regarding only a point cloud that is contained in such a specific coordinate range as a target of trunk detection, the time required for detection can be reduced. Height from the ground surface is calculated by subtracting the Z coordinate of the ground surface from the Z coordinate of each point. The Z coordinate of the ground surface may be determined by referring to a digital elevation model (DEM), for example. The Z coordinate of the ground surface may be determined from a point cloud representing the ground surface.

Figure 23:
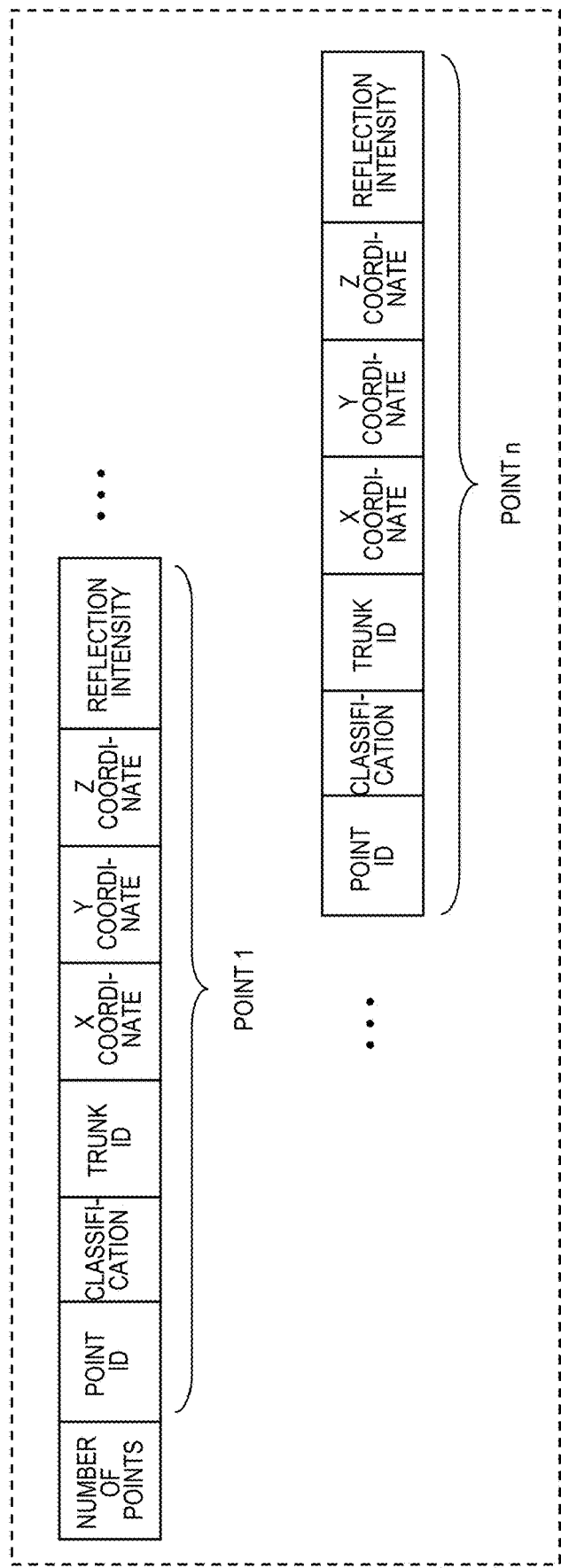
FIG. 23 is a diagram schematically showing an example format of environment map data.

FIG. 23 is a diagram schematically showing an example format of the environment map data. In this example, the environment map data contains information of the number of points, as well as information of an ID, a classification, a trunk ID, an X coordinate, a Y coordinate, a Z coordinate, and a reflection intensity of each point. Given a number n of points, n records of data are to be made, each record containing a point ID, a classification, a trunk ID, an X coordinate, a Y coordinate, a Z coordinate, and a reflection intensity. The classification indicates what the point represents, and may include an identifier indicating tree trunks, hedge posts, the ground surface, weeds, tree leaves, or the like, for example. The classification may be a binary numerical value indicating whether it is a tree trunk or not, or a numerical value indicating the probability of being a tree trunk. The trunk ID is a number which, in the case where the point represents a trunk, distinguishes that trunk. The trunk ID may not be contained in the environment map data. In addition to the trunk ID, identifiers of other objects (e.g., leaves, branches, the ground surface, and weeds) may be contained. The X coordinate, the Y coordinate, and the Z coordinate are coordinates of that point in a world coordinate system. The reflection intensity represents an intensity of reflected light from that point. The reflection intensity information may not be contained in the environment map data. Other than the information shown in FIG. 23, the environment map data may contain information of a header that indicates the data format and the like. In the case where the vineyard to be traveled by the tractor 100A is broad, environment map data may be generated for each section of the vineyard (e.g., for each 100 m×100 m section). In that case, the environment map data may also contain ID information for distinguishing sections. Note that, instead of recording three-dimensional coordinates of each point, the environment map data may record two-dimensional coordinates. For example, data containing the coordinates of a point cloud on a plane which is at a specific height and which is parallel to the horizontal plane may be generated as environment map data. In that case, matching between the scan data and the environment map data is performed with respect to those two-dimensional coordinates.

(IMU Data Acquisition 162*c*)

The localization module 162 acquires IMU data that is output from the IMU 125. The IMU data may contain information of the acceleration, velocity, displacement, attitude, time of measurement (time stamp), etc., of the tractor 100A. The IMU data is output at a frequency of about several ten to several thousand times per second, for example. This output cycle is generally shorter than the output cycle of scan data by the LiDAR sensor 110.

Figure 24:
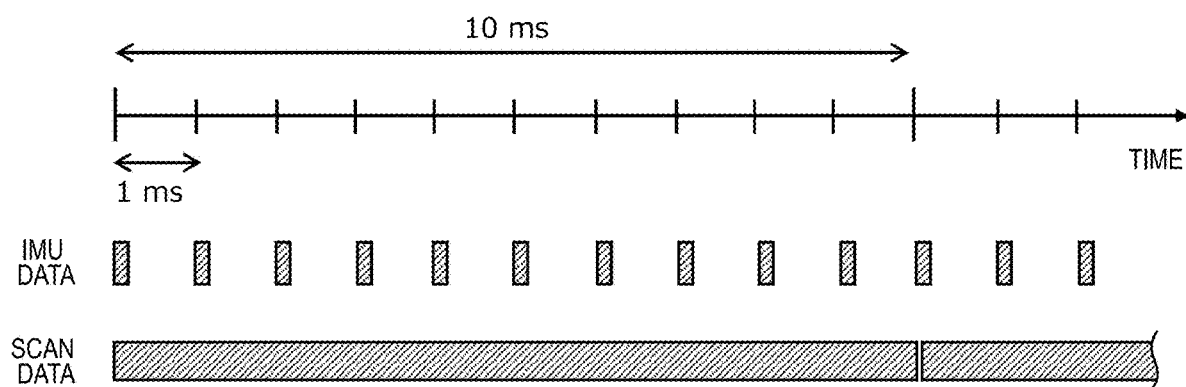
FIG. 24 is a diagram showing an example temporal relationship between IMU data and scan data.

FIG. 24 is a diagram showing an example temporal relationship between IMU data and scan data. In this example, the IMU data is output with a cycle of 1 millisecond (ms), whereas the scan data is output with a cycle of 10 ms. Given that the time required for one scan is e.g., 100 ms, the scan data is output for every 1/10 scan in the example of FIG. 24. The scan data contains information of the distance and direction, or the coordinates, of each measured point as well as the time of measurement (time stamp).

The localization module 162 refers to the time stamp of acquired scan data, and acquires the IMU data that was generated in the corresponding duration.

(Scan Data Filtering 162*d*)

The localization module 162 filters the acquired scan data so as to reduce the number of points to be subjected to matching. Furthermore, portions that are unnecessary for the matching are eliminated. For example, points that are determined as not corresponding to tree trunks or hedge posts, e.g., the ground surface, weeds, tree leaves, and obstacles, can be eliminated.

(Matching 162*e*)

The localization module 162 performs matching between the filtered scan data and the map data. The matching may be performed by using any arbitrary matching algorithm such as NDT (Normal Distribution Transform) or ICP (Iterative Closest Point), for example. Through the matching, the position and orientation of the LiDAR sensor 110 are determined.

(Vehicle Position/Orientation Determination 162f)

Based on the matching result, the localization module 162 determines the position and orientation of the tractor 100A, and outputs data indicating the position and orientation. The data is sent to the ECU 180 for drive control, so as to be used in the control of the drive device 140.

Next, with reference to FIG. 25, the localization operation according to the present preferred embodiment will be described in more detail.

Figure 25:
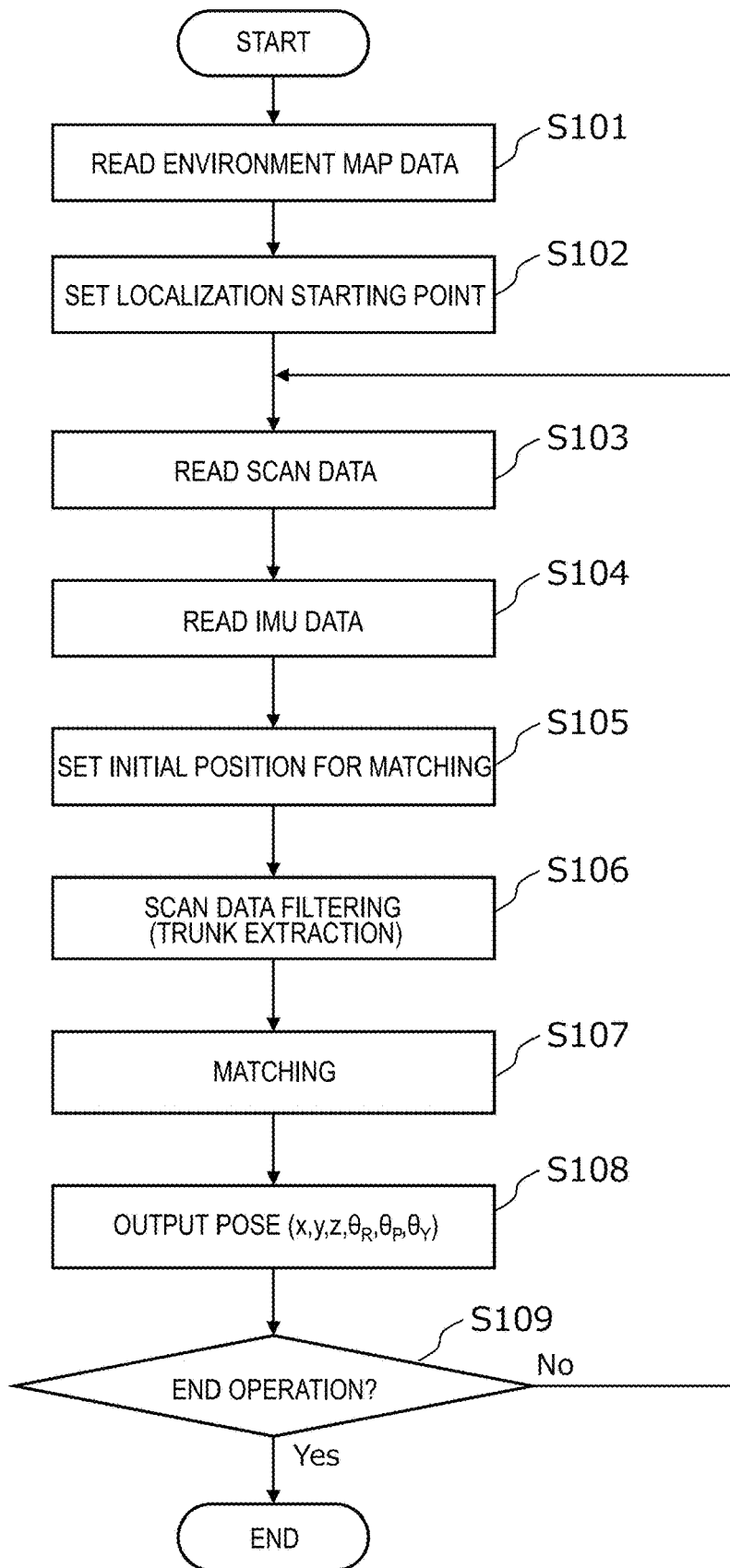
FIG. 25 is a flowchart showing a localization operation.

FIG. 25 is a flowchart showing the localization operation by the localization module 162. By performing the operations from steps S101 to S109 shown in FIG. 25, the localization module 162 estimates the position and orientation, i.e., the pose, of the tractor 100A. Hereinafter, the operation of each step will be described. The operations shown in FIG. 25 may be begun by the user's manipulation using the operation terminal 200, for example.

(Step S101)

The localization module 162 reads environment map data from the storage device 150. In the case where different environment map data is recorded for each section of the vineyard to be traveled, the environment map data corresponding to the current point is read. The environment map data corresponding to the current point may be designated by the user manipulating the operation terminal 200, for example. Alternatively, in the case where a GNSS signal can be received at that point, the current point may be identified based on the GNSS signal received by the GNSS unit 120, and the corresponding environment map data may be selected and read. As is illustrated by this example, the processing can be made rapid by reading only partial environment map data that corresponds to the position of the tractor 100A. In this step, the entire environment map data may be read all at once.

(Step S102)

The localization module 162 sets a starting point of localization. The starting point of localization is the current position of the tractor 100A at the given point in time, which may be set by the user designating a specific point from a map which is displayed on the operation terminal 200, for example. Alternatively, in the case where a GNSS signal can be received at that point, a starting point may be set based on the GNSS signal received by the GNSS unit 120.

(Step S103)

Once the start position is set, the operation of the LiDAR sensor 110 is begun. The localization module 162 reads scan data that is output from the LiDAR sensor 110. The LiDAR sensor 110 outputs scan data with a predetermined cycle (e.g., not less than 5 milliseconds and not more than 1 second). The scan data may contain, for each layer, point cloud data in the range of a few degrees to 360 degrees, for example. Every time scan data is output from the LiDAR sensor 110, for example, the localization module 162 reads that scan data. Alternatively, every time a predetermined number of instances of scan data are output, the localization module 162 may read such scan data altogether.

(Step S104)

The localization module 162 refers to the time stamp contained in the scan data, and reads IMU data that corresponds to the scan data.

(Step S105)

Based on the IMU data having been read, the localization module 162 sets an initial position of matching. The initial position of matching is an estimated position of the tractor 100A at the current point in time indicated by the IMU data. By beginning matching from this initial position, the time until convergence can be reduced. Instead of using the IMU data, for example, an initial value of matching may be determined through linear interpolation, based on a difference between the estimated values of position and orientation from two scans in the past.

(Step S106)

The localization module 162 filters the acquired scan data to reduce the number of points used for matching. Furthermore, with the above-described method, trunks are detected, and at least a part of the unwanted portions other than the trunks is eliminated from the point cloud.

Figure 26:
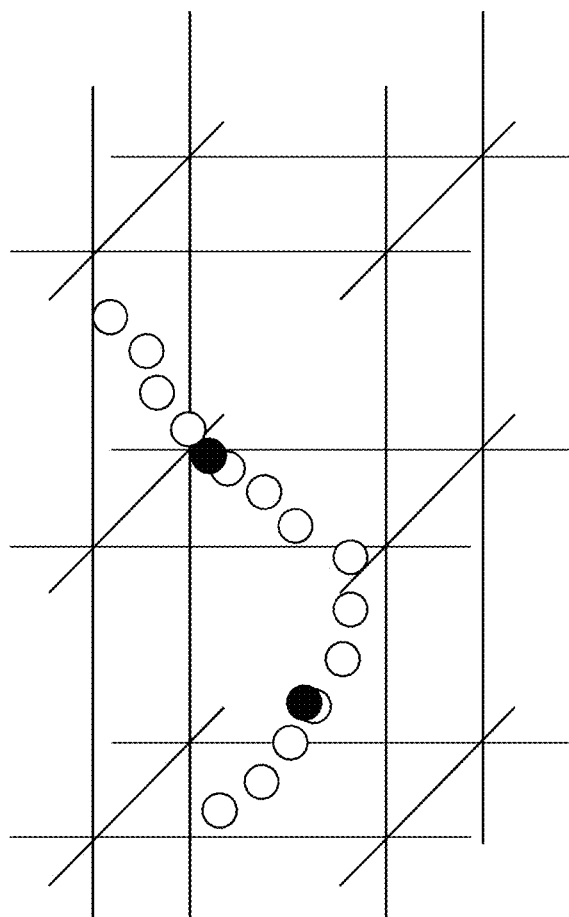
FIG. 26 is a diagram for describing a filtering process for scan data.

Now, with reference to FIG. 26, an example operation of scan data filtering will be described. FIG. 26 schematically shows a part of the point cloud contained in the scan data. In FIG. 26, white circles are the points included in the point cloud. The localization module 162 divides a three-dimensional space in the sensor coordinate system into a plurality of voxels of constant size. Then, if multiple points are included in each individual voxel, such points are replaced by one point that is located at the centroid. In FIG. 26, the replaced points at centroids are expressed by dark circles. Through such downsampling, the number of points in the scan data can be reduced, thus making the matching rapid. In the present preferred embodiment, trunk detection is performed after such downsampling is performed; however, trunk detection may be performed before the downsampling. In the case where the data size of the point cloud is not an issue, the downsampling process may be omitted.

(Step S107)

The localization module 162 performs matching between the filtered scan data and the environment map data, thus estimating the pose of the LiDAR sensor 110. Specifically, by determining the coordinate transformation from the sensor coordinate system to the world coordinate system with a method such as NDT technique or ICP technique, the pose of the LiDAR sensor 110 is determined.

(Step S108)

Based on the pose of the LiDAR sensor 110, the localization module 162 calculates the pose of the tractor 100A, and outputs the result. The pose of the tractor 100A may be data of the coordinates (x, y, z) and attitude ($\theta_R$, $\theta_P$, $\theta_Y$) of a representative point (origin) of the tractor 100A expressed by the world coordinate system. In the case where the environment map and the scan data represent a point cloud in a two-dimensional space (plane) and matching is to be performed in this two-dimensional space, the pose data to be output may contain values of the two-dimensional coordinates (x, y) and orientation ($\theta$). Only the position may be estimated through matching, while the attitude information indicated by the IMU data may straightforwardly be utilized as the attitude. In the case where the coordinate system of the tractor 100A matches the sensor coordinate system, step S108 may be omitted.

(Step S109)

The localization module 162 determines whether a command to end operation has been issued or not. A command to end operation may be issued when the user uses the operation terminal 200 to instruct that the self-driving mode be stopped, or when the tractor 100A has arrived at a destination, for example. If a command to end operation has not been issued, control returns to step S103, and a similar operation is performed with respect to the next scan data. If a command to end operation has been issued, the process is ended.

Next, an example operation of the ECU 180 for drive control will be described.

Figure 27:
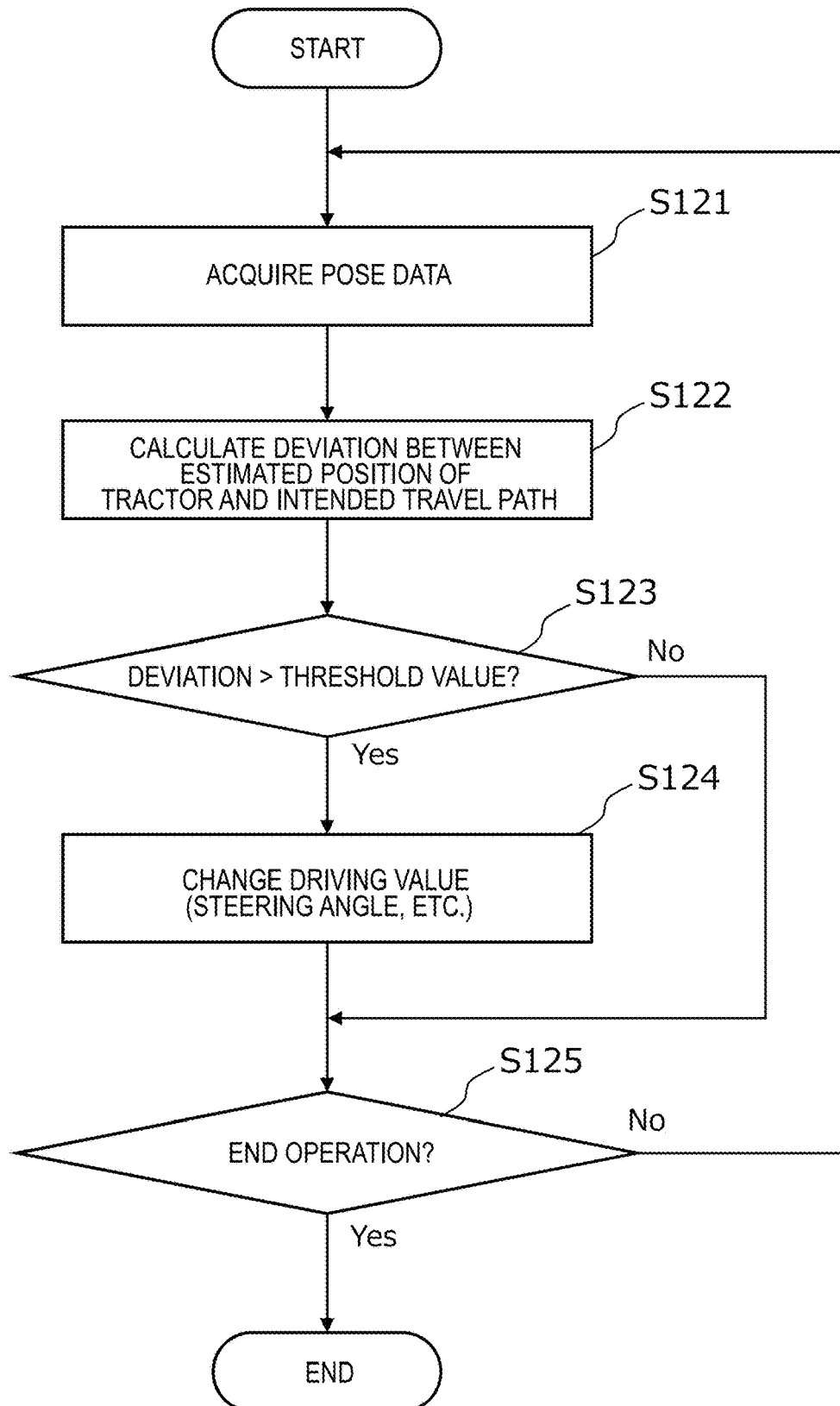
FIG. 27 is a flowchart showing an example control to be performed after the pose of a tractor has been estimated.

FIG. 27 is a flowchart showing an example operation of the ECU 180 to be performed after the pose of the tractor 100A has been estimated. At step S108 shown in FIG. 25, if a pose of the tractor 100A is output, the ECU 180 acquires data of the pose (step S121). Next, the ECU 180 calculates a deviation between the position of the tractor 100A indicated by the pose data and the intended travel path previously determined by the ECU 170 (step S122). The intended travel path may be set by the user manipulating the operation terminal 200, for example. The deviation represents a distance between the estimated position of the tractor 100A at the given point in time and the intended travel path. The ECU 180 determines whether the calculated deviation in position exceeds a pre-designated threshold value or not (step S123). If the deviation exceeds the threshold value, the ECU 180 changes the driving value (e.g., steering angle) of the drive device 140 so that the deviation decreases. In addition to the steering angle, the velocity may also be changed. If the deviation does not exceed the threshold value at step S123, step S124 is omitted. At the next step S125, the ECU 180 determines whether a command to end operation has been received or not. As mentioned above, a command to end operation may be issued when the user uses the operation terminal 200 to instruct that the self-driving mode be stopped, or when the tractor 100A has arrived at a destination, for example. If a command to end operation has not been issued, control returns to step S121, and a similar operation is performed on the basis of the pose of the tractor 100A as estimated based on the next scan data. If a command to end operation has been issued, the process is ended.

In the example of FIG. 27, the ECU 180 controls the drive device 140 based only on the deviation between the estimated position and the intended travel path, but the deviation in direction may further be taken into consideration in the control. For example, if a directional deviation, i.e., an angle difference between the estimated orientation of the tractor 100A as indicated by the acquired pose data and the direction of the intended travel path, exceeds a pre-designated threshold value, the ECU 180 may change the driving value (e.g., steering angle) of the drive device 140 in accordance with the deviation.

Hereinafter, with reference to FIGS. 28A to 28D, an example of the steering control by the ECU 180 will be described.

Figure 28A:
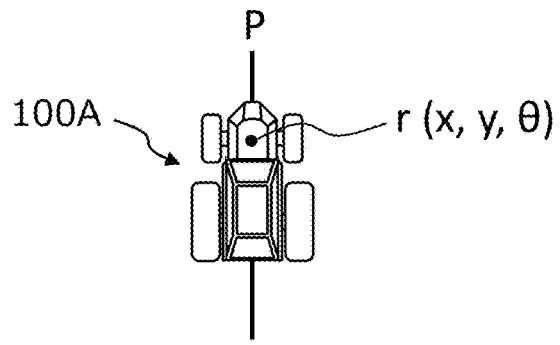
FIG. 28A is a diagram showing an example of a tractor traveling along an intended travel path P.
Figure 28B:
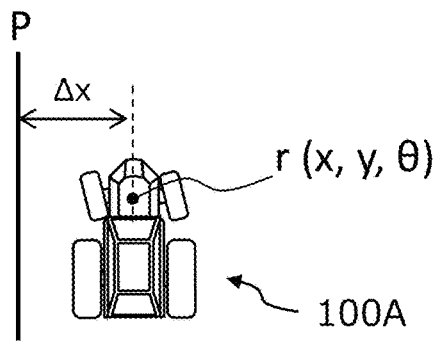
FIG. 28B is a diagram showing an example of a tractor at a position which is shifted rightward from the intended travel path P.
Figure 28C:
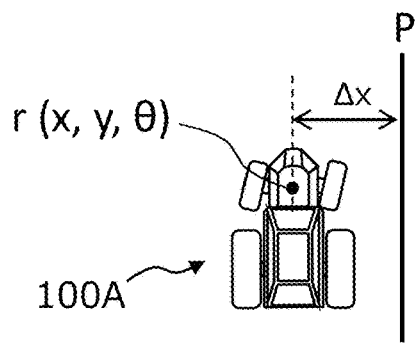
FIG. 28C is a diagram showing an example of a tractor at a position which is shifted leftward from the intended travel path P.
Figure 28D:
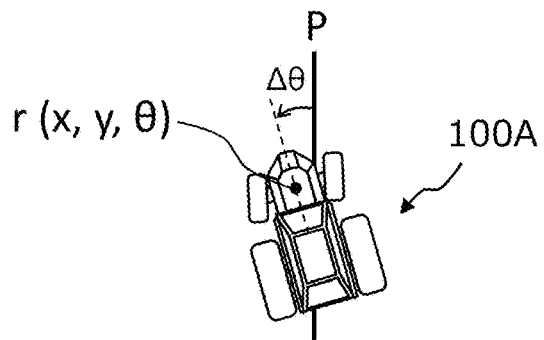
FIG. 28D is a diagram showing an example of a tractor which is oriented in an inclined direction with respect to the intended travel path P.

FIG. 28A is a diagram showing an example of a tractor 100A traveling along an intended travel path P. FIG. 28B is a diagram showing an example of a tractor 100A at a position which is shifted rightward from the intended travel path P. FIG. 28C is a diagram showing an example of a tractor 100A at a position which is shifted leftward from the intended travel path P. FIG. 28D is a diagram showing an example of a tractor 100A which is oriented in an inclined direction with respect to the intended travel path P.

As shown in FIG. 28A, in the case where the position and orientation of the tractor 100A are not deviated from the intended travel path P, the ECU 180 maintains the steering angle and velocity of the tractor 100A without changing them.

As shown in FIG. 28B, when the position of the tractor 100A is shifted rightward from the intended travel path P, the ECU 180 changes the steering angle by changing the angle of rotation of the steering motor included in the drive device 140 so that the traveling direction of the tractor 100A will be inclined leftward. Herein, not only the steering angle but also the velocity may be changed. The amount of change of the steering angle may be adjusted in accordance with the magnitude of a positional deviation Δx, for example.

As shown in FIG. 28C, when the position of the tractor 100A is shifted leftward from the intended travel path P, the ECU 180 changes the steering angle by changing the angle of rotation of the steering motor so that the traveling direction of the tractor 100A will be inclined rightward. In this case, too, not only the steering angle but also the velocity may be changed. The amount of change of the steering angle may be adjusted in accordance with the magnitude of a positional deviation Δx, for example.

As shown in FIG. 28D, in the case where the position of the tractor 100A is not considerably deviated from the intended travel path P but its orientation is nonetheless different from the direction of the intended travel path P, the ECU 180 changes the steering angle so that the directional deviation Δθ will become smaller. In this case, too, not only the steering angle but also the velocity may be changed. The amount of change of the steering angle may be adjusted in accordance with the magnitudes of the positional deviation Δx and directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly for returning to the intended travel path P, so that the directional deviation Δθ will inevitably have a large absolute value. Conversely, when the positional deviation Δx has a small absolute value, the directional deviation Δθ needs to become closer to zero, and therefore it makes sense to introduce a relatively large weight for the directional deviation Δθ in determining the amount of change of the steering angle.

For the steering control and velocity control of the tractor 100A, control techniques such as PID control or MPC control (Model Predictive Control) may be applied. Applying these control techniques will make for smoothness of the control of bringing the tractor 100A closer to the intended travel path P.

Note that, when an obstacle is detected by one or more obstacle sensors 130 during travel, the ECU 180 controls the drive device 140 so as to avoid the obstacle. If the obstacle cannot be avoided, the ECU 180 halts the tractor 100A. Note that, regardless of whether the obstacle is avoidable or not, the ECU 180 may halt the tractor 100A whenever an obstacle is detected.

<Example Method of Determining an Intended Travel Path>

Next, an example method of determining an intended travel path of the tractor 100A by the ECU 170 will be described.

After the environment map is generated, the ECU 170 determines an intended travel path of the tractor 100A. The intended travel path may be automatically determined by the ECU 170 based on the environment map, or set by the user manipulating the operation terminal 200.

Figure 29A:
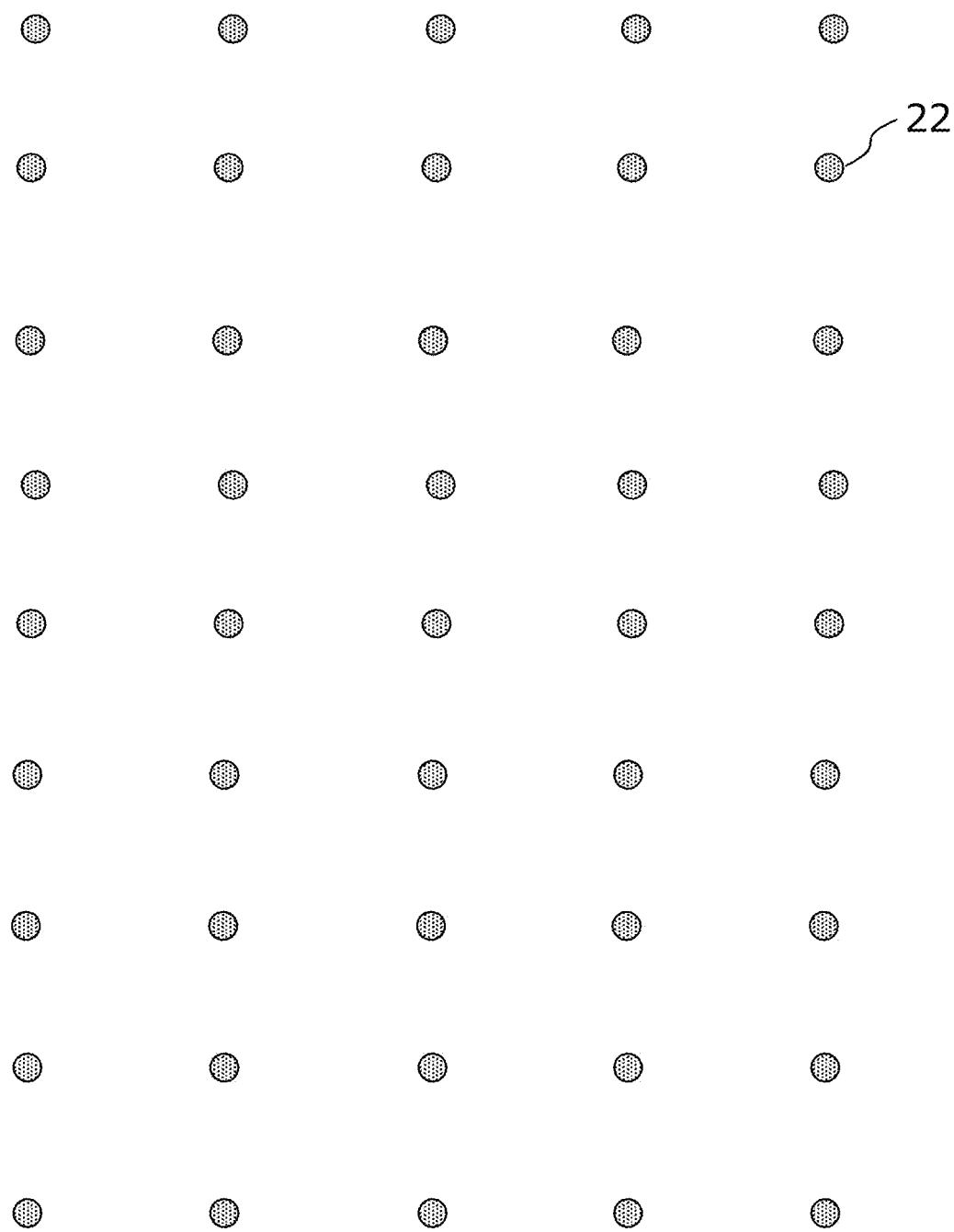
FIG. 29A is a diagram showing an example of two-dimensional data indicating a trunk distribution of rows of trees that is generated based on the environment map.

FIG. 29A is a diagram showing an example of two-dimensional data indicating a trunk distribution of rows of trees that is generated based on the environment map. In addition to the environment map for matching purposes, the map data generating module 164 in the ECU 160 may generate two-dimensional data that roughly indicates a distribution of trunks 22 as shown in FIG. 29A. This two-dimensional data expresses the trunk 22 of each individual tree with a circle of a constant size. Such two-dimensional data indicating a trunk distribution may be referred to as "trunk distribution data". The trunk distribution data contains the information of position coordinates (x, y) of the center of each individual trunk, for example. In addition to the position coordinates, the trunk distribution data may contain information of the identification number (trunk ID), trunk thickness, etc., of each individual trunk. Inclusion of such information allows for management of the growth status of the trunks. The growth status of the trunks or leaves, etc., of trees may be managed by a computer within a farming management system, for example. As is illustrated by this example, the growth status of trees may be managed by data which is distinct from the environment map. By using a human-machine interface (HMI) such as the operation terminal 200, the user may be allowed to input information indicating the placement relationship of the multiple rows of trees, e.g., the intra-tree distance or the position coordinates of the trunks. The input information is recorded to the storage device 150 or another storage medium.

Figure 29B:
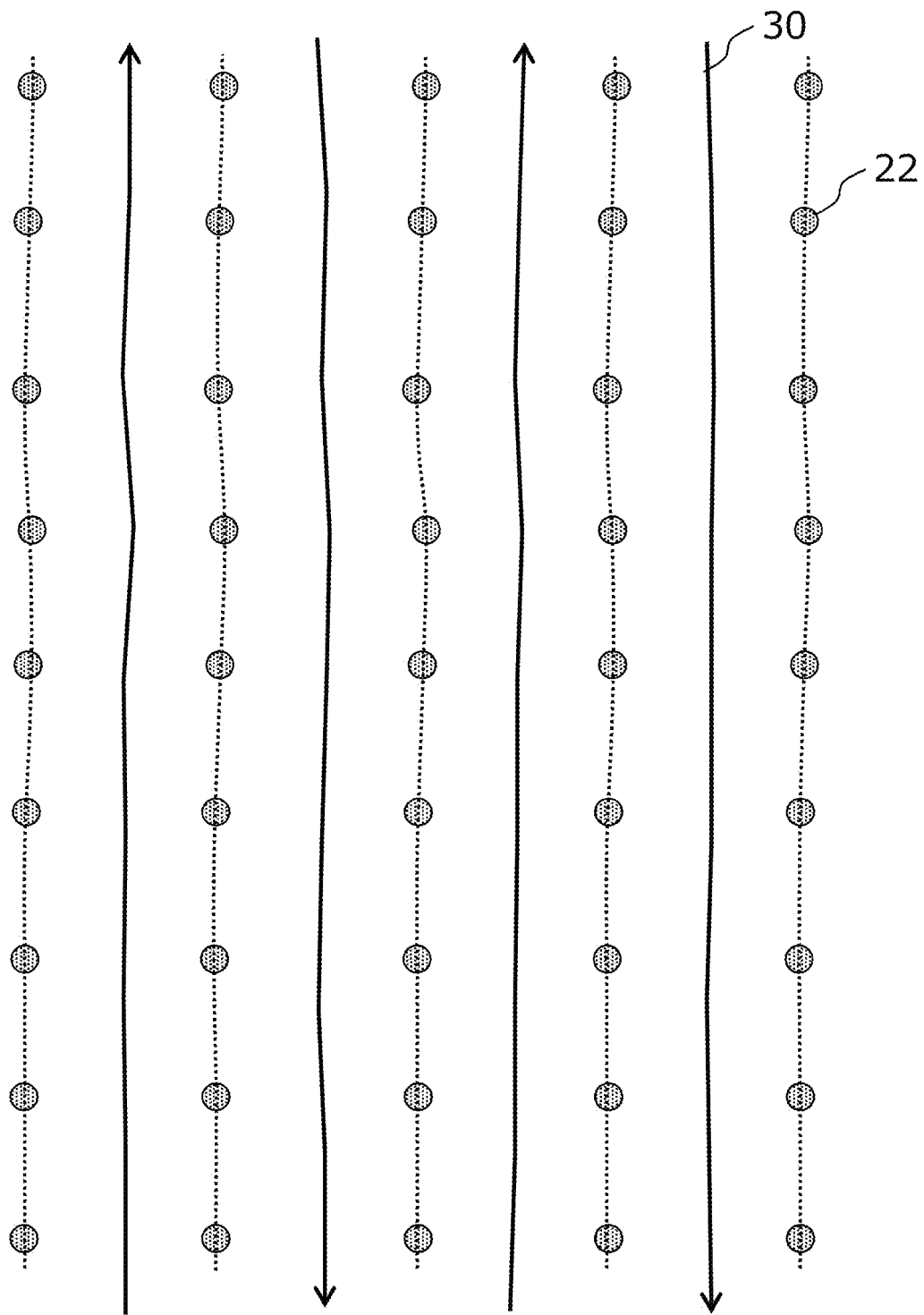
FIG. 29B is a diagram for describing an example method of determining an intended travel path based on trunk distribution data.

FIG. 29B is a diagram for describing an example method of determining an intended travel path 30 based on trunk distribution data. The ECU 170 in this example determines curves connecting the trunks 22 of the rows of trees, and determines curves or polylines that pass through the midpoint between every two adjacent rows of trees as the intended travel path 30. It is not necessary for the center of the tractor 100A to be located at the midpoint between two adjacent trees; rather, the intended travel path 30 may be shifted from the midpoint between two adjacent trees. With reference to the determined intended travel path 30, the ECU 180 for drive control performs steering control of the tractor 100A.

Figure 30:
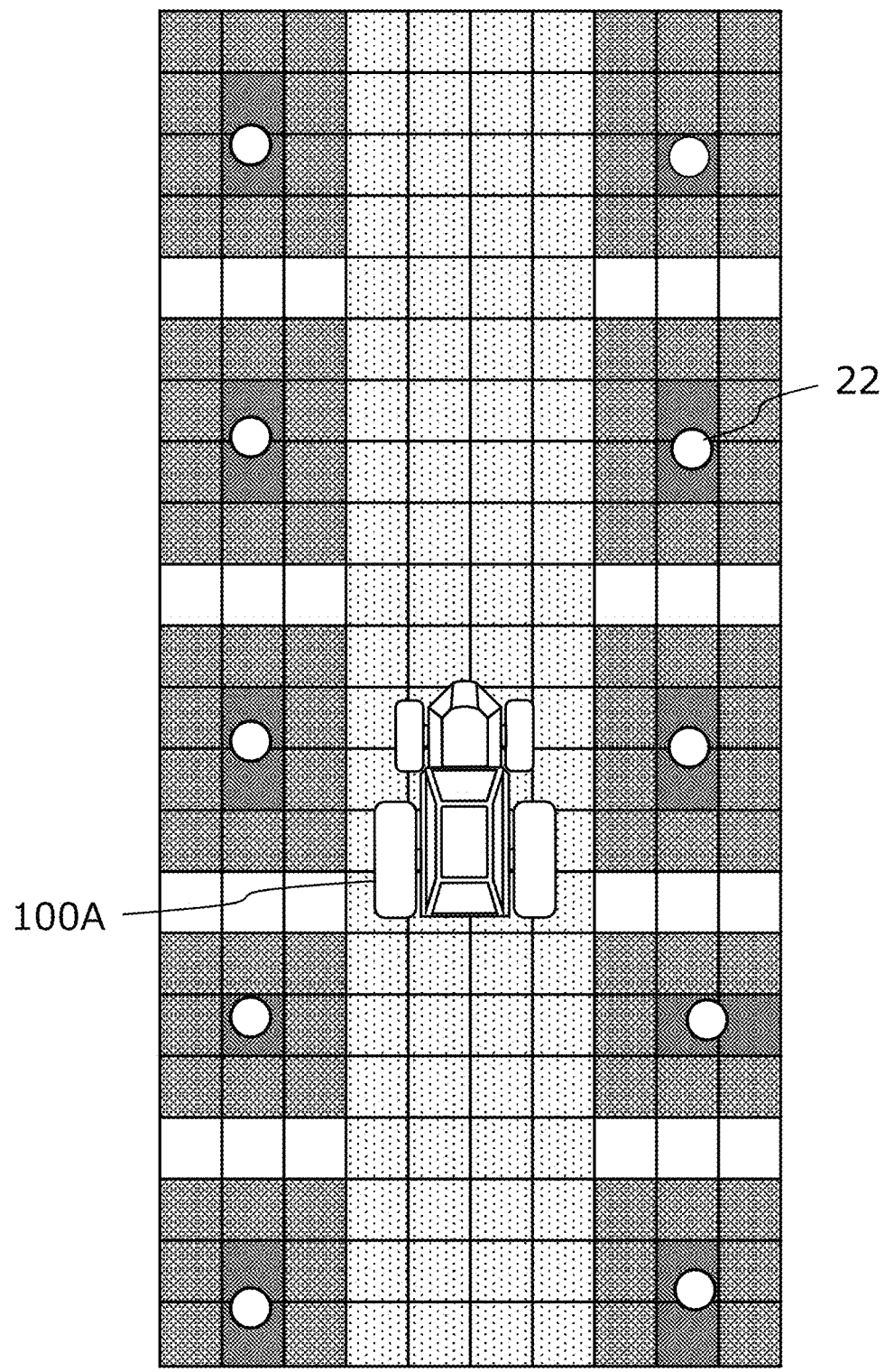
FIG. 30 is a diagram showing another example of trunk distribution data for path setting purposes.

FIG. 30 is a diagram showing another example of trunk distribution data for path setting purposes. In this example, the traveling environment of the tractor 100A is managed by being divided into a plurality of cells. Each cell may be a square, each of whose sides has a length that is close to a mean value of the diameters of the trunks 22, for example. The cells are classified into the following four kinds (1) to (4):

(1) a cell containing a trunk 22;
(2) a cell that is adjacent to a cell containing a trunk 22;
(3) a cell located between two adjacent rows of trees and not qualifying as (1) or (2); and
(4) other cells.

In FIG. 30, cells (1) to (4) are expressed in different shades. The range of each cell (2) that is adjacent to a cell containing a trunk 22 may be determined based on point cloud data indicating the leaves of the rows of trees that is acquired by the LiDAR sensor 110. In that case, in addition to the environment map data for matching purposes, the map data generating module 164 of the ECU 160 generates grid data indicating a two-dimensional distribution of each of the trunks and the leaves of the rows of trees. The ECU 170 in this example determines a path for the tractor 100A based on grid data as shown in FIG. 30. For example, the ECU 170 sets a cell (3) that is located between two adjacent rows of trees as a travelable region. The ECU 180 controls the travel of the tractor 100A so as to pass near the central portion of the travelable region.

<Steering Control During Map Data Generation>

As described earlier, when generating an environment map through self-driving, the tractor 100A according to the present preferred embodiment collects local map data indicating a distribution of the trunks of rows of trees, while performing localization and steering control. At this time, based on the sensor data that is repeatedly output from the LiDAR sensor 110 while the tractor 100A is moving, the ECU 160 may further detect the leaves of the rows of trees in the surrounding environment of the tractor 100A, and generate data indicating a distribution of the detected leaves of the rows of trees. In that case, based on a distribution of each of the detected trunks and the detected leaves of the rows of trees, the ECU 180 can perform steering control of the tractor 100A. The ECU 180 performs steering control of the tractor 100A so that the tractor 100A moves along a path which goes between two adjacent rows of trees among the detected rows of trees and which reduces contact with the leaves of the rows of trees, for example.

In this operation, from the distribution of the trunks of the rows of trees as detected based on sensor data from the LiDAR sensor 110, the ECU 170 determines a path which passes between the trunks of two adjacent rows of trees. For example, it determines a path which passes through the midpoint between the positions of the pair of trunks of two adjacent rows of trees. The ECU 180 performs steering control of the tractor 100A so that the tractor 100A moves along the determined path. As a result, self-driving can be performed while collecting local map data.

In the environment in which the tractor 100A travels, rows of trees may not necessarily be in a linear placement. Rows of trees may be in a curved placement. In such cases, when performing self-driving while collecting map data, a row of trees may be detected only on one of the right and left sides. In such cases, because right-and-left pairs of rows of trees cannot be identified, it is difficult to continue self-driving with the aforementioned method.

Therefore, the following control may be performed in the case where rows of trees are in a curved placement. When rows of trees are in a curved placement, fewer trunks will be detected in one of any two adjacent rows of trees than in the other one of the two rows of trees. In such cases, based on a distribution of the detected trunks, the ECU 170 estimates a distribution of hidden trunks in the aforementioned one of the two rows of trees, and based on the estimated distribution, determines a path for the tractor 100A. The ECU 180 performs steering control of the tractor 100A so that the tractor 100A travels along the determined path.

Figure 31A:
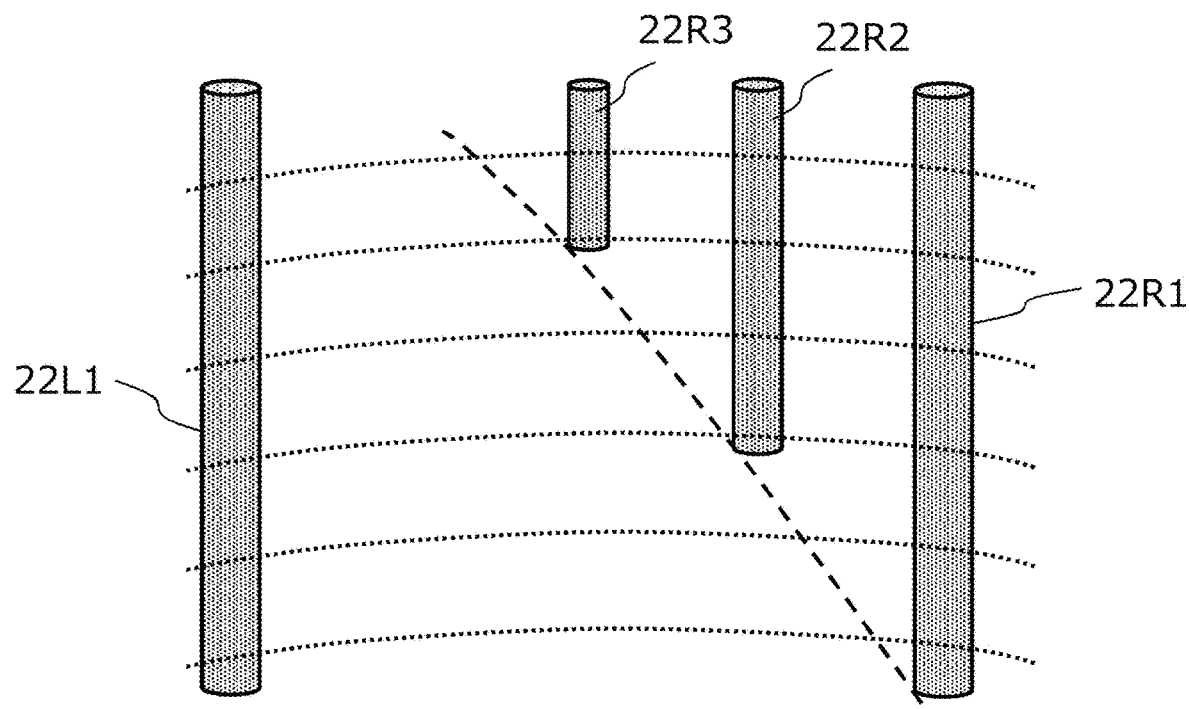
FIG. 31A is a diagram schematically showing an example environment in which rows of trees are in a curved placement.
Figure 31B:
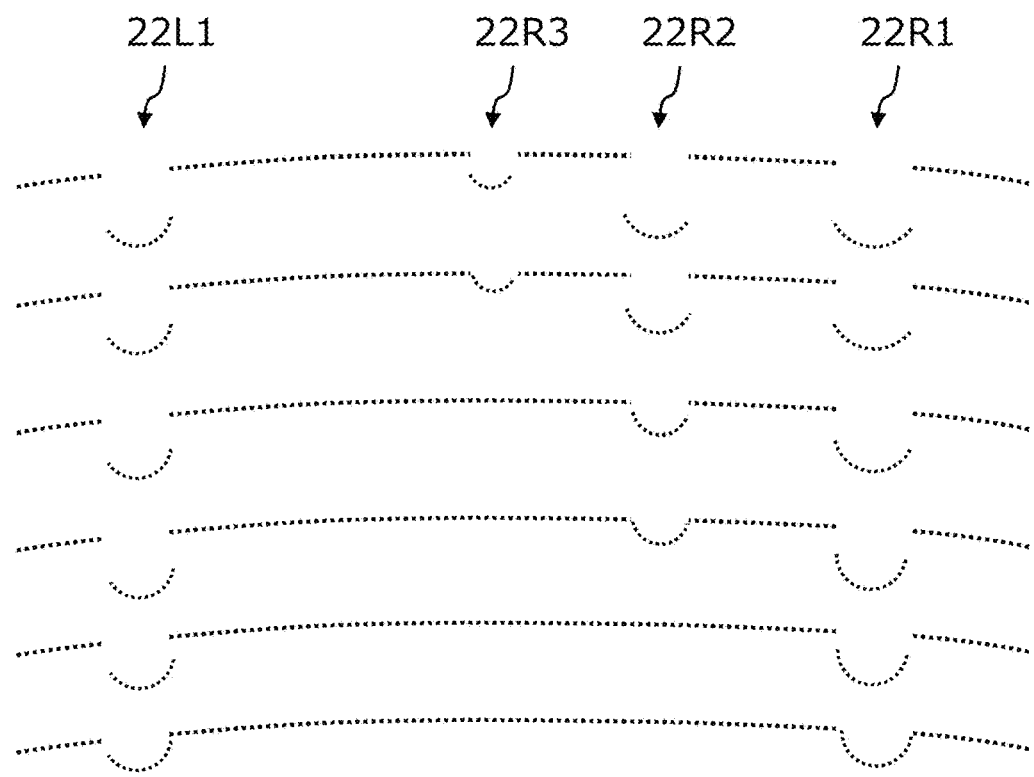
FIG. 31B is a diagram schematically a point cloud that may be observed through a single scan in the environment shown in FIG. 31A.

FIG. 31A is a diagram schematically showing an example environment in which rows of trees are in a curved placement. Columns in the figure represent trunks of trees; a thick broken line represents a schematic arrangement of a row of trees; and dotted lines schematically represent scans made by multiple layers of laser beams emitted from the LiDAR sensor 110. FIG. 31B is a diagram schematically a point cloud that may be observed through a single scan in the environment shown in FIG. 31A. In this example, regarding the two adjacent rows of trees, three trunks 22R1, 22R2 and 22R3 are detected in the right row of trees, whereas only one trunk 22L1 is detected in the left row of trees. In the left row of trees, the trunk 22L1 of a forward tree obstructs the laser beams so that the trunks of any rearward trees cannot be detected.

In such a case, from the arrangement of the right row of trees, in which relatively many trees are detected, the ECU 170 estimates the positions of the trunks of the hidden left trees, and determines a travel path based on the estimated trunk positions. For example, the positions of the hidden trunks are estimated by applying to the two rearward adjacent trunks the relative position relationship of the two forward adjacent trunks 22R1 and 22L1, whose positions are identified based on the scan data.

Figure 31C:
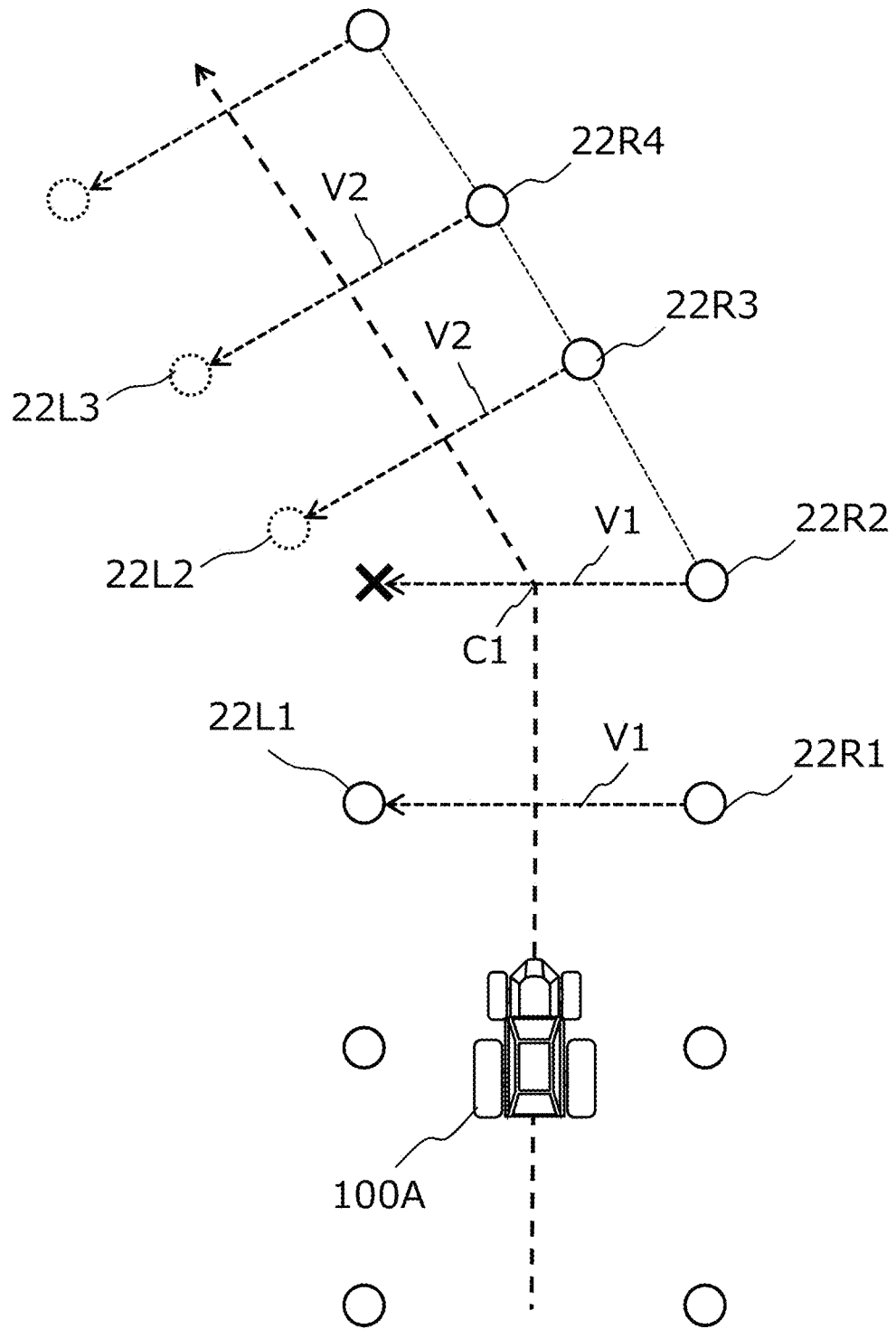
FIG. 31C is a diagram for describing an operation of determining a travel path by estimating the positions of hidden trunks.

FIG. 31C is a diagram for describing an operation of determining a travel path by estimating the positions of hidden trunks. In this example, on the basis of trunk distribution data indicating a two-dimensional distribution of the trunks of rows of trees that is acquired based on scan data, positions of hidden trunks are estimated. In FIG. 31C, positions of the trunks of trees which have been detected based on scan data are indicated with solid-line circles, whereas positions of the trunks of trees which are yet to be detected are indicated with broken-line circles. In this example, the ECU 170 first determines a vector V1 from the position of the trunk 22R1 to the position of the trunk 22L1. Next, beginning from the position of the rearward trunk 22R2, a position that is displaced by the vector V1 from that position is determined as the estimated position of a hidden trunk. In FIG. 31C, the estimated position of the hidden trunk is indicated by an x symbol. The ECU 170 determines a path which passes through a midpoint C1 between that position and the position of the trunk 22R2 as a travel path for the tractor 100A, for example.

When the tractor 100A travels along a path that is determined by such a method, a rearward trunk 22L2 that was hidden by the trunk 22L1 is eventually detected from scan data. It is further assumed that a rearward trunk 22L3 is yet to be detected. If the position of the trunk 22L2 is different from the estimated position (x symbol), the ECU 170 identifies a right trunk (i.e., the trunk 22R3 in the example of FIG. 31C) that forms a pair with the trunk 22L2, and determines a vector V2 from that trunk 22R3 to the trunk 22L2. Next, further beginning from the position of the rearward trunk 22R4, a position that is displaced by the vector V2 from that position is determined as the estimated position of the hidden trunk 22L3. By repeating the above operation, positions of hidden trunks can be estimated to set an appropriate path, and automatic steering can be performed along that path.

Figure 31D:
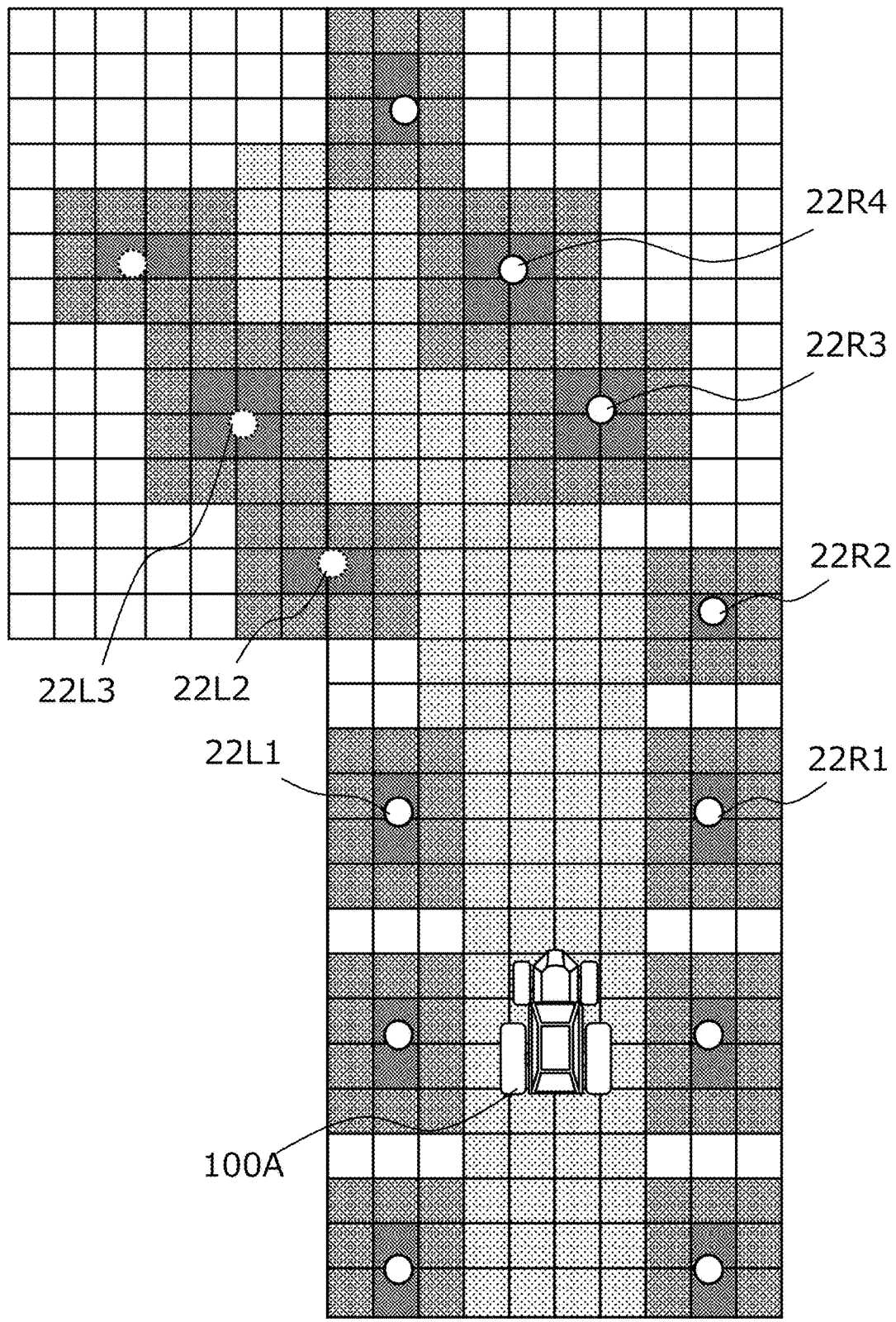
FIG. 31D is a diagram showing an example of grid data indicating a two-dimensional distribution of trunks in the case where rows of trees are in a curved placement.

FIG. 31D is a diagram showing an example of grid data indicating a two-dimensional distribution of trunks in the case where rows of trees are in a curved placement. The ECU 160 may generate grid data as shown in FIG. 31D in the course of collecting data for establishing an environment map. In that case, the ECU 170 may perform path setting based on such grid data. In this example, positions of hidden trunks may be estimated in units equal to the cell size.

Through the above operation, relatively smooth steering control can be performed while generating an environment map.

<Obstacle Avoidance Operation>

Next, an obstacle avoidance operation according to the present preferred embodiment will be described.

Figure 32:
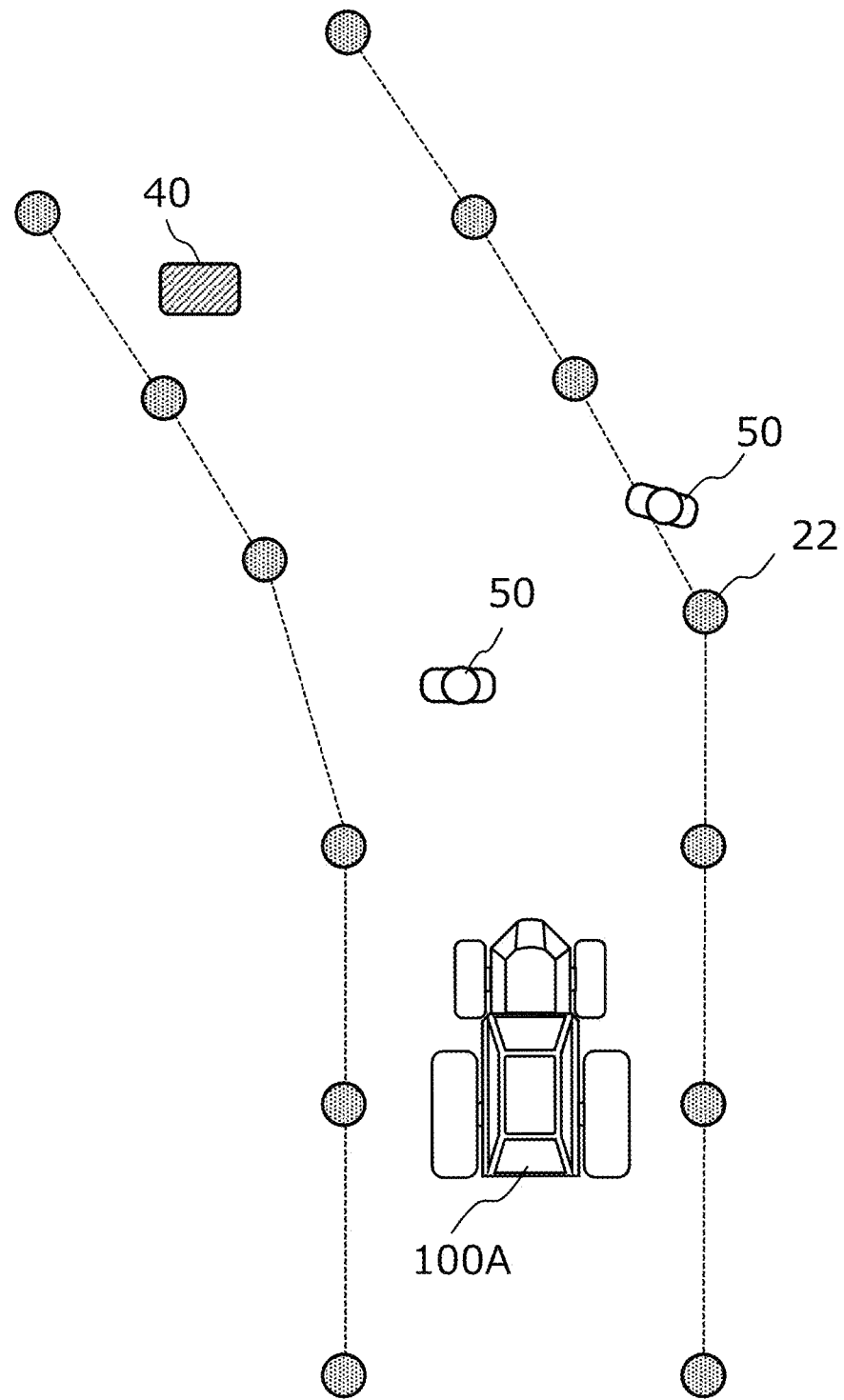
FIG. 32 is a diagram schematically showing an example situation where an obstacle and a person exist in a traveling environment of a tractor.

FIG. 32 is a diagram schematically showing an example situation where an obstacle 40 and a person 50 exist in the traveling environment of the tractor 100A. The tractor 100A includes one or more obstacle sensors 130. During travel, if the obstacle sensor(s) 130 detects the obstacle 40 (e.g., a basket) or the person 50, the ECU 180 performs steering control so as to avoid the obstacle 40 or the person 50. In the case where collision with the obstacle 40, the person 50, branches, trunks 22, etc., is inevitable even if avoiding attempts are made, the ECU 180 halts the tractor 100A. Note that, when an obstacle is detected, the ECU 180 may halt the tractor 100A anyway even if the obstacle is avoidable. Rather than using the obstacle sensor(s) 130, the LiDAR sensor 110 may be employed to perform similar detections.

In the example shown in FIG. 32, the person 50 exists near the trunk 22 of a tree. In the case where matching is performed in a manner that also encompasses the tree leaves, the person 50 or other obstacle may be hidden in the leaves, thus making it difficult to distinguish whether it is the leaves or any other object. In particular, distinction is difficult if the person 50 stands in the leaves near the trunk 22. In the present preferred embodiment, because matching is performed by using an environment map indicating a distribution of trunks 22, distinction between the trunks and other objects can be facilitated. An object other than a trunk that has been detected through matching between the scan data and the environment map can be easily detected to be a person or an obstacle. Thus, the LiDAR sensor 110 can be utilized as an obstacle sensor(s). In the case where the tractor 100A includes a plurality of LiDAR sensors 110 at different positions of the tractor 100A, the obstacle sensor(s) 130 may be omitted.

<Localization Based on a Specific Combination of Trunk Intervals>

Although the above preferred embodiment assumes that the interval between the trunks of trees is roughly constant, in practice, the trunks of trees may have different intervals in different places. Therefore, when performing localization, the ECU 160 may detect the trunks of multiple trees having a specific combination of trunk intervals from the sensor data, and estimate the position of the mobile machine through matching between the trunks of multiple trees having the specific combination of trunk intervals and the trunks of multiple trees having the specific combination of trunk intervals as extracted from the environment map data. Hereinafter, this operation will be described with reference to FIG. 33A and FIG. 33B.

Figure 33A:
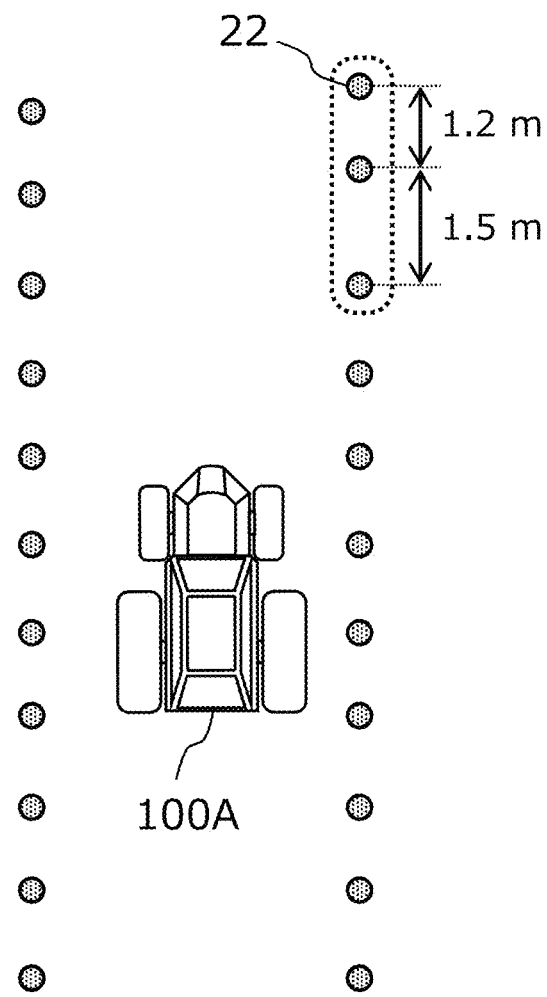
FIG. 33A is a diagram showing an example placement of the trunks of rows of trees detected by a tractor.
Figure 33B:
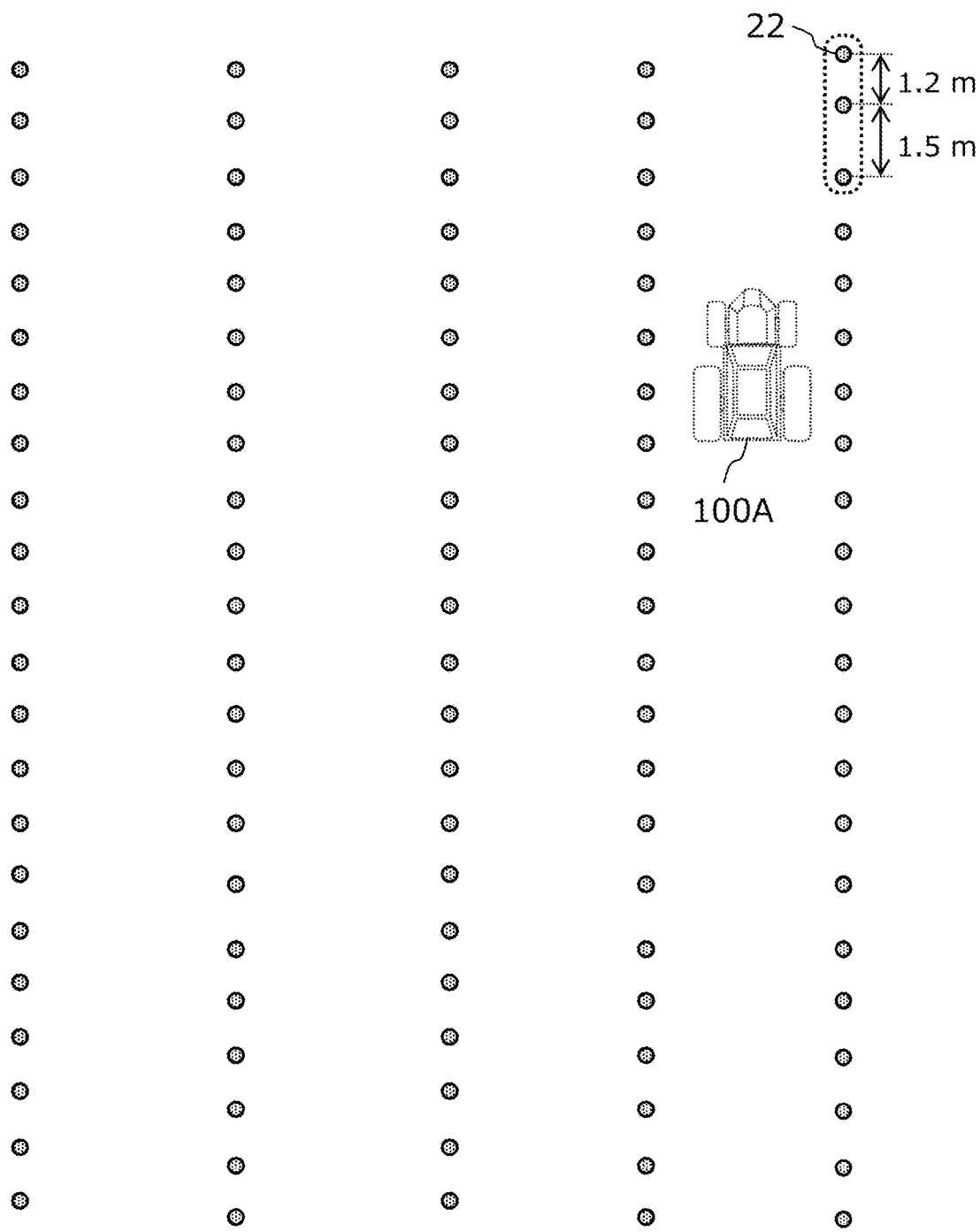
FIG. 33B is a diagram showing an example trunk distribution indicated by environment map data.

FIG. 33A is a diagram showing an example placement of the trunks 22 of rows of trees detected by the tractor 100A. FIG. 33B is a diagram showing an example trunk distribution indicated by the environment map data. In this example, three trunks within a dotted-line box have a specific combination of trunk intervals of 1.2 m and 1.5 m. In such a case, when performing localization, the ECU 160 calculates respective intervals of the trunks 22 detected from the acquired scan data, and determines a portion having the specific combination of trunk intervals. Then, from the environment map shown in FIG. 33B, it searches for and identifies a portion having the determined combination of trunk intervals. Through matching between the portions having the specific trunk intervals against each other, the ECU 160 is able to estimate the current position and orientation of the tractor 100A. Through this operation, the matching can be made rapid and the localization accuracy can be improved in the case where the rows of trees include a portion having a specific combination of trunk intervals. Information indicating combinations of trunk intervals in the rows of trees may be previously recorded to a storage medium. Such information may be automatically recorded by the ECU 160 based on the environment map data, or recorded by the user manipulating the operation terminal 200, for example.

In the present preferred embodiment, the environment map data generated by the tractor 100A can be supplied to other tractors, or mobile machines other than tractors, that are traveling in the same environment. For example, in the case where tasks are to be performed by a plurality of mobile machines in a broad orchard, it is sufficient if the environment map is generated by a single mobile machine or computer, and it will be efficient if the environment map is shared among the plurality of mobile machines. Local maps for establishing an environment map in a single environment may be generated by a plurality of tractors or other mobile machines in a shared fashion. In that case, a computer that combines the local maps generated by the plurality of mobile machines to generate a single environment map is to be provided within the system. That computer may deliver the generated environment map to the plurality of mobile machines through a wired or wireless network or a storage medium.

In a system where a plurality of mobile machines work while moving in the same environment, the position relationship between the sensor coordinate system and the mobile machine coordinate system may differ from mobile machine to mobile machine. Even among the same models, errors in the attached positions of sensors may induce errors in the conversion from the sensor coordinate system to the mobile machine coordinate system. In order to reduce the influences of such errors, before beginning usual operations, each mobile machine makes a trial run to perform a calibration of determining parameters for the coordinate transformation from the sensor coordinate system to the mobile machine coordinate system.

The technique according to the present preferred embodiment is applicable not only to tractors traveling in an orchard such as a vineyard, but also to any arbitrary mobile machine (e.g., a mobile robot or a drone) to be used in an environment where multiple rows of trees exist, e.g., a forest. The same is true of the following preferred embodiments.

3-2. Preferred Embodiment 2

Next, a mobile machine according to a second preferred embodiment of the present disclosure will be described.

The mobile machine according to the present preferred embodiment includes at least two LiDAR sensors, and performs localization and map data generation based on sensor data that is output from these LiDAR sensors. Each of the at least two LiDAR sensors outputs two-dimensional or three-dimensional point cloud data, or distance distribution data, indicating a distribution of objects in the surrounding environment of the mobile machine. As in Preferred Embodiment 1, the mobile machine includes: a storage device that stores environment map data indicating a distribution of trunks of the multiple rows of trees; a localization device; and a controller to control movement of the mobile machine in accordance with the position of the mobile machine estimated by the localization device. Based on the point cloud data that is repeatedly output from the at least two sensors while the mobile machine is moving, the localization device detects trunks of the rows of trees in the surrounding environment of the mobile machine, and estimates the position of the mobile machine through matching between the detected trunks of the rows of trees and the environment map data. The mobile machine further includes a data generator that generates environment map data, or local map data from which to establish environment map data. While performing localization based on the point cloud data that is repeatedly output from the at least two sensors while the mobile machine is moving, the data generator detects trunks of the rows of trees in the surrounding environment of the mobile machine, and generates local map data, from which to generate environment map data indicating a distribution of the detected trunks of the rows of trees, and stores the local map data to the storage device. Also, by integrating the local map data that is repeatedly generated while the mobile machine is moving, the data generator may generate an environment map data in a world coordinate system, and record it to the storage device.

Hereinafter, with respect to an example where the mobile machine is a tractor that travels in an orchard such as a vineyard, the configuration and operation according to the present preferred embodiment will be described. In the following description, differences from Preferred Embodiment 1 will mainly be described, while description of any overlapping aspects will be omitted.

Figure 34:
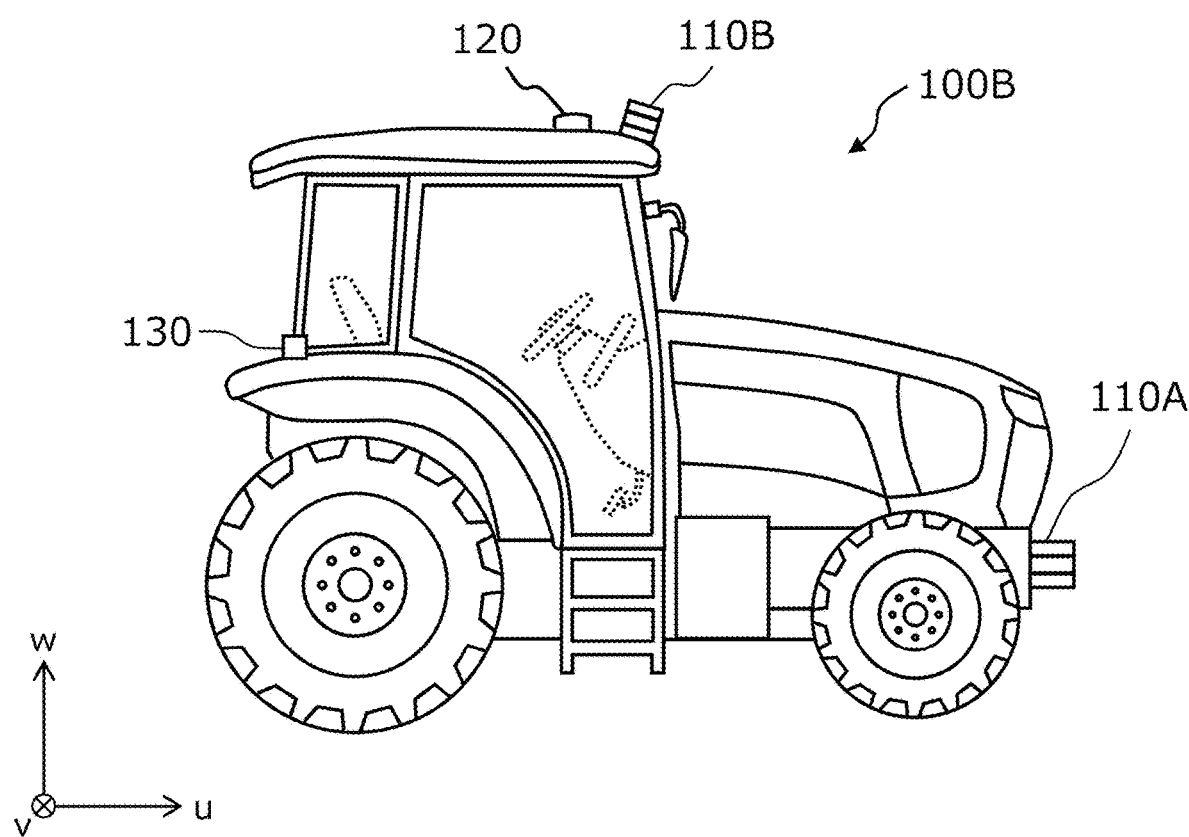
FIG. 34 is a schematic diagram of a tractor according to Preferred Embodiment 2 of the present invention as viewed in a lateral direction.

FIG. 34 is a schematic diagram of a tractor 100B according to the present preferred embodiment as viewed in a lateral direction. The tractor 100B includes a first LiDAR sensor 110A at the body lower front, and a second LiDAR sensor 110B at the upper front of the cabin. Other aspects are similar to those of the configuration shown in FIG. 7. Although FIG. 34 does not show the linkage device 108 and the implement 300 illustrated in FIG. 7, these may also be used in the present preferred embodiment.

Each of the first LiDAR sensor 110A and the second LiDAR sensor 110B in the present preferred embodiment is a two-dimensional LiDAR sensor. In other words, in the example shown in FIG. 9A, each of the LiDAR sensors 110A and 110B is equivalent to a LiDAR sensor 110 of the case where N=1, i.e., emits a laser beam in only the direction of one angle of elevation. Each of the LiDAR sensors 110A and 110B outputs data indicating the distance and direction toward each reflection point or two-dimensional point cloud data. The two-dimensional point cloud data contains information of two-dimensional coordinates of multiple reflection points expressed by the respective sensor coordinate systems of the LiDAR sensors 110A and 110B. By using 2 two-dimensional LiDARs, costs can be reduced as compared to the case of using a three-dimensional LiDAR.

The first LiDAR sensor 110A is mounted at a position that is lower than an average height of the trunks of the rows of trees in the environment in which the tractor 100B travels. The second LiDAR sensor 110B is mounted at a position that is higher than the average height of the trunks of the rows of trees. The first LiDAR sensor 110A may be placed at a height of e.g., not less than 10 cm and not more than 150 cm, and in one example not less than 15 cm and not more than 100 cm, from the ground surface. The second LiDAR sensor 110B may be placed at a position (e.g., about 2 m from the ground surface) that is higher than 150 cm from the ground surface, for example.

Similarly to the LiDAR sensor 110 in Preferred Embodiment 1, the first LiDAR sensor 110A is placed so as to emit laser pulses frontward from the tractor 100A. The first LiDAR sensor 110A in the example of FIG. 34 emits laser pulse to be essentially parallel to the ground surface. When the tractor 100B is located on a flat ground surface, the angle between the outgoing direction of a laser pulse emitted from the first LiDAR sensor 110A and the ground surface may be set within a range of e.g., ±20 degrees, and in one example within a range of ±10 degrees.

On the other hand, the second LiDAR sensor 110B is placed so as to emit laser pulses frontward and obliquely downward from the tractor 100B. The second LiDAR sensor 110B in the example of FIG. 34 emits laser pulse in a direction that is inclined by about 25 degrees from the ground surface. When the tractor 100B is located on a flat ground surface, the angle between the outgoing direction of a laser pulse emitted from the second LiDAR sensor 110B and the ground surface may be set within a range of e.g., not less than 10 degrees and not more than 45 degrees.

Figure 35:
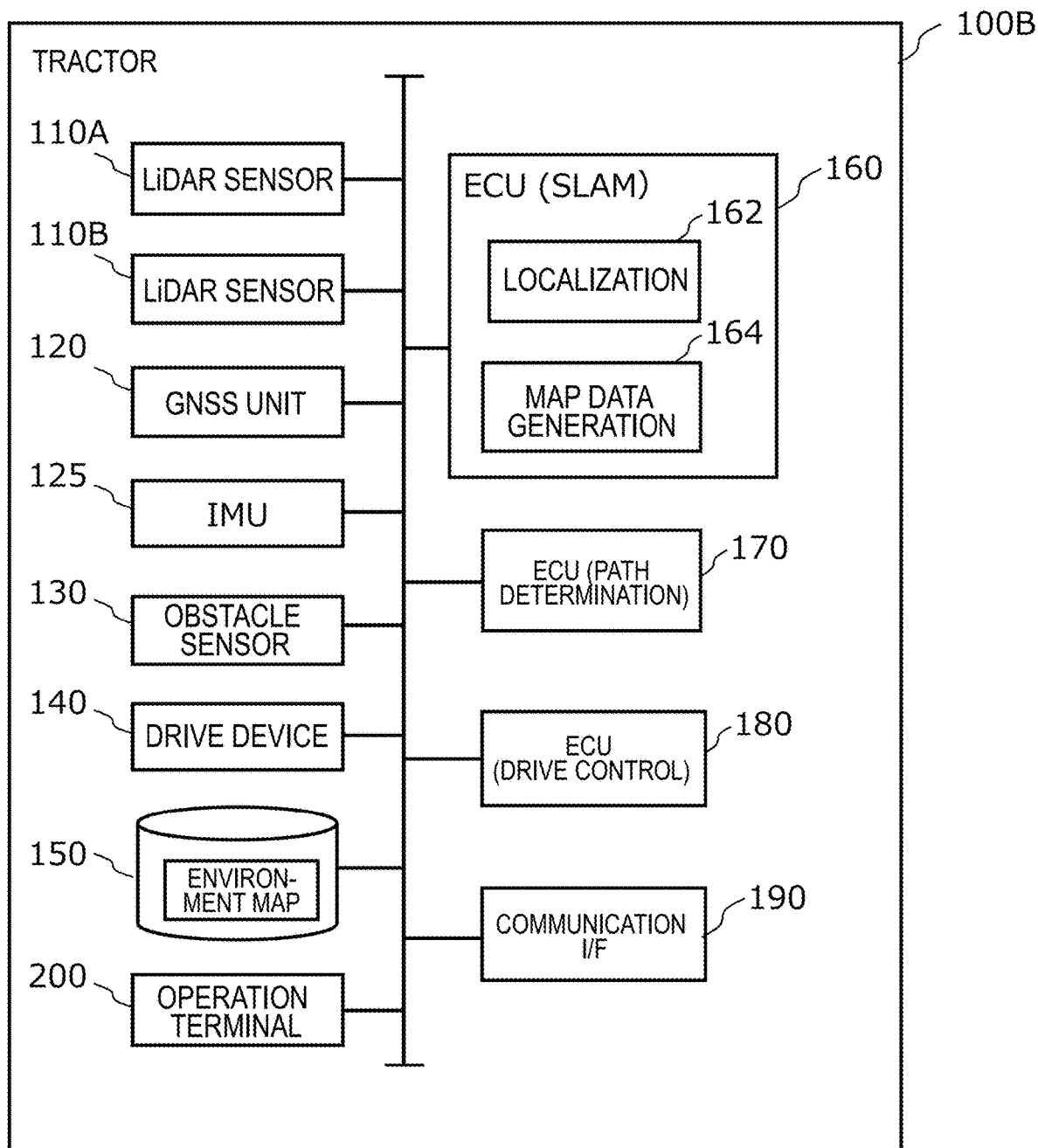
FIG. 35 is a block diagram showing an exemplary schematic configuration of a tractor according to Preferred Embodiment 2 the present invention.

FIG. 35 is a block diagram showing an exemplary schematic configuration of the tractor 100B according to the present preferred embodiment. The exemplary configuration shown in FIG. 35 differs from the configuration shown in FIG. 8 in that the tractor 100B includes the two LiDAR sensors 110A and 110B.

The ECU 160 functions as the aforementioned localization device and data generator. From the point cloud data that is repeatedly output from the two LiDAR sensors 110A and 110B, the ECU 160 acquires input point clouds from multiple scans including the latest scan, and performs matching between the input point clouds from multiple scans and the environment map data. As a result, the position and orientation of the tractor 100B during travel can be estimated. Note that the ECU 160 may only estimate the position of the tractor 100B through matching, and determine the orientation based on the signals output from the IMU 125.

In the course of establishing the environment map, based on the scan data that is repeatedly output from the two LiDAR sensors 110A and 110B while performing localization based on tractor 100B, the ECU 160 detects trunks of the rows of trees in the surrounding environment of the mobile machine, and generates local map data, from which to generate environment map data indicating a distribution of the detected trunks of the rows of trees, and stores the local map data to the storage device 150. While this operation is being performed, the ECU 170 sets a target path which passes between the trunks of the rows of trees as detected based on the scan data. By controlling the drive device 140 in accordance with the target path having been set, the ECU 180 causes the tractor 100B to travel along the target path. Based on signals output from the obstacle sensor(s) 130 or scan data that is output from one or both of the LiDAR sensors 110A and 110B, the ECU 170 may detect obstacles, and set a target path so as to avoid contact with the obstacles. By joining together repeatedly generated local map data, the ECU 160 generates environment map data and records it to the storage device 150. Detection of trunks of the rows of trees may be performed not at the stage of generating local map data, but at the stage of generating environment map data. The process of generating environment map data based on local map data may be performed by an external computer.

During the operation of self-driving or automatic steering after the environment map has been established, the ECU 160 detects trunks of the rows of trees based on scan data that is repeatedly output from the LiDAR sensors 110A and 110B, and performs matching between the detected trunks and the trunks indicated by the environment map data, thereby performing localization. The ECU 180 causes the tractor 100B to travel along an intended travel path that is previously determined by the ECU 170. In this case, too, the ECU 170 may detect obstacles based on signals that are output from the obstacle sensor(s) 130 during travel of the tractor 100B, or scan data that is output from one or both of the LiDAR sensors 110A and 110B, and change the intended travel path so as to avoid contact with the obstacles.

Figure 36A:
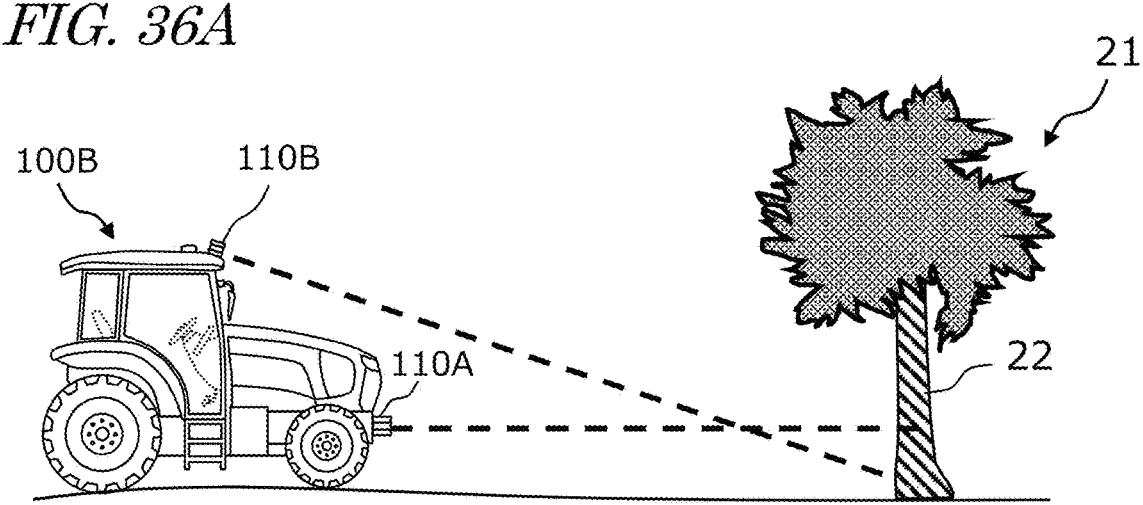
FIG. 36A is a diagram schematically showing a tractor traveling near a tree.
Figure 36B:
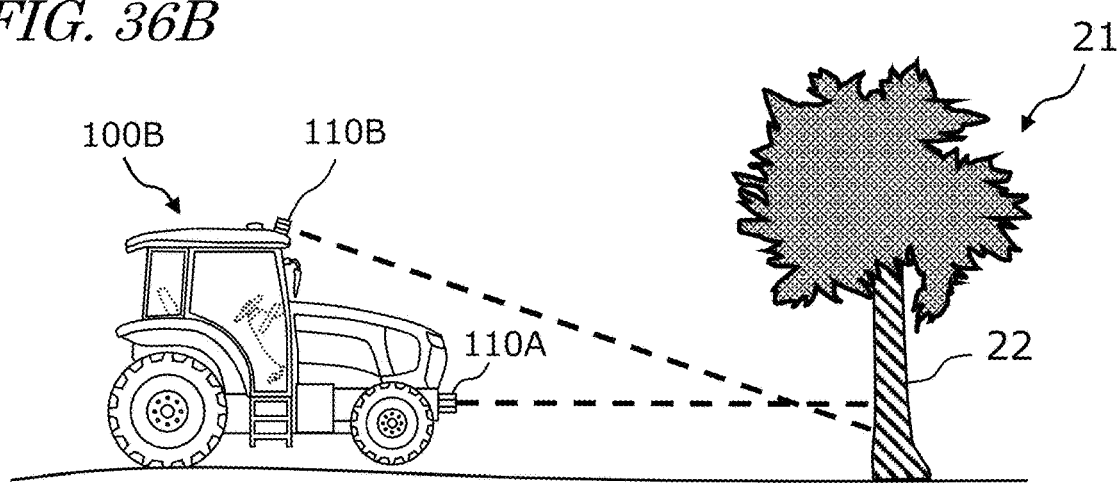
FIG. 36B is another diagram schematically showing a tractor traveling near a tree.
Figure 36C:
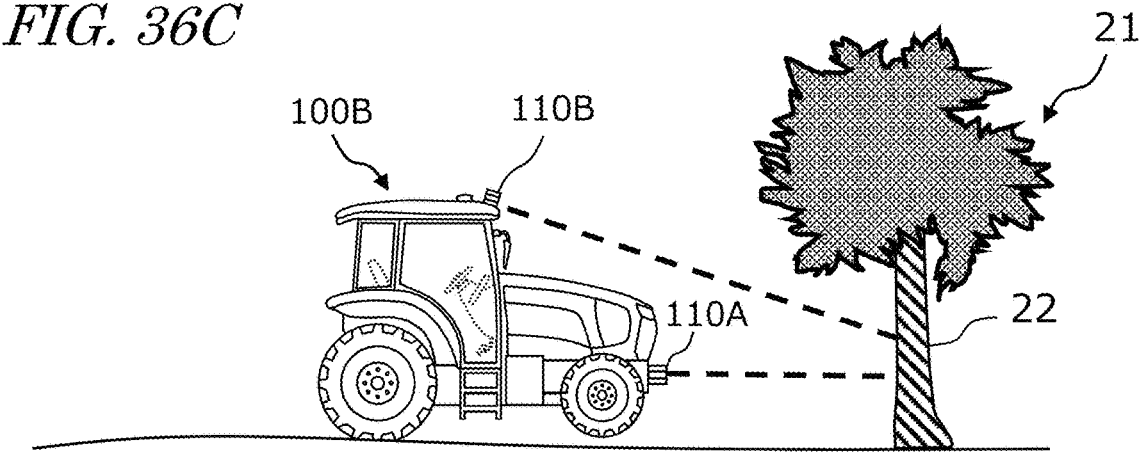
FIG. 36C is still another diagram schematically showing a tractor traveling near a tree.

FIGS. 36A to 36C are diagrams schematically showing the tractor 100B traveling near a tree 21. The tractor 100B gets closer to the tree 21 in the order of FIGS. 36A to 36C. In these figures, broken lines represent laser beams that are emitted from the LiDAR sensors 110A and 110B. As shown in the figures, in accordance with the distance between the tractor 100B and the tree 21, the position of the irradiated point on the trunk 22 of the tree 21 that is irradiated with a laser beam emitted from the second LiDAR sensor 110B changes in the height direction. On the other hand, the change in the position of the irradiated point on the trunk 22 of the tree 21 that is irradiated with a laser beam emitted from the first LiDAR sensor 110A is relatively small. By combining the point cloud data that is acquired through multiple scans of these laser beams, as in the case of using a three-dimensional LiDAR, point cloud data indicating a three-dimensional distribution of reflection points on the surface of the trunk 22 can be acquired.

The ECU 160 in the present preferred embodiment may accumulate scan data from a predetermined number (e.g., 3 or 5) of scans output from each of the LiDAR sensors 110A and 110B, and perform matching between the accumulated scan data and the environment map data, thereby performing localization. By doing so, a highly accurate localization substantially similar to what is attained by using a three-dimensional LiDAR becomes possible.

While the tractor 100B is traveling in order to acquire map data, the ECU 170 determines a local target path for the tractor 100B based on scan data from several scans that was output from one or both of the LiDAR sensors 110A and 110B. For example, from the placement of a point cloud indicated by scan data from several scans that was output from one or both of the LiDAR sensors 110A and 110B, a center position between two adjacent trees can be determined, and a local target path for the tractor 100B can be determined so as to pass through this center position. With such path setting, the tractor 100B is able to autonomously travel while maintaining substantially equal distances to the right and left rows of trees.

The trunk detection may be performed based only on the scan data that is output from the first LiDAR sensor 110A. The scan data that is output from the first LiDAR sensor 110A, which is at a relatively low position, is likely to contain a large amount of information of a point cloud indicating the surface of a trunk. Therefore, distribution information of the trunks can still be acquired by using only the scan data from the first LiDAR sensor 110A.

Because the second LiDAR sensor 110B in the present preferred embodiment is placed at a relatively high position, it is suitable for detection of leaves of the rows of trees. Therefore, the ECU 160 may generate data indicating a distribution of leaves of the rows of trees based on the point cloud data that is acquired with the second LiDAR sensor 110B, and record it to the storage device 150 or another storage medium. Such data may be used for growth status management of the trees (e.g., canopy management).

During travel of the tractor 100B, obstacles existing at relatively high positions (e.g., leaves of the rows of trees) may be detected based on point cloud data that is acquired with the second LiDAR sensor 110B, and an avoiding or halt operation may be performed. In the case where no obstacle sensor 130 is provided at the upper front of the tractor 100B, if it were not for the second LiDAR sensor 110B it would be difficult to detect and avoid leaves or vines of trees protruding above the path between rows of trees. Providing the second LiDAR sensor 110B makes detection of such leaves or vines easier.

According to the present preferred embodiment, by using 2 two-dimensional LiDARs, a similar operation to that of Preferred Embodiment 1 can be realized at low cost. Without being limited to 2, it is possible to provide 3 or more two-dimensional LiDARs at different positions. Moreover, one or more two-dimensional LiDARs and one or more three-dimensional LiDARs may be used in combination. Thus, the configuration according to the present preferred embodiment admits of various modifications. Note that the various techniques described with reference to Preferred Embodiment 1 are readily applicable to the present preferred embodiment.

3-3. Preferred Embodiment 3

Next, a third preferred embodiment of the present disclosure will be described.

The present preferred embodiment relates to a system that uses one or more mobile machines (e.g., a drone(s)) to collect local map data from which to establish environment map data, and generates environment map data based on the collected local map data.

Figure 37:
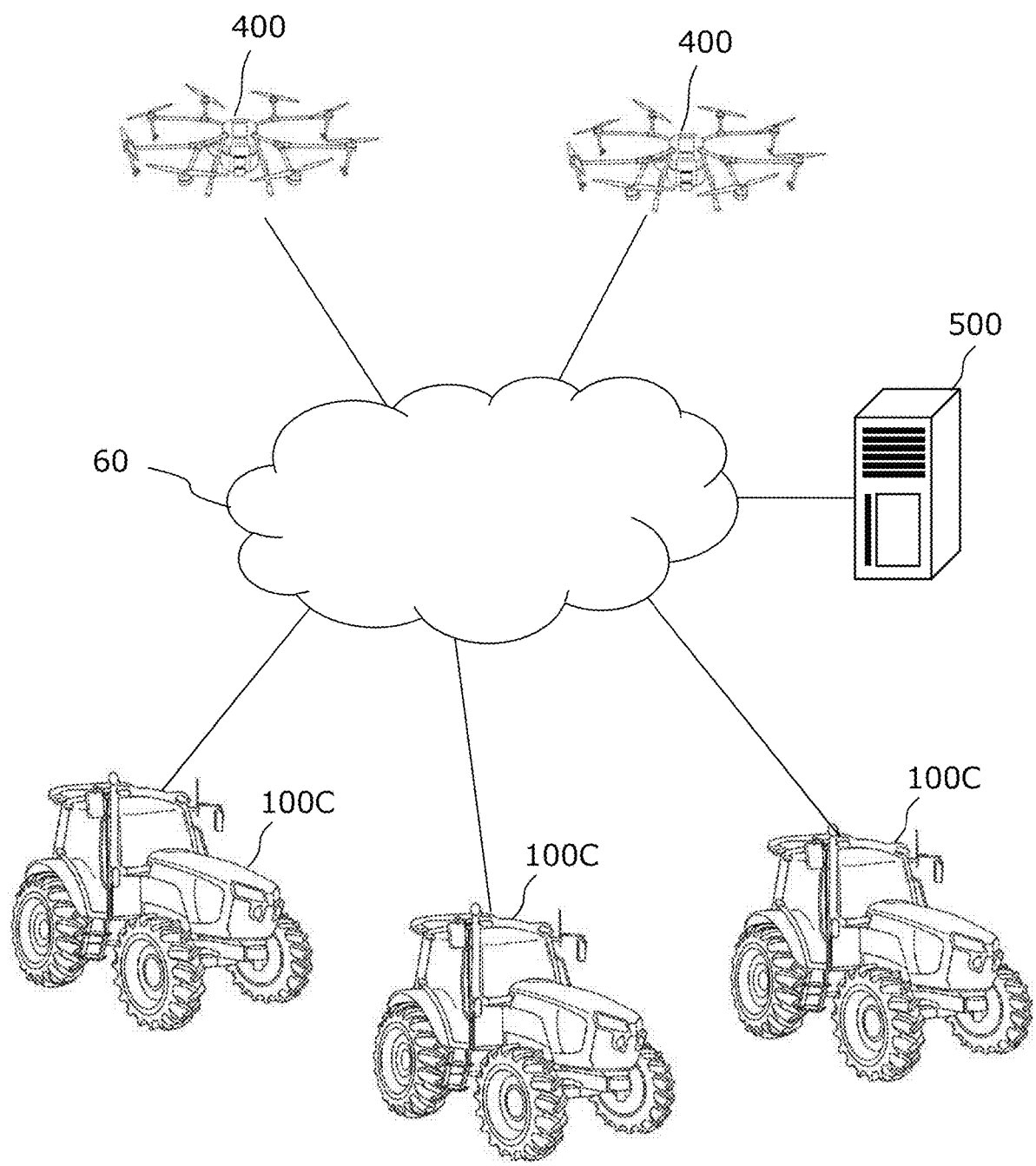
FIG. 37 is a diagram schematically showing an exemplary configuration of a system according to Preferred Embodiment 3 the present invention.

FIG. 37 is a diagram schematically showing an exemplary configuration of the system according to the present preferred embodiment. This system includes one or more drones 400, one or more tractors 100C, and a server computer 500 (hereinafter referred to as the "server 500"). These component elements are connected so as to be capable of communicating with each other via a wired or wireless network 60. Although FIG. 37 illustrates two drones 400 and three tractors 100C, the number of drones 400 and the number of tractors 100C may be arbitrary. Each drone 400 generates local map data from which to establish environment map data while flying in an environment to be traveled by the tractors 100C, and transmits it to the server 500. Based on the local map data received from the one or more drones 400, the server 500 generates environment map data that is expressed by a unified world coordinate system, and delivers it to each tractor 100C. Based on the delivered environment map data, each tractor 100C autonomously travels in the orchard.

Figure 38:
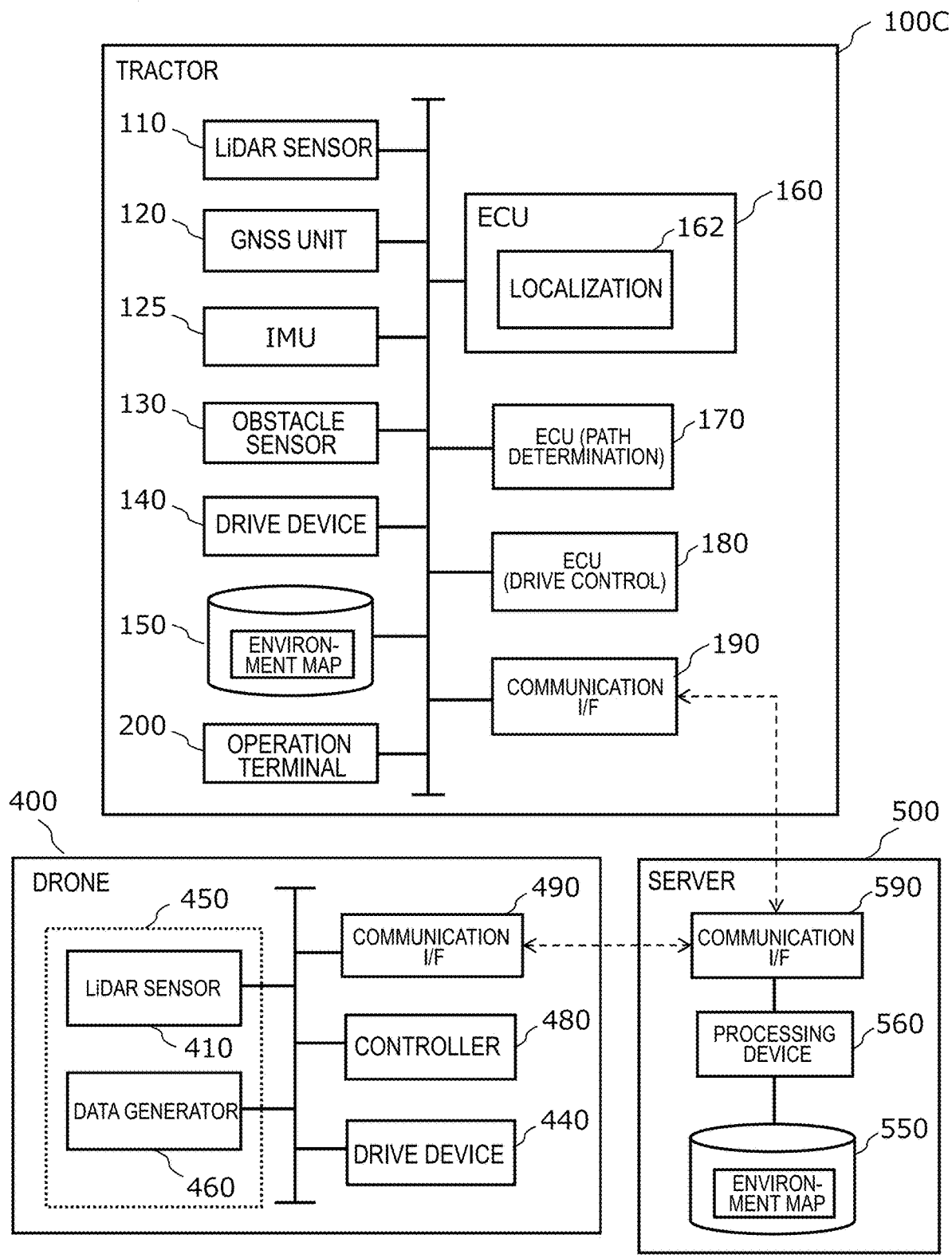
FIG. 38 is a block diagram showing an exemplary configuration of a system according to Preferred Embodiment 3 the present invention.

FIG. 38 is a block diagram showing an exemplary configuration of this system. The tractor 100C in this example includes similar component elements to those of the tractor 100A according to Preferred Embodiment 1 shown in FIG. 8. However, the ECU 160 in the present preferred embodiment does not include a map data generating module 164. The communication I/F 190 communicates with the server 500 via the network 60. The storage device 150 stores the environment map data that is delivered from the server 500. Note that an implement to be linked to the tractor 100C in use is omitted from illustration in FIG. 38. Similarly to Preferred Embodiment 1, the communication I/F 190 may perform communication with an implement that is connected to the tractor 100C.

Each drone 400 includes a data generation unit 450, a drive device 440, a controller 480, and a communication I/F 490. The drive device 440 includes various devices, such as an electric motor for driving purposes, multiple propellers, etc., which are necessary for the flight of the drone 400. The controller 480 controls the operation of the data generation unit 450 and the drive device 440. The communication I/F 490 is a circuit for communicating with the server 500 via the network 60. The data generation unit 450 includes a LiDAR sensor 410 and a data generator 460. The LiDAR sensor 410 has similar functionality to that of the LiDAR sensor 110 in Preferred Embodiment 1. The data generator 460 has similar functionality to that of the ECU 160 in Preferred Embodiment 1. In other words, the data generator 460 has the function of simultaneously performing localization and map generation. However, the data generator 460 does not generate the final environment map data. The data generator 460 includes a processor and a storage medium, e.g., a memory. The data generator 460 repeatedly generate local map data indicating a distribution of trunks of the multiple rows of trees based on scan data that is repeatedly output from the LiDAR sensor 410 during flight of the drone 400, and accumulates it to the storage medium. The accumulated local map data is transmitted from the communication I/F 490 to the server 500 via manipulations by the user, for example.

The server 500 may be a computer, e.g., a cloud server or an edge server, that is installed at a remote place from the tractors 100C and the drones 400, for example. The server 500 includes a storage device 550, a processing device 560, and a communication I/F 590. The communication I/F 590 is a circuit for communicating with the tractors 100C and the drones 400 via the network 60. By unifying and integrating the coordinate systems of the local map data acquired from the multiple drones 400, the processing device 560 generates environment map data, and records it to the storage device 550. The processing device 560 delivers the generated environment map data from the communication I/F 590 to the multiple tractors 100C. The processing device 560 may deliver the environment map data to mobile machines other than the tractors 100C. For example, in the case where the drones 400 are to perform not only map data collection but also tasks such as seeding, manure spreading, or preventive pest control, the environment map data may be delivered to the drones 400. In that case, the drones 400 can autonomously fly while performing localization through matching between the scan data that is output from the LiDAR sensor 410 and the environment map data, and perform predetermined tasks.

Figure 39:
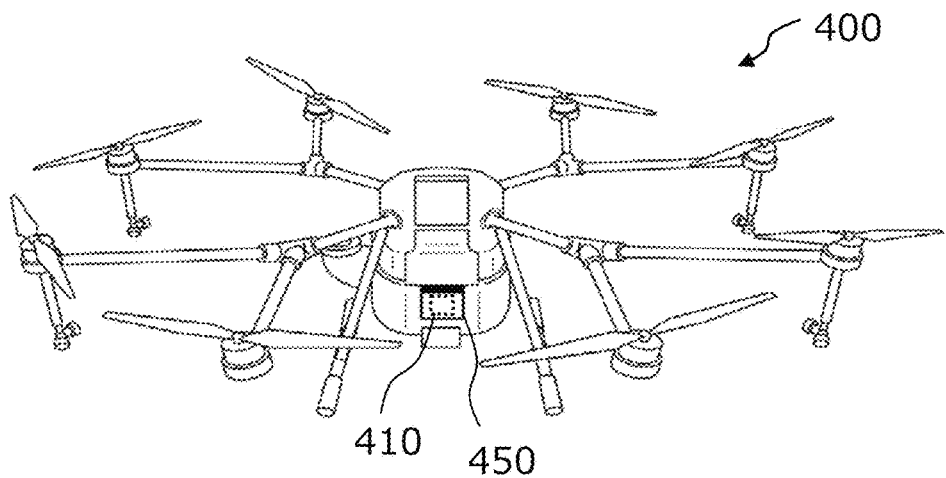
FIG. 39 is a perspective view showing an example appearance of a drone.

FIG. 39 is a perspective view showing an example appearance of a drone 400. This drone 400 includes a data generation unit 450 at the front face of its body. The data generation unit 450 includes the LiDAR sensor 410, and is able to scan the surrounding environment with laser beams while flying.

Figure 40:
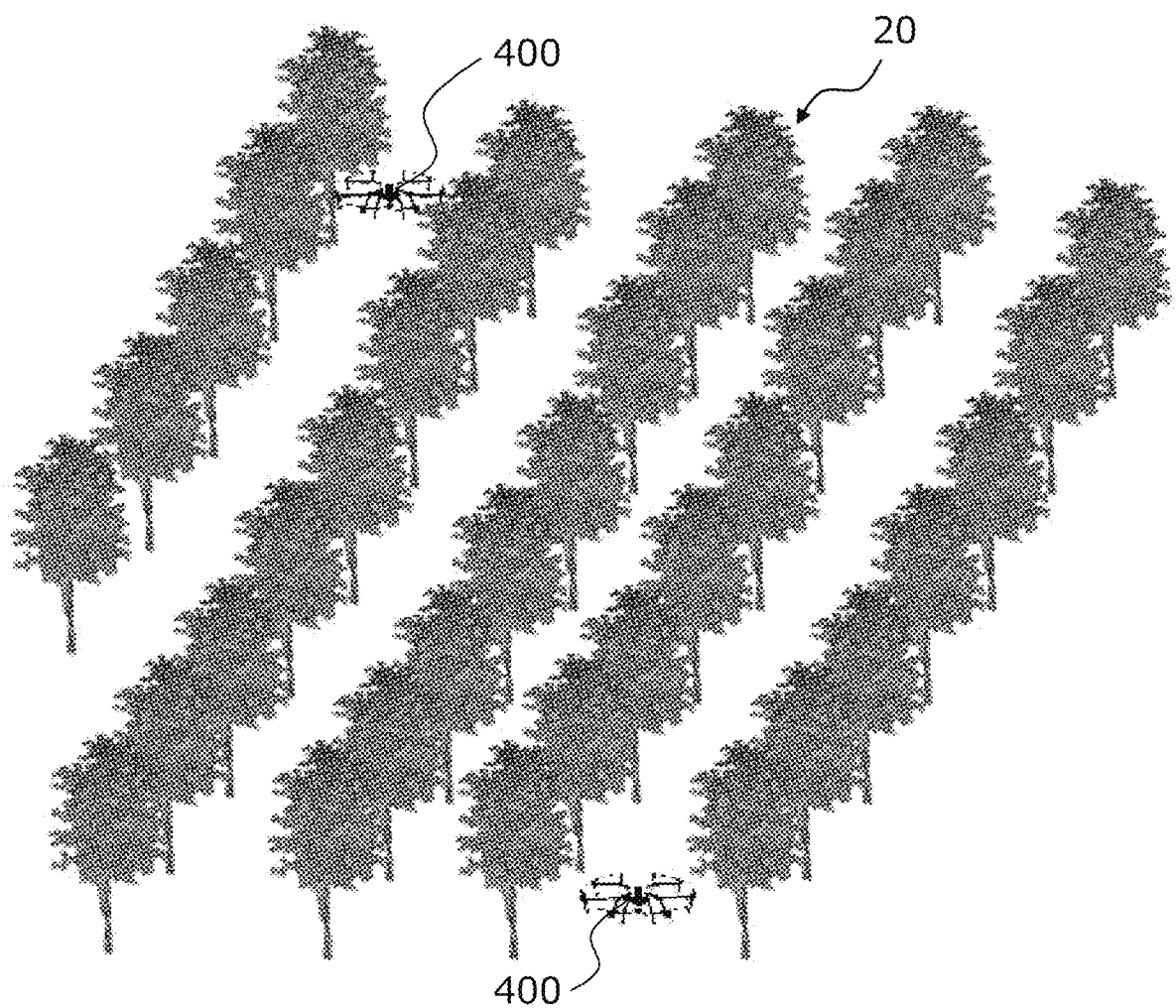
FIG. 40 is a perspective view schematically an example manner of data collecting work by multiple drones.

FIG. 40 is a perspective view schematically an example manner of data collecting work by multiple drones 400. FIG. 40 illustrates two drones 400 flying between multiple rows of trees 20. While autonomously moving between the rows of trees 20 through low-altitude flight, the drones 400 repeat the operation of scanning the trunks of the rows of trees 20 with laser beams to generate local map data indicating a distribution of the trunks. The method of generating the local map data is similar to the method in Preferred Embodiment 1.

Figure 41:
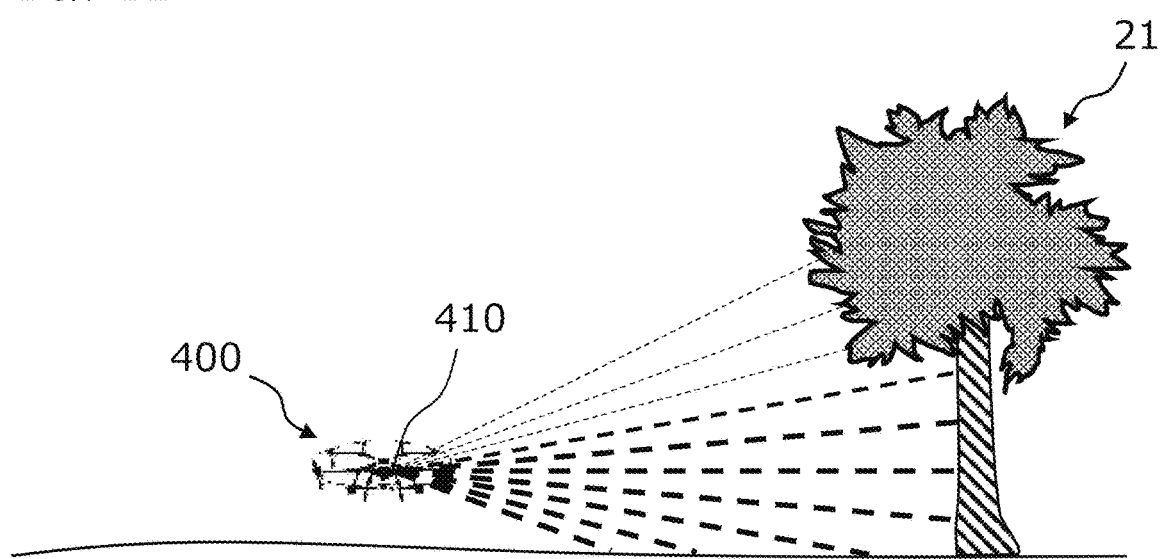
FIG. 41 is a diagram schematically showing a tree being irradiated with laser beams emitted from a LiDAR sensor mounted on a drone.

FIG. 41 is a diagram schematically showing a tree 21 being irradiated with laser beams emitted from the LiDAR sensor 410 mounted on a drone 400. Each drone 400 in the present preferred embodiment is programmed to fly at an altitude such that the LiDAR sensor 410 keeps a position that is lower than an average height of the trunks of the rows of trees. The altitude of the drone 400 is controlled so that the LiDAR sensor 410 is located at a height of not less than 15 cm and not more than 100 cm from the ground surface, for example. While performing localization based on sensor data that is repeatedly output from the LiDAR sensor 410 located at such a low altitude, the data generator 460 detects the trunks of the rows of trees in the surrounding environment of the drone 400, generates local map data indicating a distribution of the detected trunks of the rows of trees, and records it to the storage medium. From the sensor data that is repeatedly output from the LiDAR sensor 410, the data generator 460 acquires input point clouds from multiple scans performs matching between the input point cloud from at least one scan including the latest scan and the local map data generated in the previous run or earlier, thereby performing localization.

Figure 42:
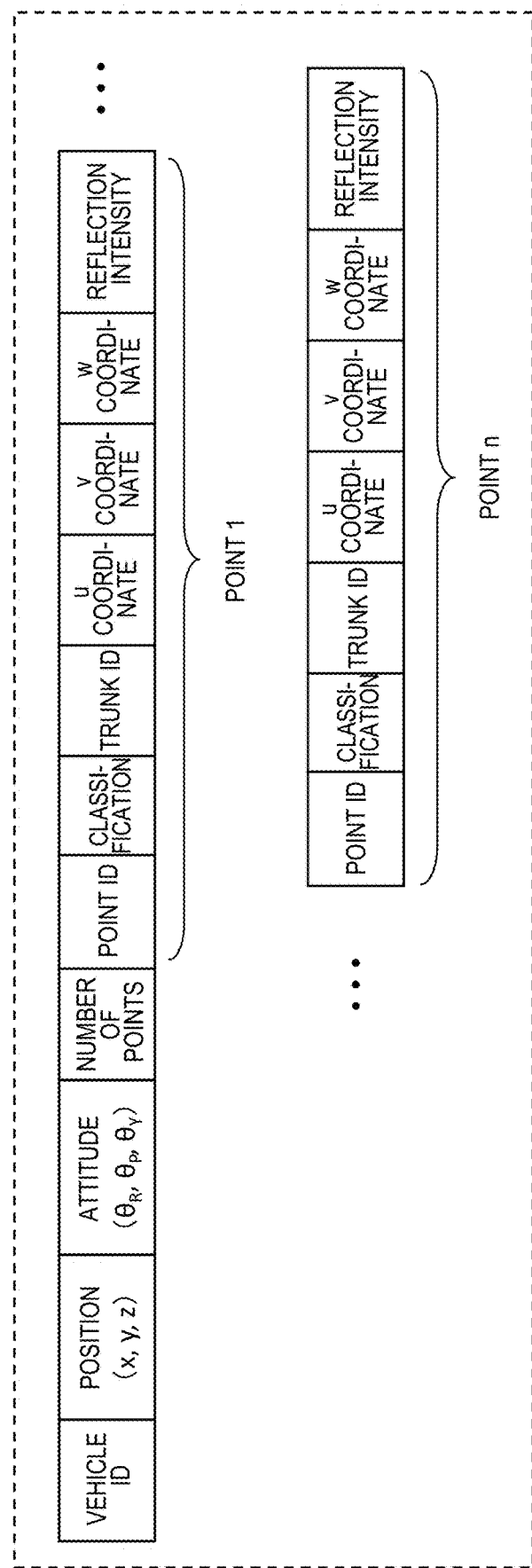
FIG. 42 is a diagram showing an example format of local map data to be output from a drone.

FIG. 42 is a diagram showing an example format of local map data to be output from each drone 400. In this example, the local map data contains a mobile machine ID as an identification number of the drone 400, the position (x, y, z) and attitude ($\theta_R$, $\theta_P$, $\theta_Y$) of the drone 400 in a world coordinate system, and information that is recorded for each reflection point. The information to be recorded for each reflection point is similar to the information shown in FIG. 23; however, the coordinates of each reflection point are coordinates (u, v, w) in the sensor coordinate system that is fixed to the LiDAR sensor 410 of the drone 400. Such local map data may be transmitted from each drone 400 to the server 500. Note that information concerning whether the given point is a trunk or not, e.g., classification and trunk ID, does not need to be contained in the local map data. After acquiring the local map data from the multiple drones 400, the processing device 560 in the server 500 may detect point clouds corresponding to the trunks based on characteristic aspects of the distribution of point clouds.

With the above configuration, even in a broad orchard, for example, data for establishing the environment map can be efficiently collected.

In the present preferred embodiment, not only the drones 400, but also other mobile machines such as the tractors 100C may also perform the operation of acquiring local map data from which to establish the environment map data. Moreover, the mobile machine to generate the local map data does not need to be a mobile machine that is capable of moving autonomously. For example, the local map data may be generated as the user drives or operates a mobile machine, e.g., a tractor or a drone, that includes one or more LiDAR sensors mounted at a position lower than an average height of the trunks of rows of trees.

Without providing the server 500, a mobile machine such as a drone 400 or a tractor 100C may generate the final environment map data, and supply the environment map data to the other mobile machines. In that case, the environment map data is directly exchanged through communication between mobile machines.

3-4. Other Preferred Embodiments

In the above preferred embodiments, each tractor may be an unmanned tractor. In that case, component elements which are needed only for human driving, e.g., the cabin, the driver's seat, the steering wheel, and the operation terminal, may not be provided in the tractor. The unmanned tractor may perform a similar operation to the operation in each of the above-described preferred embodiments through autonomous driving, or remote manipulation by the user of the tractor.

In the above preferred embodiments, the one or more sensors provided in the mobile machine is a LiDAR sensor that performs laser beam scanning in order to output two-dimensional or three-dimensional point cloud data, or distance distribution data, as the sensor data. However, the sensors are not limited to such LiDAR sensors. For example, a flash-type LiDAR sensor or other types of sensors, e.g., image sensors, may be used. Such other types of sensors may be combined with a scan-type LiDAR sensor.

A device that performs the processing needed for the localization and autonomous movement (or automatic steering) or map data generation according to the above preferred embodiments may be mounted to a mobile machine lacking such functionality as an add-on. For example, a control unit to control the operation of a mobile machine that moves between multiple rows of trees may be attached to the mobile machine in use. Such a control unit includes: one or more sensors to output sensor data indicating a distribution of objects in a surrounding environment of the mobile machine; a storage device that stores environment map data indicating a distribution of trunks of the multiple rows of trees; a localization device; and a controller to control movement of the mobile machine in accordance with the position of the mobile machine estimated by the localization device. Based on sensor data that is repeatedly output from one or more sensors while the mobile machine is moving, the localization device detects trunks of the rows of trees in the surrounding environment of the mobile machine, and estimates the position of the mobile machine through matching between the detected trunks of the rows of trees and the environment map data. Also, a data generation unit to generate map data may be attached to a mobile machine that moves between multiple rows of trees in use. Such a data generation unit includes: one or more sensors to output sensor data indicating a distribution of objects in a surrounding environment of the mobile machine; and a data generator. While performing localization based on sensor data that is repeatedly output from one or more sensors while the mobile machine is moving, the data generator detects trunks of the rows of trees in the surrounding environment of the mobile machine, and generates local map data, from which to generate environment map data indicating a distribution of the detected trunks of the rows of trees, and stores the local map data to the storage device.

As described above, the present disclosure encompasses mobile machines, data generation units, methods, and computer programs as recited in the following Items.

Item 1

A mobile machine movable between multiple rows of trees includes one or more sensors to output sensor data indicating a distribution of objects in a surrounding environment of the mobile machine, and a data generator to, while performing localization, detect trunks of the rows of trees in the surrounding environment of the mobile machine based on the sensor data that is repeatedly output from the one or more sensors, and to generate local map data from which to generate environment map data indicating a distribution of the detected trunks of the rows of trees and record the local map data to a storage.

Item 2

In the mobile machine described above, the environment map data includes one of data in which the detected trunks and objects other than the trunks are recorded in a distinguishable format, data in which a relatively large weight is assigned to the detected trunks and a relatively small weight is assigned to objects other than the trunks, or data including information of the distribution of the detected trunks but not including information of a distribution of some or all of objects other than the trunks.

Item 3

In the mobile machine described above, the one or more sensors include at least one LiDAR sensor to output two-dimensional or three-dimensional point cloud data as the sensor data.

Item 4

In the mobile machine described above, the at least one LiDAR sensor is mounted at a position that is lower than an average height of the trunks of the rows of trees.

Item 5

In the mobile machine described above, the at least one LiDAR sensor is at a height that is not less than about 15 cm and not more than about 100 cm from the ground surface.

Item 6

In the mobile machine described above, the data generator is configured or programmed to acquire input point clouds from multiple scans from sensor data that is repeatedly output from the at least one LiDAR sensor mounted at a position that is lower than an average height of the trunks of the rows of trees, and perform matching between the input point cloud from at least one scan including a latest scan and the local map data generated in a previous run or earlier to perform localization.

Item 7

In the mobile machine described above, the at least one LiDAR sensor mounted at a position that is lower than an average height of the trunks of the rows of trees includes a plurality of laser light sources arranged along a vertical direction to emit a laser pulse at a different angle of elevation, and the data generator is configured or programmed to detect the trunks based on reflection points of the laser pulses emitted from, among the plurality of laser light sources, the laser light sources whose angle of elevation is included in a predetermined range.

Item 8

In the mobile machine described above, the data generator is configured or programmed to detect the trunks based on changes in distance from the at least one LiDAR sensor to reflection points of the laser pulses during scans by the at least one LiDAR sensor.

Item 9

In the mobile machine described above, the one or more sensors include at least one LiDAR sensor to output two-dimensional or three-dimensional point cloud data as the sensor data, the at least one LiDAR sensor repeatedly outputs the point cloud data with a pre-designated cycle, and the data generator is configured or programmed to detect the trunks based on a position of each point in the point cloud data that is output during a period of one cycle or longer or on a distance or an angle of each point from the mobile machine.

Item 10

In the mobile machine described above, the data generator is configured or programmed to generate the environment map data based on the local map data, and update the environment map data by adding information of the trunks detected from newly acquired sensor data to the environment map data that was generated in a previous run.

Item 11

In the mobile machine described above, the data generator is configured or programmed to detect the trunks of the rows of trees in the surrounding environment of the mobile machine based on the sensor data that is repeatedly output from the one or more sensors while the mobile machine is moving, perform matching between the detected trunks of the rows of trees and the environment map data to estimate the position of the mobile machine, and include information indicating the estimated position of the mobile machine in the local map data for output.

Item 12

The mobile machine described above includes an inertial measurement unit, wherein the data generator is configured or programmed to estimate a position of the mobile machine by utilizing a signal that is output from the inertial measurement unit.

Item 13

The mobile machine described above includes a controller configured or programmed to control movement of the mobile machine based on the distribution of the detected trunks of the rows of trees.

Item 14

In the mobile machine described above, when the trunks of two adjacent rows of trees among the multiple rows of trees are detected, the controller is configured or programmed to perform steering control of the mobile machine so that the mobile machine moves along a path which passes between the trunks of the two rows of trees.

Item 15

In the mobile machine described above, when fewer trunks are detected in one of two adjacent rows of trees among the multiple rows of trees than in another one of the two rows of trees, the controller is configured or programmed to estimate a distribution of hidden trunks in the one of the two rows of trees based on the distribution of the detected trunks, and perform steering control of the mobile machine based on the estimated distribution.

Item 16

In the mobile machine described above, the data generator is configured or programmed to further detect leaves of the rows of trees in the surrounding environment of the mobile machine based on the sensor data that is repeatedly output from the one or more sensors while the mobile machine is moving, and further generate data indicating a distribution of the detected leaves of the rows of trees.

Item 17

In the mobile machine described above, the data generator is configured or programmed to further detect leaves of the rows of trees in the surrounding environment of the mobile machine based on the sensor data that is repeatedly output from the one or more sensors while the mobile machine is moving, and based on a distribution of each of the detected trunks and the detected leaves of the rows of trees, the controller is configured or programmed to perform steering control of the mobile machine so that the mobile machine moves along a path which passes between two adjacent rows of trees among the multiple rows of trees and which reduces contact with the leaves of the rows of trees.

Item 18

In the mobile machine described above, the data generator is configured or programmed to further generate grid data indicating a two-dimensional distribution of each of the trunks and the leaves of the rows of trees, and the controller is configured or programmed to determine the path for the mobile machine based on the grid data.

Item 19

In the mobile machine described above, the mobile machine is a work vehicle that is capable of autonomously moving.

Item 20

In the mobile machine described above, the mobile machine is an unmanned aerial vehicle, and the data generator is configured or programmed to generate the local map data while the mobile machine is flying at a position that is lower than an average height of the trunks of the rows of trees.

Item 21

In the mobile machine described above, the data generator is configured or programmed to transmit the local map data to an external device that generates the environment map data.

Item 22

In the mobile machine described above, the data generator is configured or programmed to measure a thickness of each detected trunk of the rows of trees based on the sensor data, and records the thickness of each trunk to a storage.

Item 23

In the mobile machine described above, one or more posts are provided in an area where the multiple rows of trees are placed, and the data generator is configured or programmed to further detect the post or posts in the surrounding environment of the mobile machine based on the sensor data that is repeatedly output from the one or more sensors while the mobile machine is moving, and generate data indicating distributions of the detected trunks of the rows of trees and the post or posts as the environment map data, and record the data to a storage.

Item 24
In the mobile machine described above, the data generator is configured or programmed to further generate data indicating a placement of the detected rows of trees and records the data to the storage.

Item 25
A data generation unit to be used in a mobile machine movable between multiple rows of trees includes one or more sensors attached to the mobile machine in use to output sensor data indicating a distribution of objects in the surrounding environment of the mobile machine, and a data generator to, while performing localization, detect trunks of the rows of trees in a surrounding environment of the mobile machine based on the sensor data that is repeatedly output from the one or more sensors while the mobile machine is moving, and to generate local map data from which to generate environment map data indicating a distribution of the detected trunks of the rows of trees and record the local map data to a storage.

Item 26
A method to be executed by a mobile machine movable between multiple rows of trees includes while the mobile machine is moving, acquiring sensor data indicating a distribution of objects in a surrounding environment of the mobile machine from one or more sensors mounted to the mobile machine, detecting trunks of the rows of trees in the surrounding environment of the mobile machine based on the acquired sensor data, generating local map data from which to generate environment map data indicating a distribution of the detected trunks of the rows of trees, and recording the local map data to a storage.

Item 27
A non-transitory computer-readable medium includes a program to be executed by a computer in a mobile machine movable between multiple rows of trees, the computer program causing the computer to perform while the mobile machine is moving, acquiring sensor data indicating a distribution of objects in a surrounding environment of the mobile machine from one or more sensors mounted to the mobile machine, detecting trunks of the rows of trees in the surrounding environment of the mobile machine based on the acquired sensor data, generating local map data from which to generate environment map data indicating a distribution of the detected trunks of the rows of trees, and recording the local map data to a storage.

Item 28
A method includes acquiring the local map data generated by one or more of the mobile machines described above, generating the environment map data by integrating the acquired local map data, and recording the environment map data to a storage.

Item 29
The method described above includes delivering the environment map data to the one or more mobile machines or to another mobile machine.

The techniques according to preferred embodiments of the present disclosure and modifications or combinations thereof are applicable to tractors, drones, walking robots or other mobile machines that move in an environment where multiple rows of trees exist, e.g., a vineyard or any other orchard.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mobile machine movable between multiple rows of trees, the mobile machine comprising:
    one or more sensors to output sensor data indicating a distribution of objects in a surrounding environment of the mobile machine;
    a data generator to, while performing localization, detect trunks of the rows of trees in the surrounding environment of the mobile machine based on the sensor data that is repeatedly output from the one or more sensors, and to generate local map data from which to generate environment map data indicating a distribution of the detected trunks of the rows of trees and record the local map data to a storage; and
    a controller configured or programmed to control movement of the mobile machine based on the distribution of the detected trunks of the rows of trees; wherein
    when fewer trunks are detected in one of two adjacent rows of trees among the multiple rows of trees than in another one of the two rows of trees, the controller is configured or programmed to estimate a distribution of undetected trunks in the one of the two rows of trees based on the distribution of the detected trunks, and perform steering control of the mobile machine based on the estimated distribution.

2. The mobile machine of claim 1, wherein the environment map data includes one of:
    data in which the detected trunks and objects other than the trunks are recorded in a distinguishable format;
    data in which a relatively large weight is assigned to the detected trunks, and a relatively small weight is assigned to objects other than the trunks; or
    data including information of the distribution of the detected trunks, but not including information of a distribution of some or all of objects other than the trunks.

3. The mobile machine of claim 1, wherein the one or more sensors include at least one LiDAR sensor to output two-dimensional or three-dimensional point cloud data as the sensor data.

4. The mobile machine of claim 3, wherein the at least one LIDAR sensor is mounted at a position that is lower than an average height of the trunks of the rows of trees.

5. The mobile machine of claim 4, wherein the at least one LiDAR sensor is at a height that is not less than about 15 cm and not more than about 100 cm from the ground surface.

6. The mobile machine of claim 4, wherein the data generator is configured or programmed to acquire input point clouds from multiple scans from sensor data that is repeatedly output from the at least one LiDAR sensor mounted at a position that is lower than an average height of the trunks of the rows of trees, and to perform matching between the input point cloud from at least one scan including a latest scan and the local map data generated in a previous run or earlier to perform localization.

7. The mobile machine of claim 4, wherein
    the at least one LiDAR sensor mounted at a position that is lower than an average height of the trunks of the rows of trees includes a plurality of laser light sources arranged along a vertical direction to emit laser pulses at a different angles of elevation; and
    the data generator is configured or programmed to detect the trunks based on reflection points of the laser pulses emitted from, among the plurality of laser light sources, the laser light sources having angles of elevation that fall within a predetermined range.

8. The mobile machine of claim 7, wherein the data generator is configured or programmed to detect the trunks based on changes in distance from the at least one LiDAR sensor to reflection points of the laser pulses during scans by the at least one LiDAR sensor.

9. The mobile machine of claim 3, wherein
the one or more sensors include at least one LiDAR sensor to output two-dimensional or three-dimensional point cloud data as the sensor data;
the at least one LiDAR sensor is operable to repeatedly output the point cloud data with a pre-designated cycle; and
the data generator is configured or programmed to detect the trunks based on a position of each point in the point cloud data that is output during a period of one cycle or longer or based on a distance or an angle of each point from the mobile machine.

10. The mobile machine of claim 1, wherein the data generator is configured or programmed to:
generate the environment map data based on the local map data; and
update the environment map data by adding information of the trunks detected from newly acquired sensor data to the environment map data that was generated in a previous run.

11. The mobile machine of claim 1, wherein the data generator is configured or programmed to detect the trunks of the rows of trees in the surrounding environment of the mobile machine based on the sensor data that is repeatedly output from the one or more sensors while the mobile machine is moving, perform matching between the detected trunks of the rows of trees and the environment map data to estimate the position of the mobile machine, and include information indicating the estimated position of the mobile machine in the local map data for output.

12. The mobile machine of claim 1, further comprising an inertial measurement unit; wherein
the data generator is configured or programmed to estimate a position of the mobile machine by utilizing a signal that is output from the inertial measurement unit.

13. The mobile machine of claim 1, wherein, when the trunks of two adjacent rows of trees among the multiple rows of trees are detected, the controller is configured or programmed to perform steering control of the mobile machine so that the mobile machine moves along a path which passes between the trunks of the two rows of trees.

14. The mobile machine of claim 1, wherein the data generator is configured or programmed to further detect leaves of the rows of trees in the surrounding environment of the mobile machine based on the sensor data that is repeatedly output from the one or more sensors while the mobile machine is moving, and further generate data indicating a distribution of the detected leaves of the rows of trees.

15. The mobile machine of claim 1, wherein
the data generator is configured or programmed to further detect leaves of the rows of trees in the surrounding environment of the mobile machine based on the sensor data that is repeatedly output from the one or more sensors while the mobile machine is moving; and
based on a distribution of each of the detected trunks and the detected leaves of the rows of trees, the controller is configured or programmed to perform steering control of the mobile machine so that the mobile machine moves along a path which passes between two adjacent rows of trees among the multiple rows of trees and which reduces contact with the leaves of the rows of trees.

16. The mobile machine of claim 15, wherein
the data generator further is configured or programmed to generate grid data indicating a two-dimensional distribution of each of the trunks and the leaves of the rows of trees; and
the controller is configured or programmed to determine the path for the mobile machine based on the grid data.

17. A data generation unit to be used in a mobile machine movable between multiple rows of trees, the data generation unit comprising:
one or more sensors attached to the mobile machine in use to output sensor data indicating a distribution of objects in a surrounding environment of the mobile machine;
a data generator to, while performing localization, detect trunks of the rows of trees in the surrounding environment of the mobile machine based on the sensor data that is repeatedly output from the one or more sensors while the mobile machine is moving, and to generate local map data from which to generate environment map data indicating a distribution of the detected trunks of the rows of trees and record the local map data to a storage; and
a controller configured or programmed to control movement of the mobile machine based on the distribution of the detected trunks of the rows of trees; wherein
when fewer trunks are detected in one of two adjacent rows of trees among the multiple rows of trees than in another one of the two rows of trees, the controller is configured or programmed to estimate a distribution of undetected trunks in the one of the two rows of trees based on the distribution of the detected trunks, and perform steering control of the mobile machine based on the estimated distribution.

18. A method to be executed by a mobile machine movable between multiple rows of trees, the method comprising:
while the mobile machine is moving, acquiring sensor data indicating a distribution of objects in a surrounding environment of the mobile machine from one or more sensors mounted to the mobile machine;
detecting trunks of the rows of trees in the surrounding environment of the mobile machine based on the acquired sensor data;
generating local map data from which to generate environment map data indicating a distribution of the detected trunks of the rows of trees;
recording the local map data to a storage;
controlling movement of the mobile machine based on the distribution of the detected trunks of the rows of trees; and
when fewer trunks are detected in one of two adjacent rows of trees among the multiple rows of trees than in another one of the two rows of trees, estimating a distribution of undetected trunks in the one of the two rows of trees based on the distribution of the detected trunks, and performing steering control of the mobile machine based on the estimated distribution.

* * * * *